(12) United States Patent
Ostrowiecki

(10) Patent No.: US 6,978,796 B2
(45) Date of Patent: Dec. 27, 2005

(54) UNIVERSAL AIR VALVE CONNECTOR

(76) Inventor: Morris Ostrowiecki, 5-10-20 Minami Aoyama, Minato-Ku, Tokyo (JP) 107-0062

( * ) Notice: Subject to any disclaimer, the term of this patent is extended or adjusted under 35 U.S.C. 154(b) by 447 days.

(21) Appl. No.: 10/253,637

(22) Filed: Sep. 25, 2002

(65) Prior Publication Data
US 2004/0055641 A1   Mar. 25, 2004

(51) Int. Cl.[7] .............................................. F16K 15/10
(52) U.S. Cl. ...................... 137/231; 137/223
(58) Field of Search .................. 137/223, 231

(56) References Cited

U.S. PATENT DOCUMENTS

| | | | | |
|---|---|---|---|---|
| 1,484,342 A | * | 2/1924 | Schweinert ................. | 137/231 |
| 1,498,175 A | * | 6/1924 | Kraft et al. .................. | 137/269 |
| 3,926,205 A | * | 12/1975 | Gourlet ........................ | 137/223 |
| 5,012,954 A | * | 5/1991 | Will ............................... | 222/5 |
| 6,260,572 B1 | * | 7/2001 | Wu ............................. | 137/231 |
| 6,276,391 B1 | * | 8/2001 | Wu ............................. | 137/223 |
| 6,279,599 B1 | * | 8/2001 | Chen .......................... | 137/228 |
| 6,314,985 B1 | * | 11/2001 | van der Blom ............. | 137/231 |

* cited by examiner

Primary Examiner—John Rivell

(57) ABSTRACT

The present invention discloses a universal air connector for an air pump which fits all three types of air valves presently found on air tires for bicycles. The universal air connector basically comprises an outer connector for connecting to an American type air valve and an inner connector for connecting to a British or French type of air valve, the inner connector slidingly fitting inside the outer connector in the axial directions thereof but not in the radial direction thereof. The universal connector further comprises means for activating an air inlet pin inside the American type air valve, and means for connecting an air hose to said connectors.

8 Claims, 41 Drawing Sheets

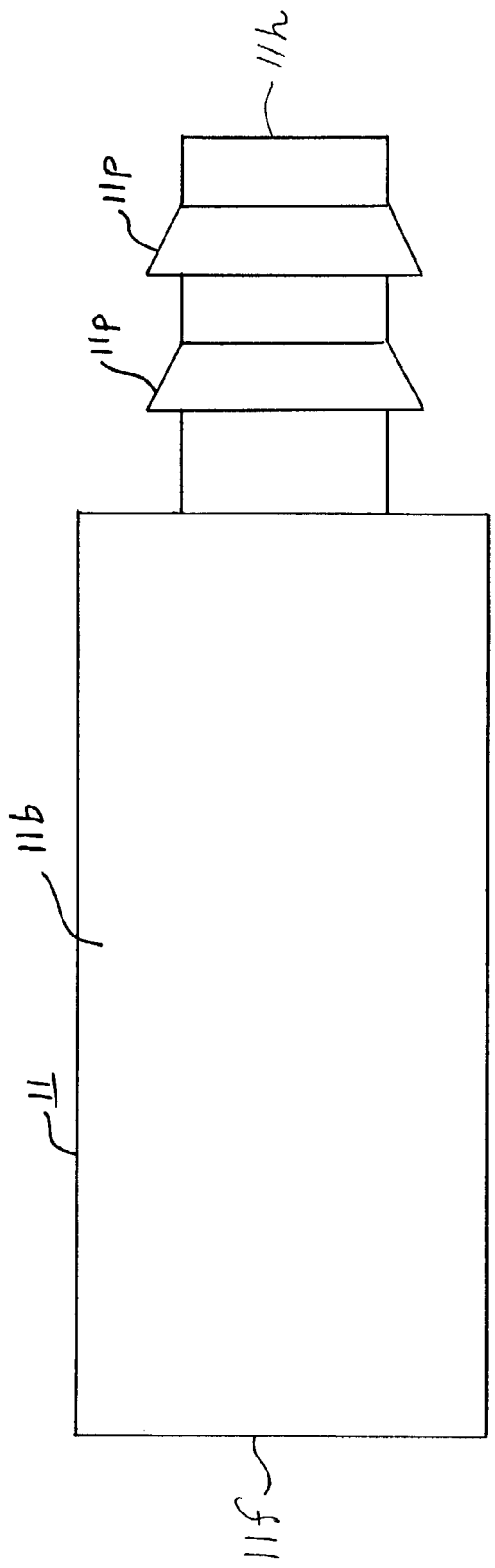
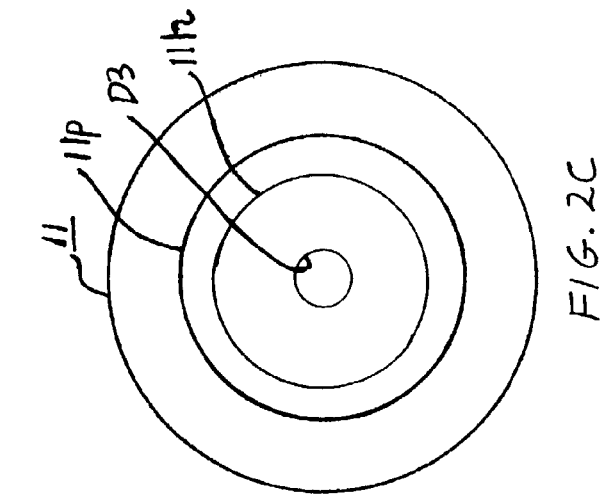
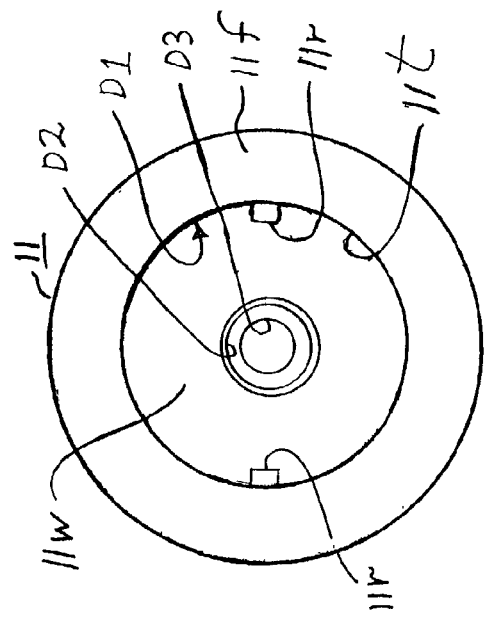
FIG. 2A
FIG. 2B
FIG. 2C

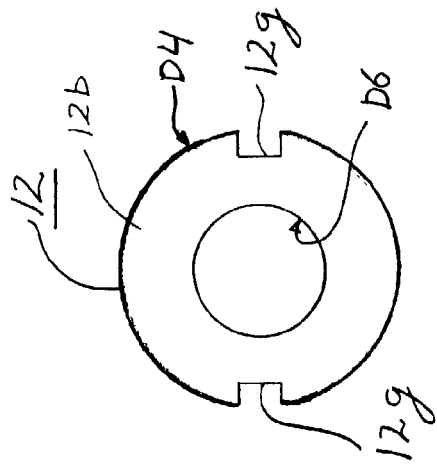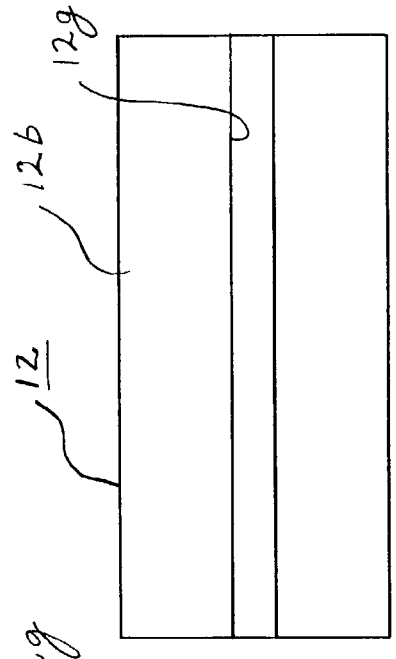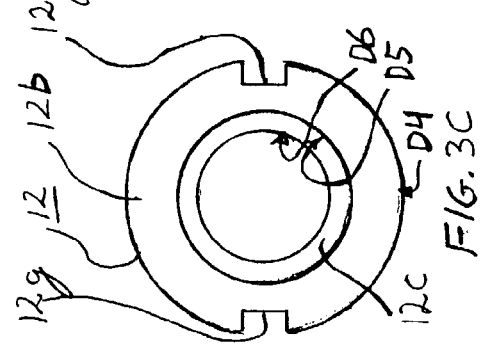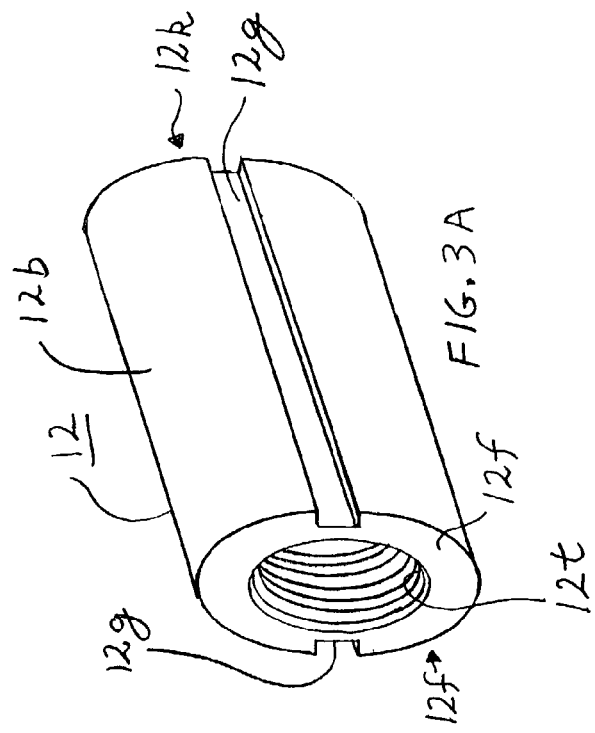

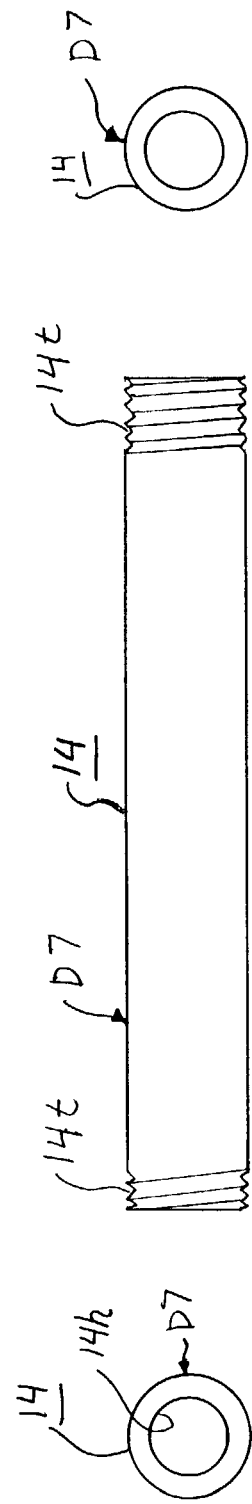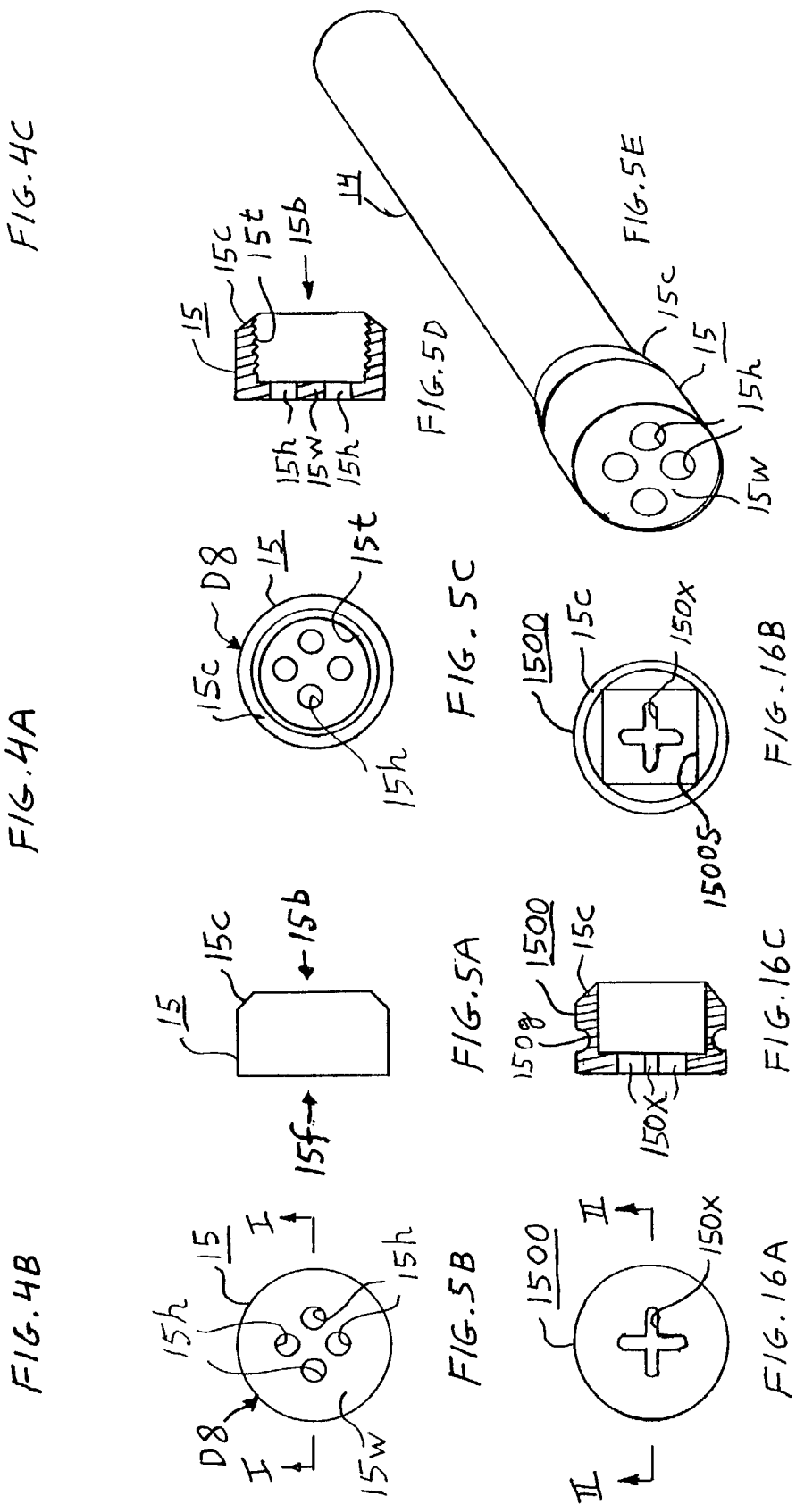

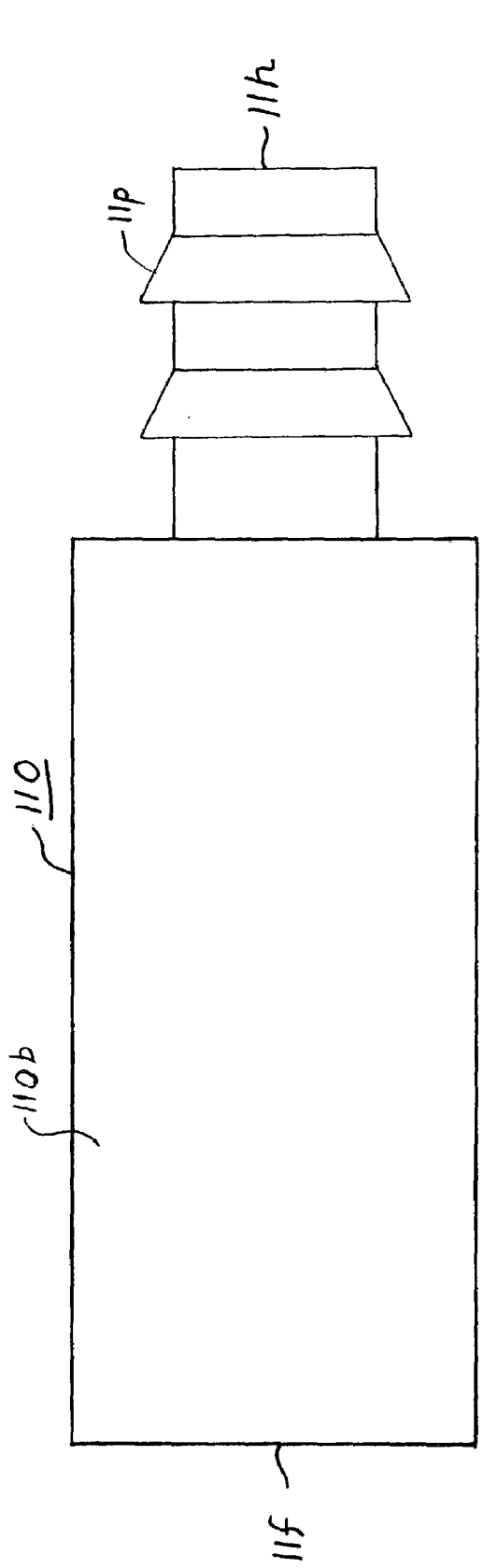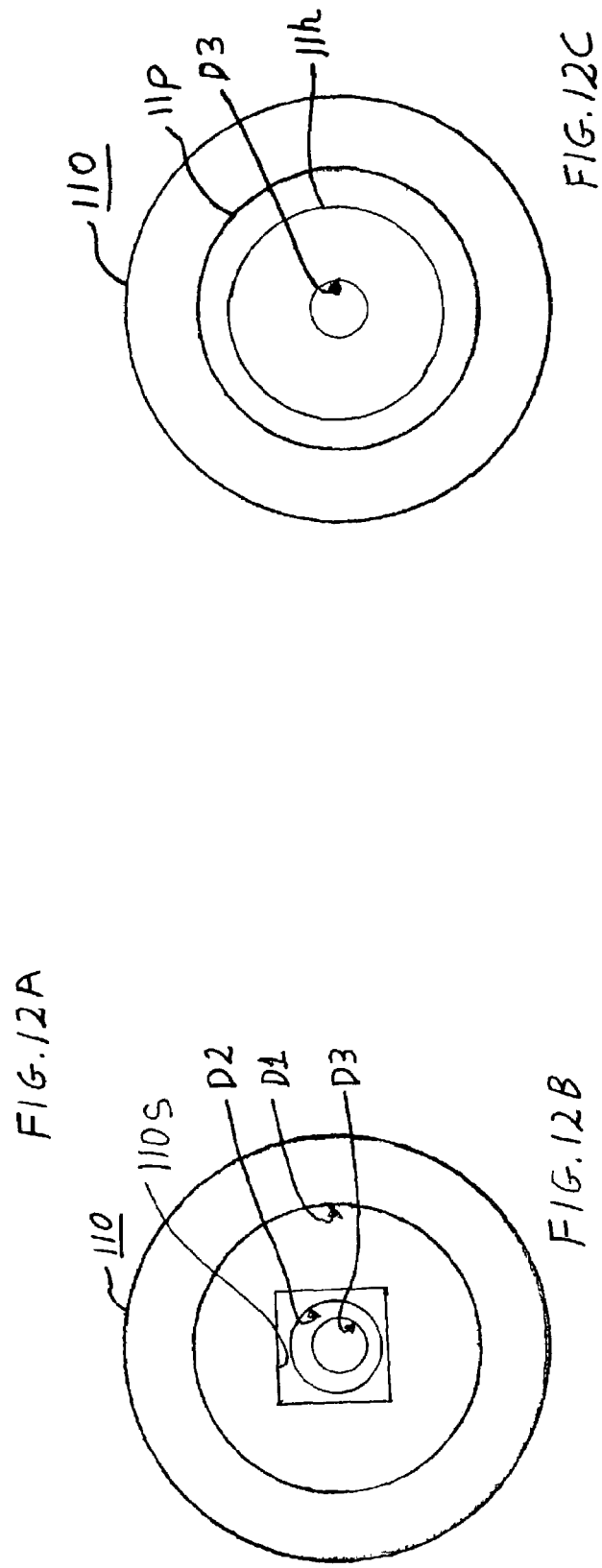

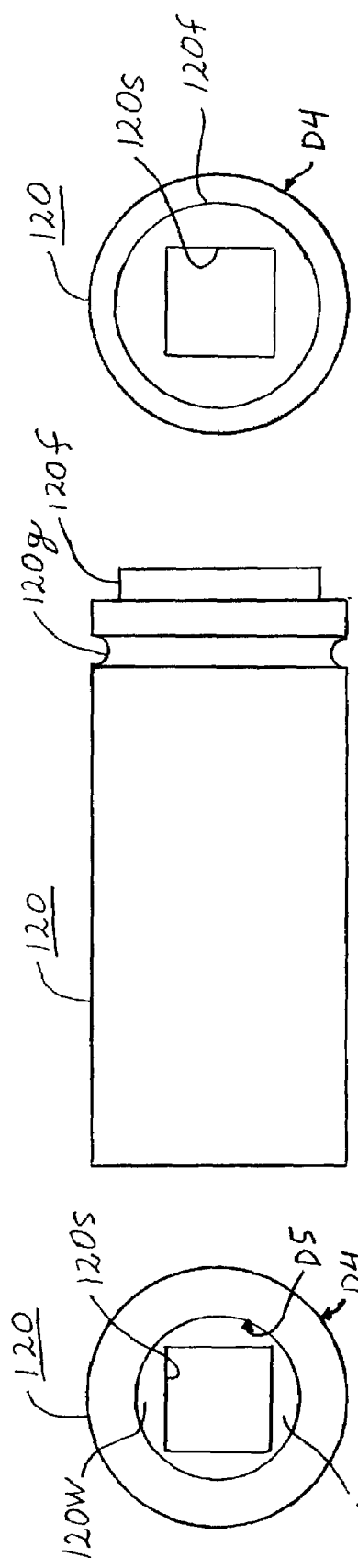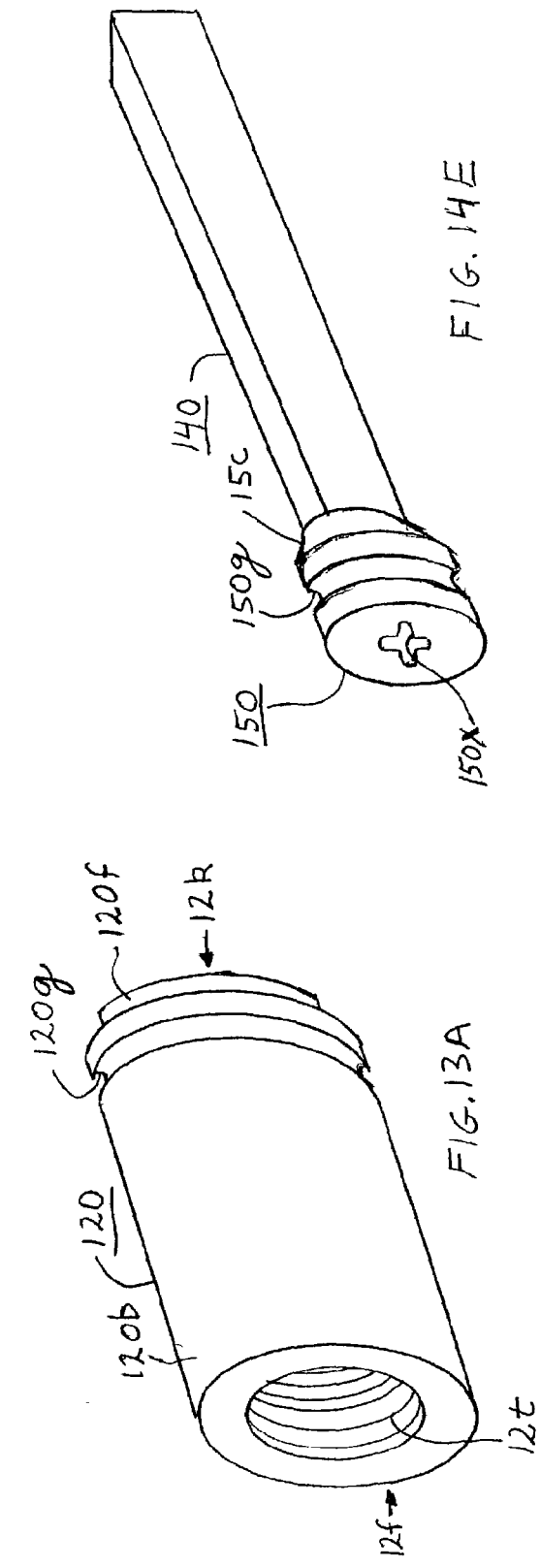

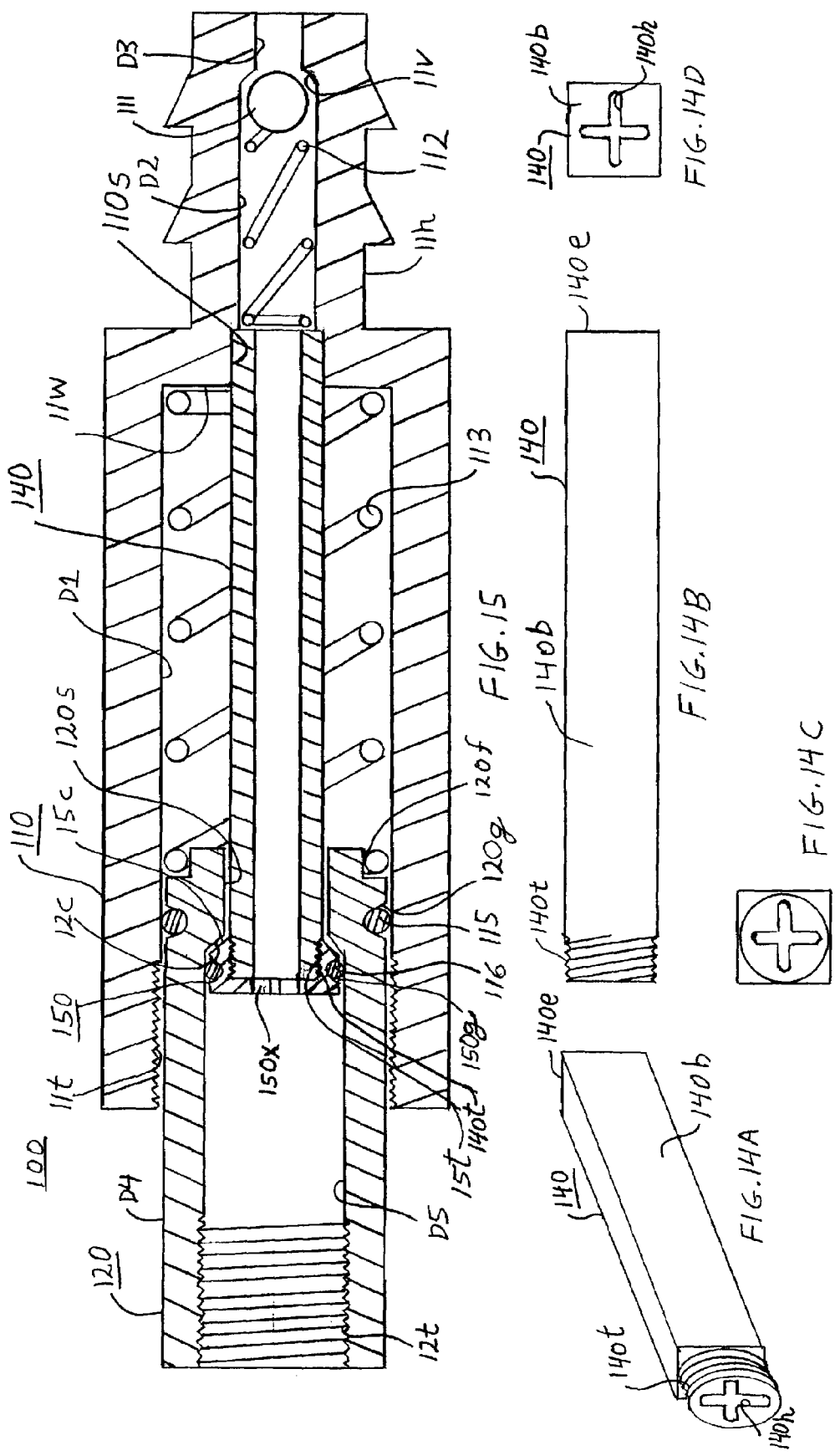

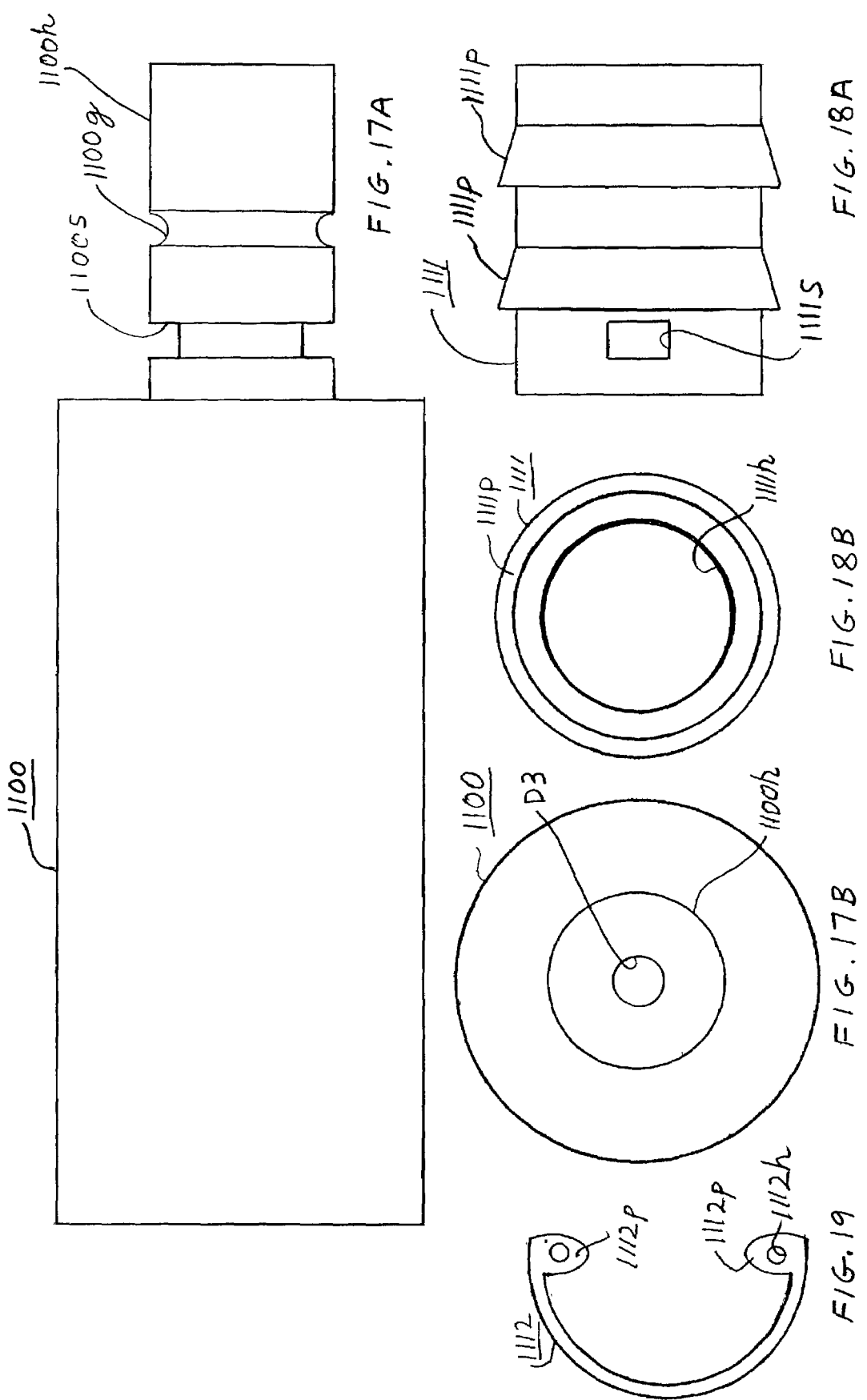

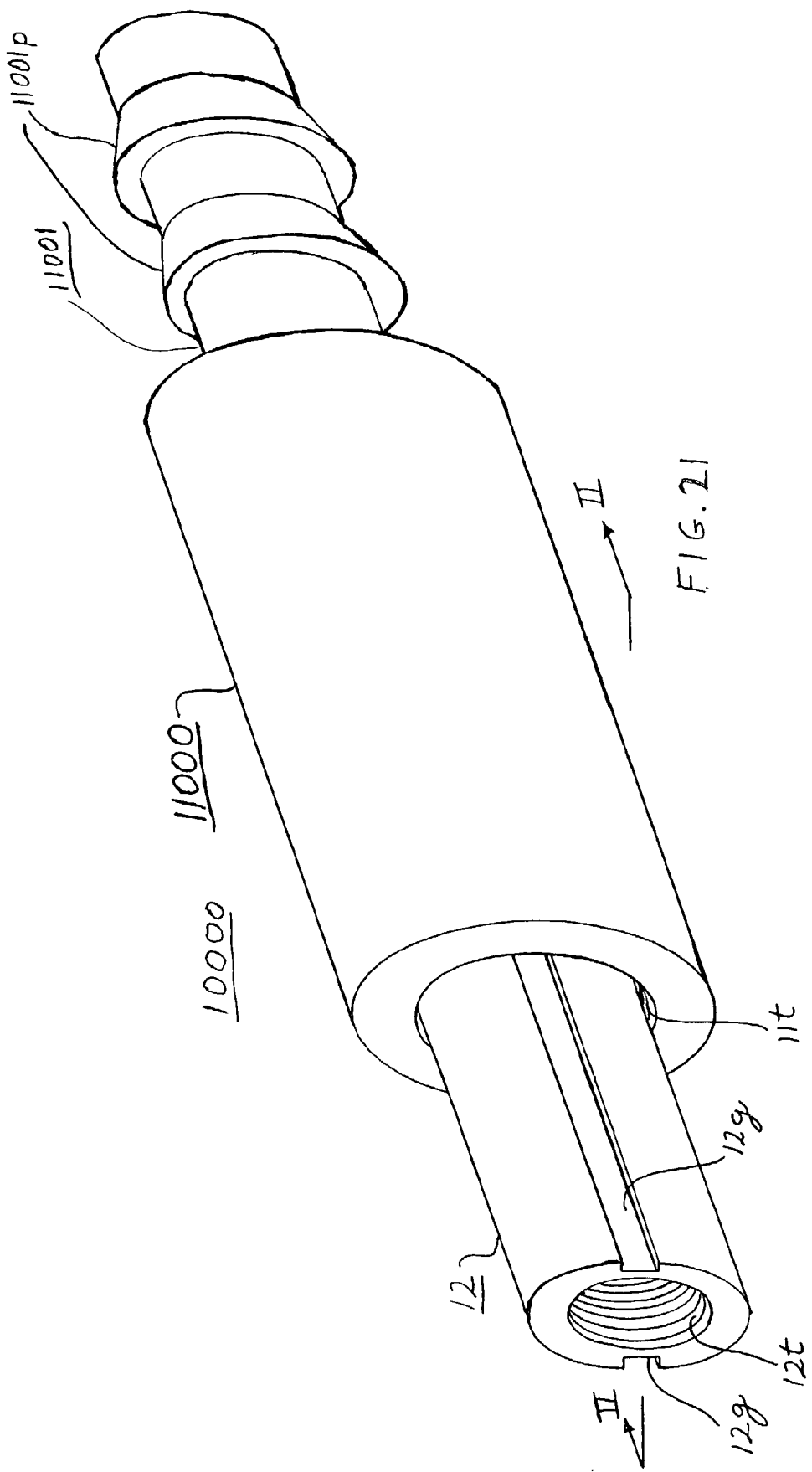

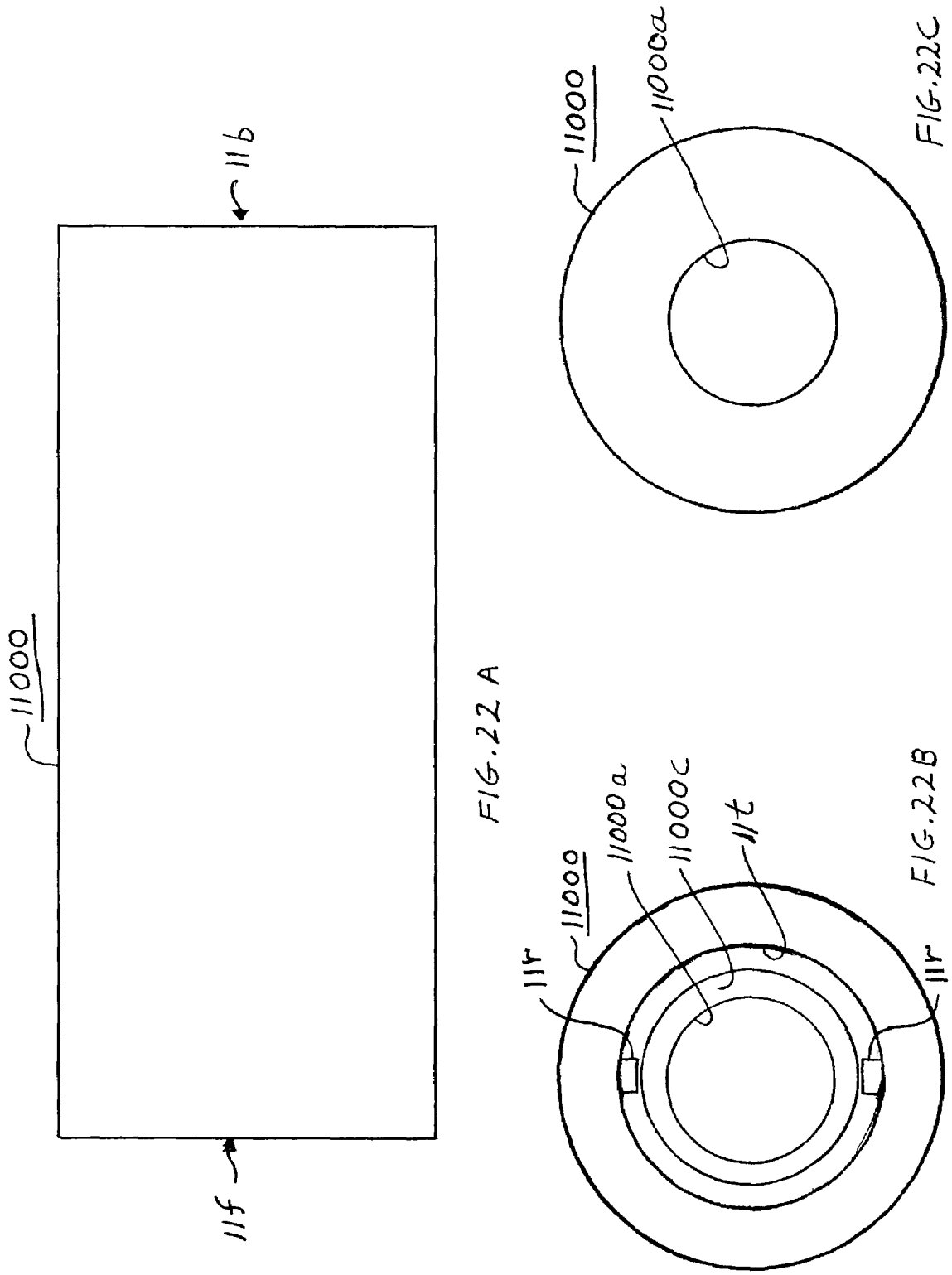

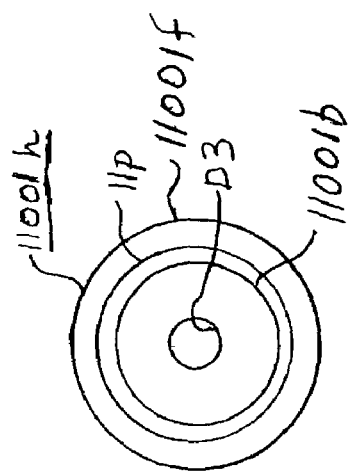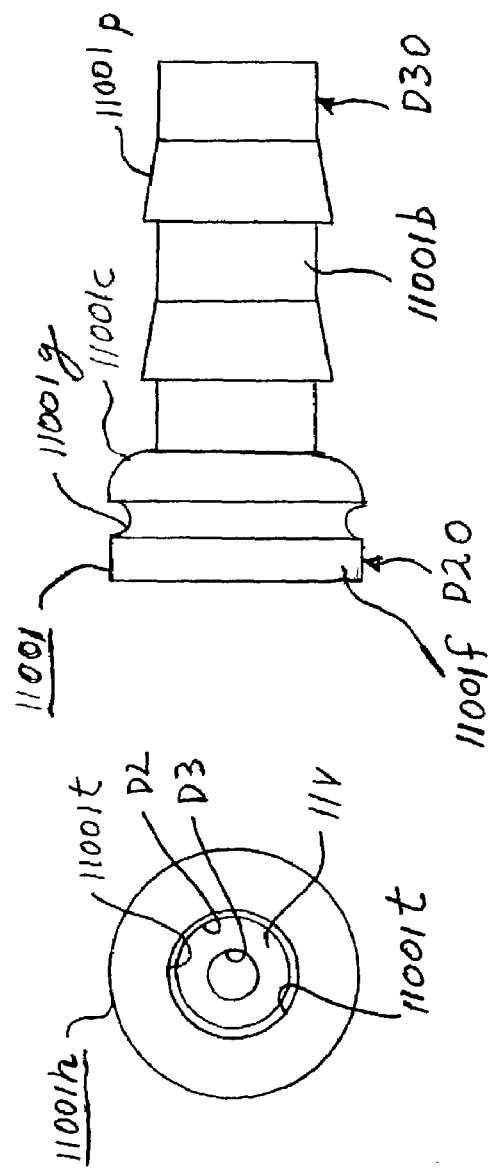

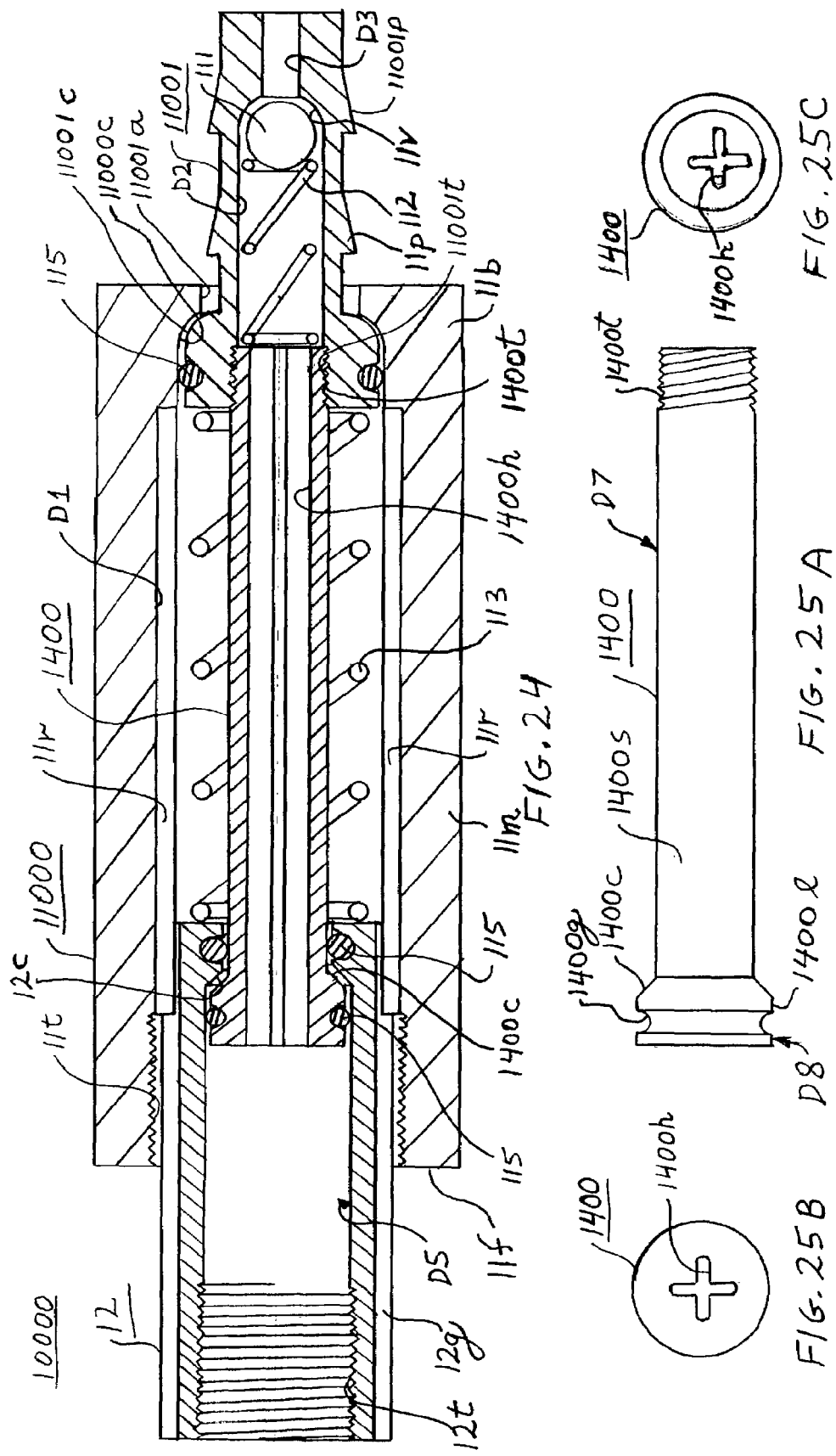

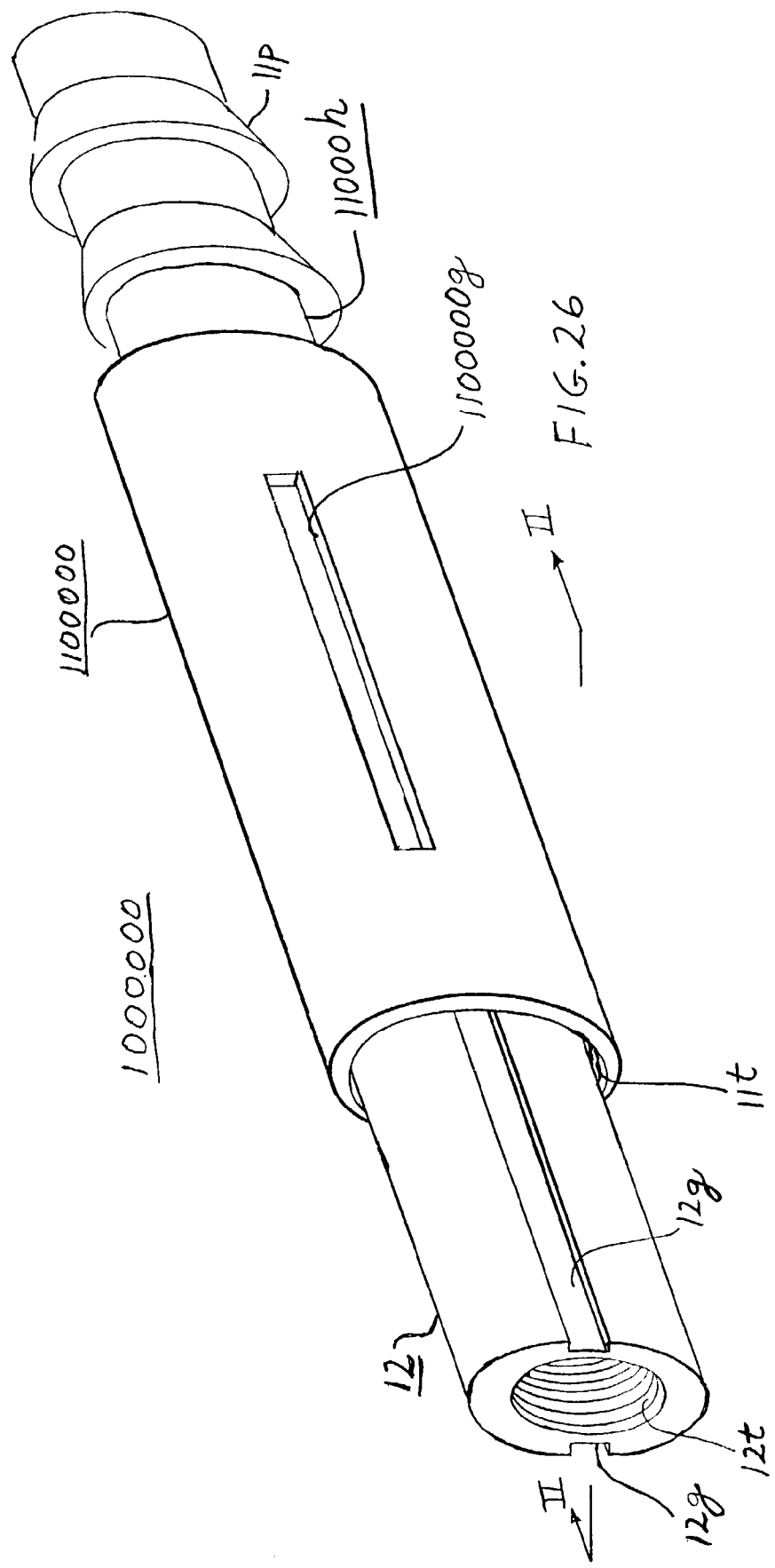

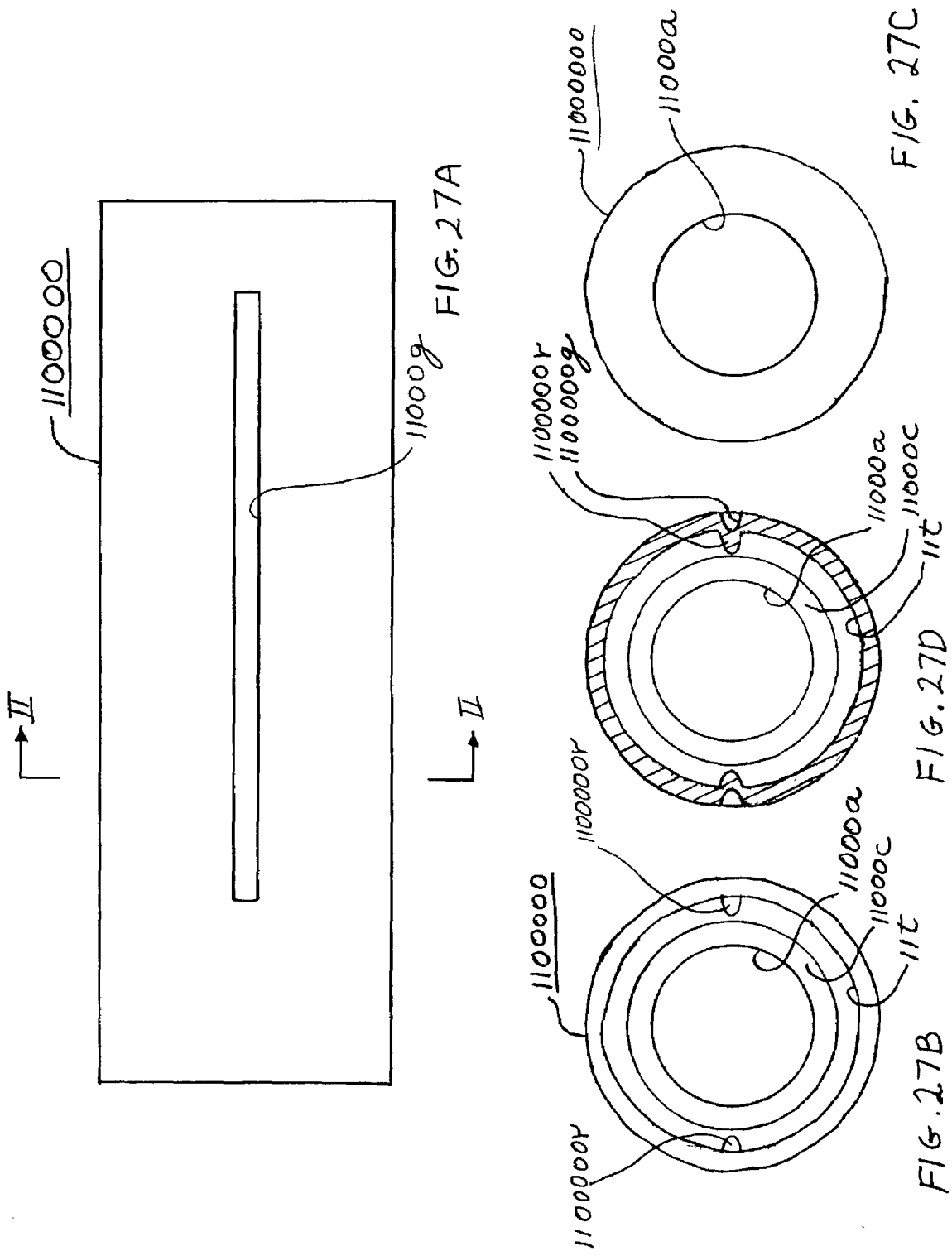

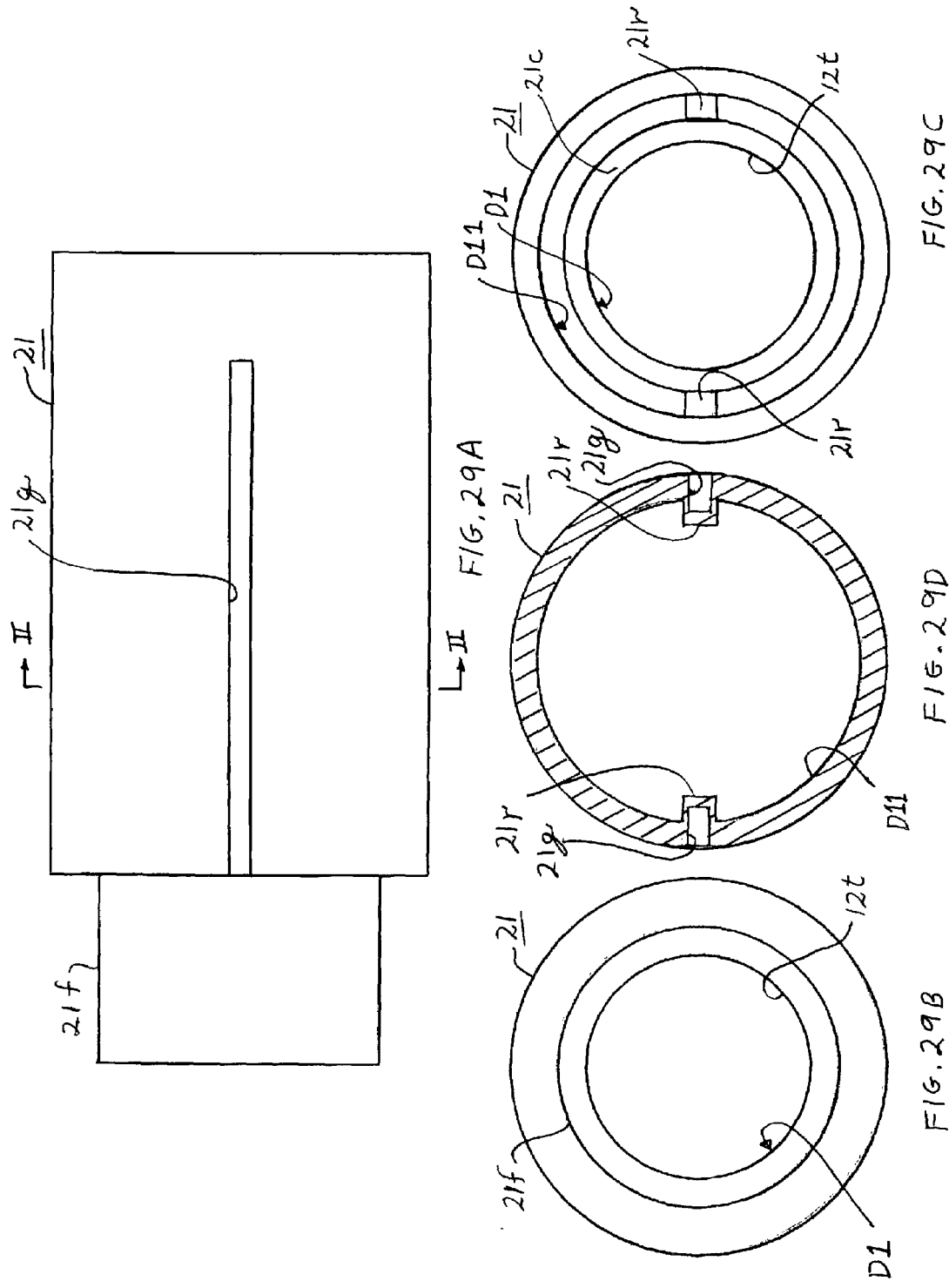

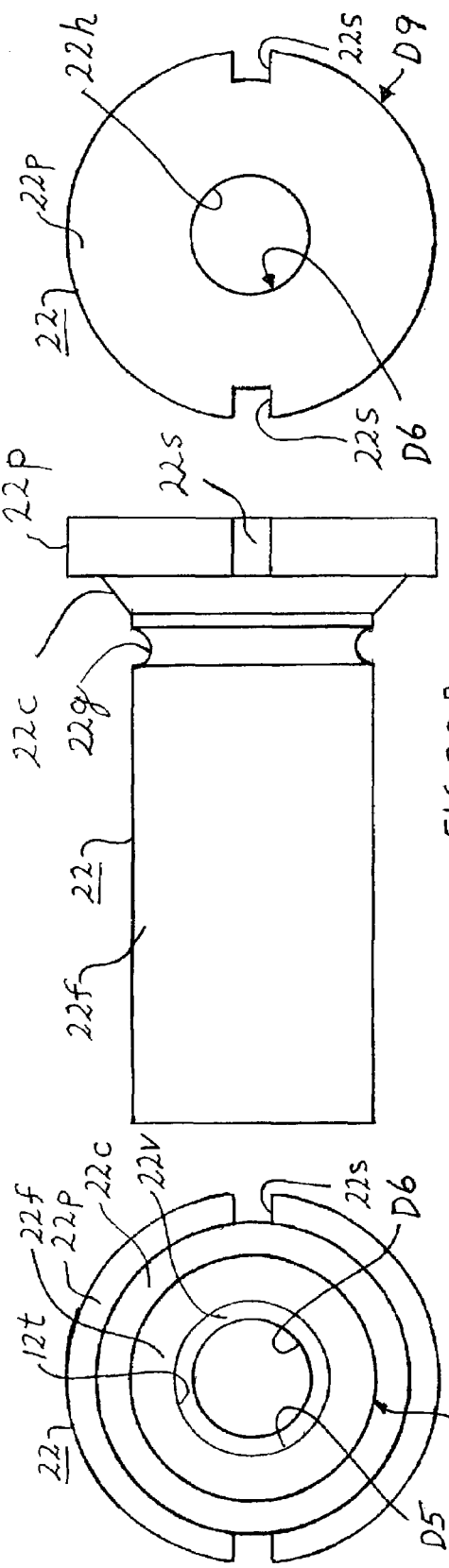

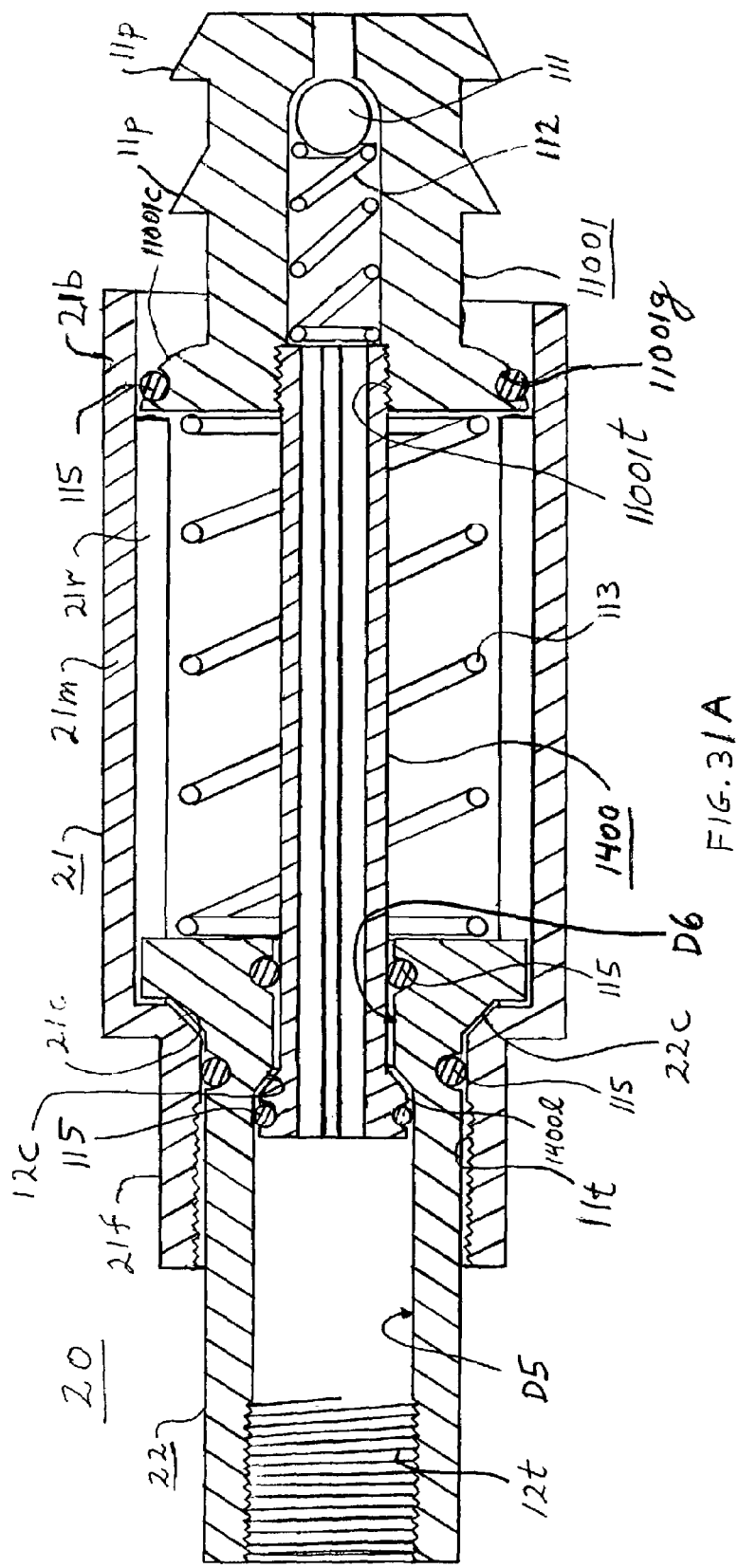

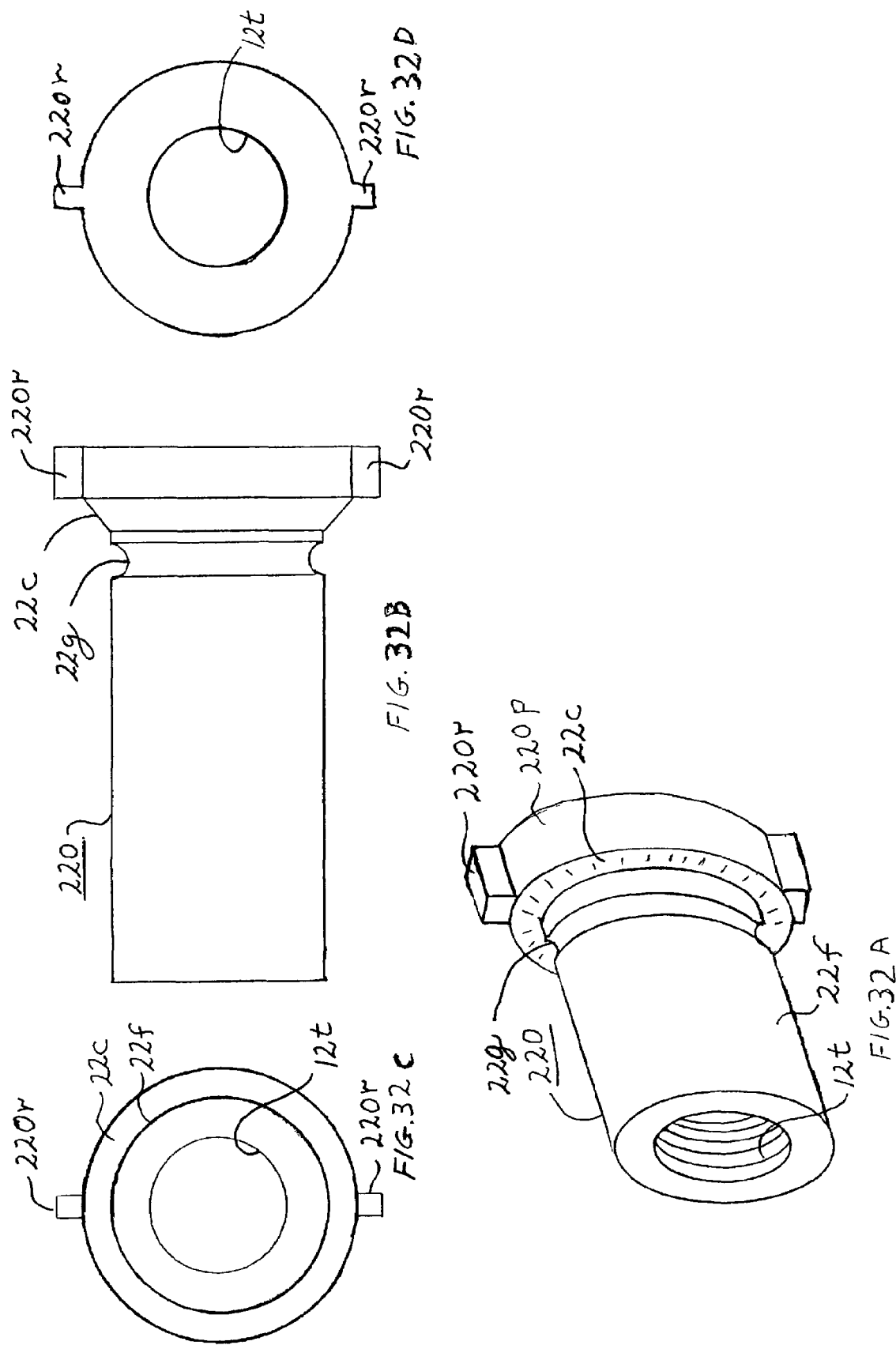

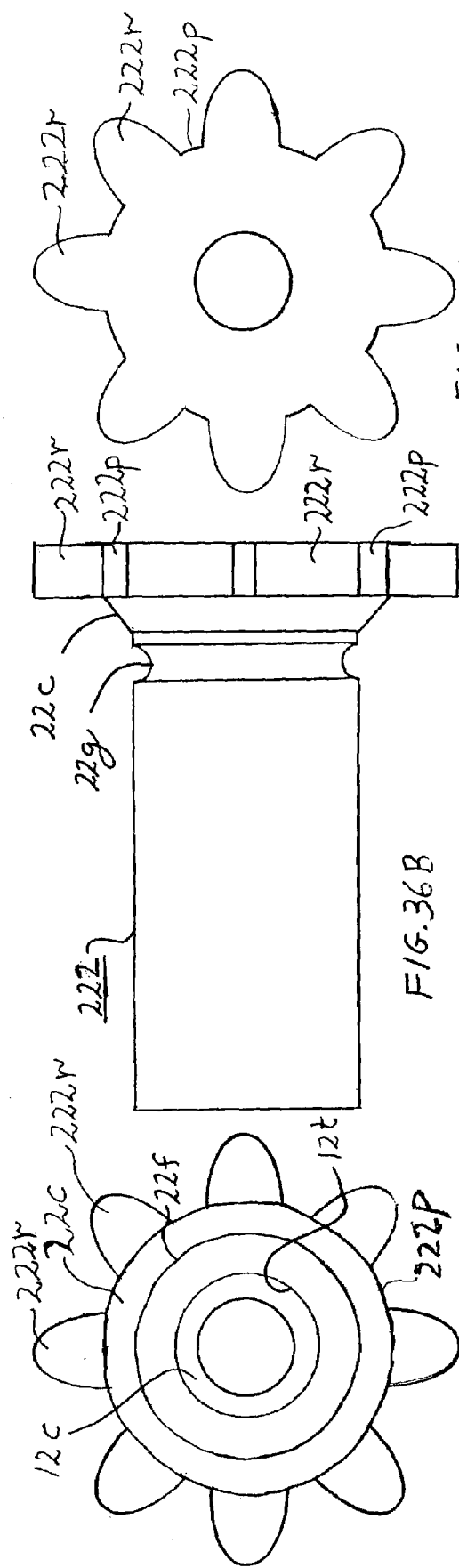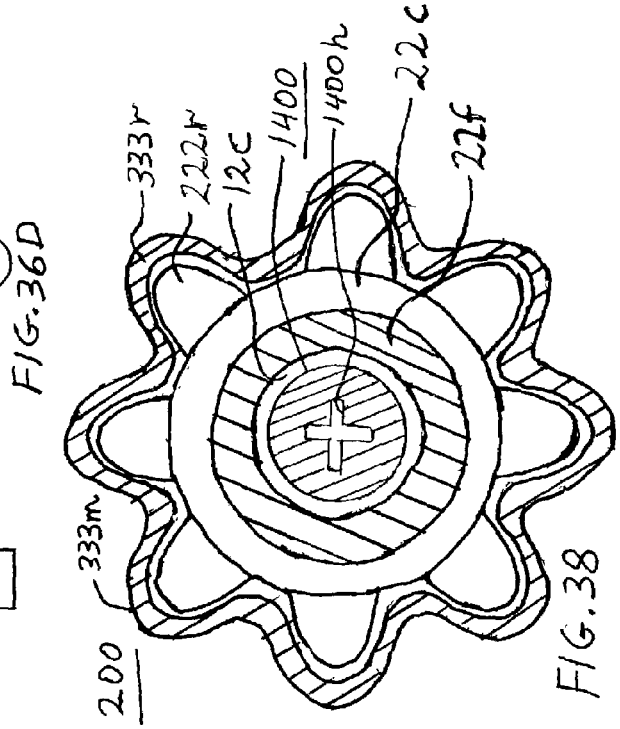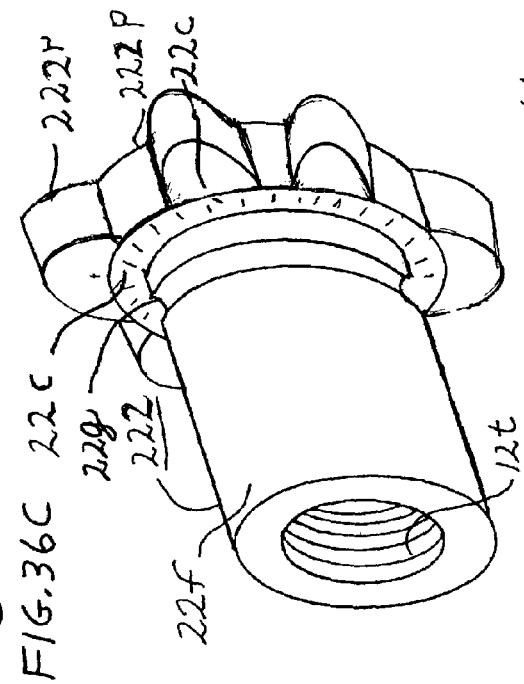

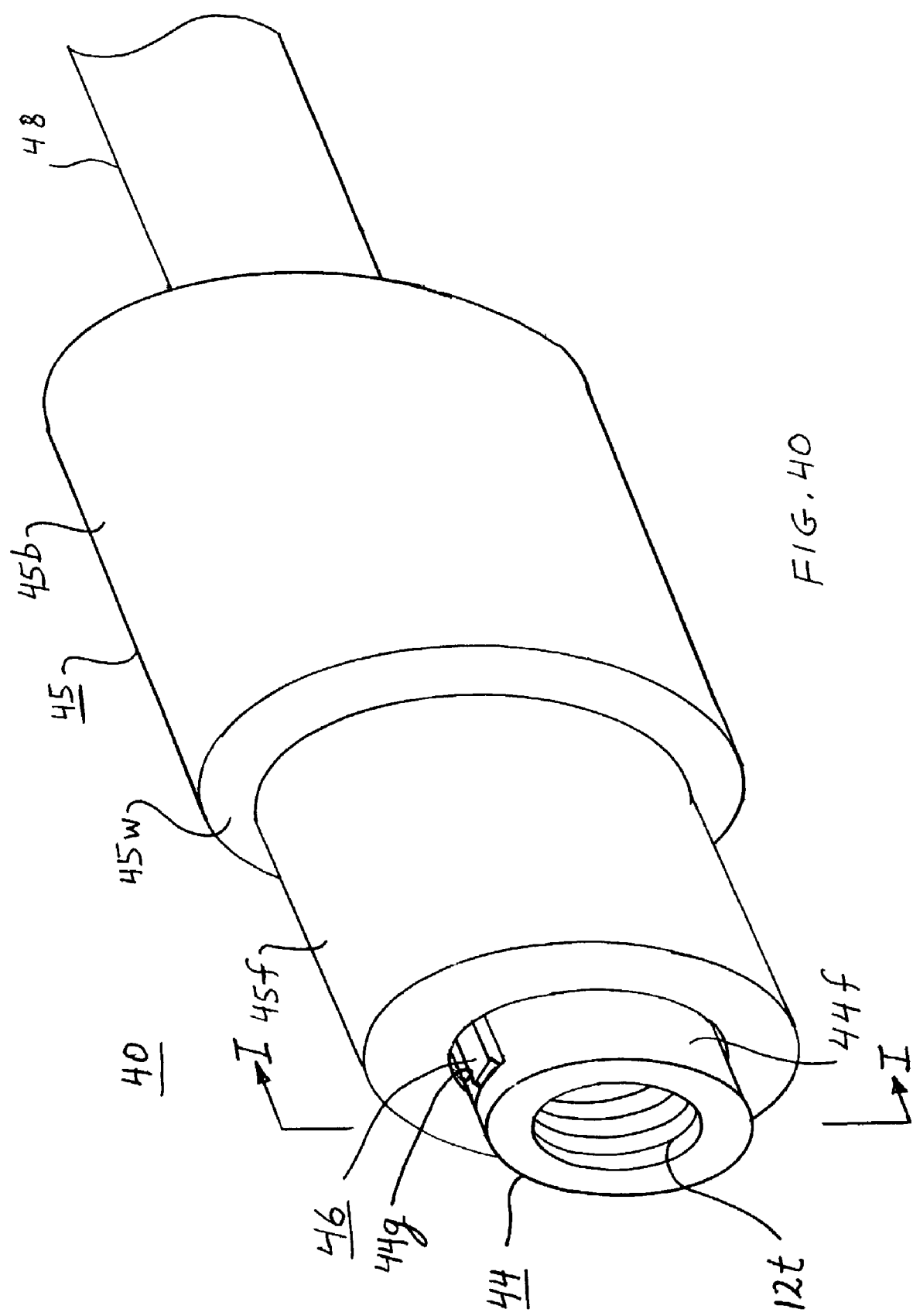

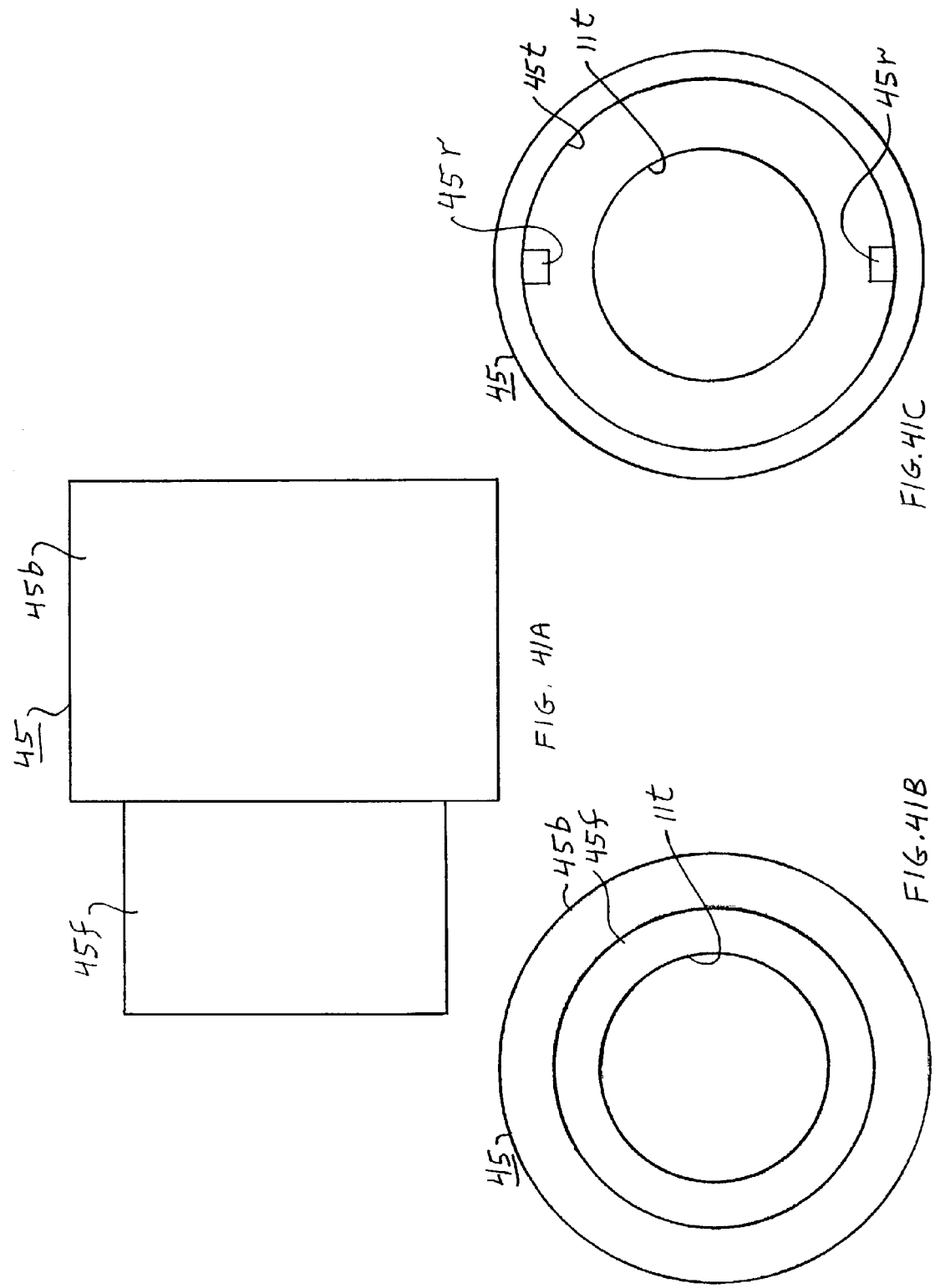

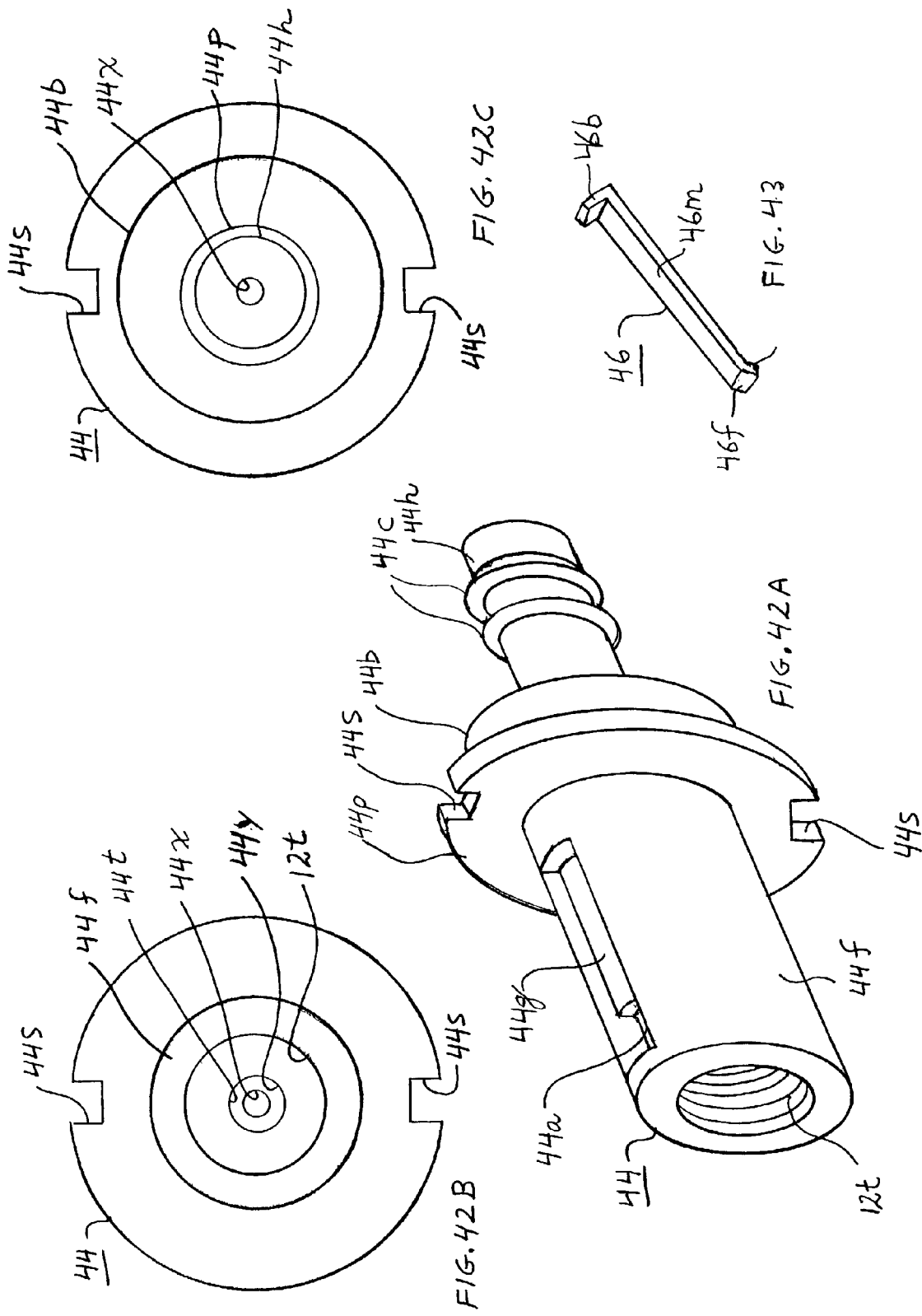

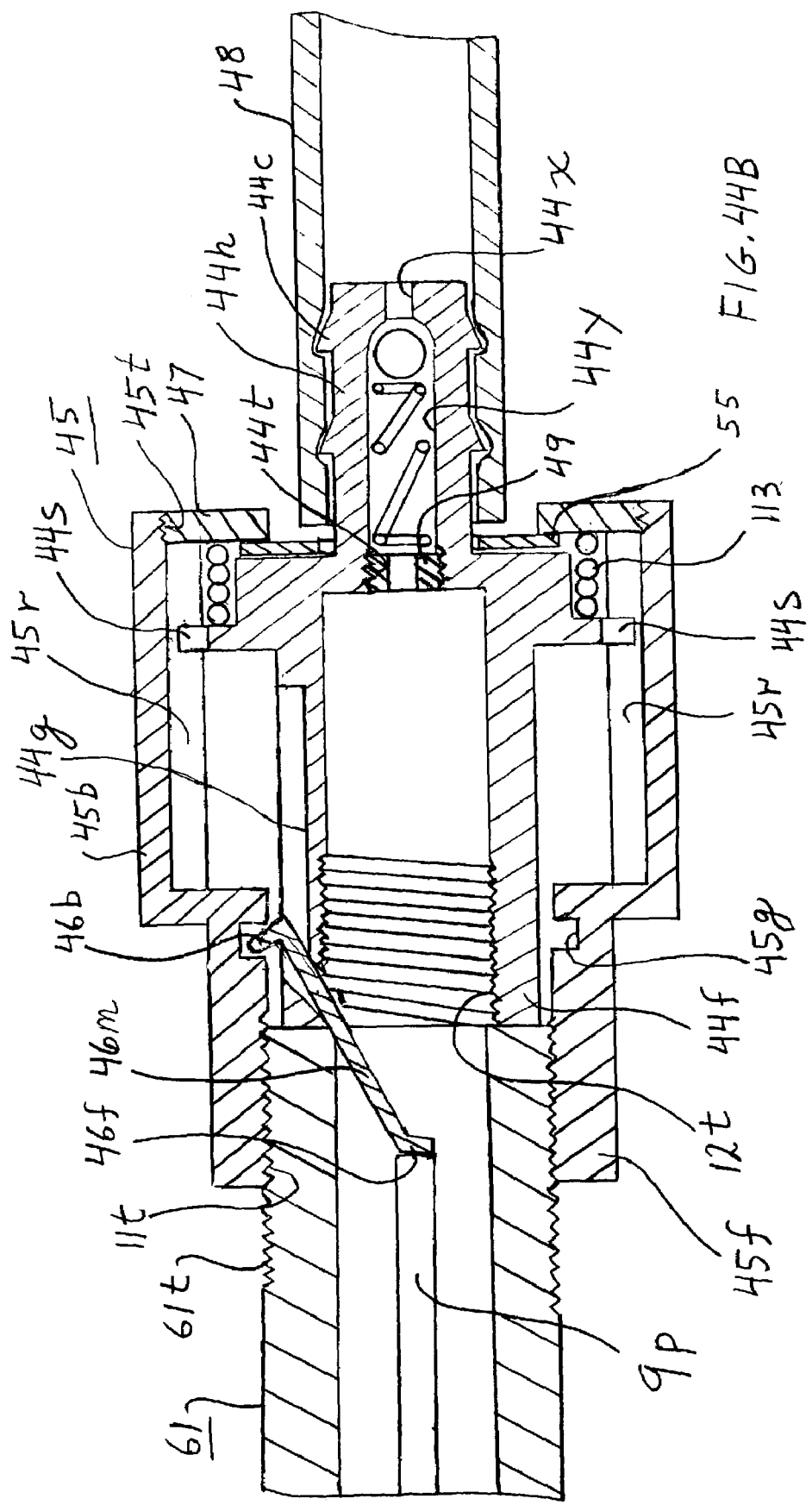

UNIVERSAL AIR VALVE CONNECTOR

BACKGROUND OF THE INVENTION

Presently, there are three types of bicycle air valves, the British type (also called Dunlop) air valve, the French type (also called Presta) air valve, and the American type (also called Schrader) air valve. To connect an air pump to these air valves, many connectors are presently available on the market but none of these products is truly universal. All these connectors require some complicated structure that involves many parts and are rather large and expensive to manufacture. Since these three types of air valves are different in size and shape as well as require different operations to allow air to be inserted therethrough, a simple and easy solution has eluded inventors.

These three types of air valves have certain parts thereof which are similar in size and operation to each other and other parts which are different in size and function from each other. The inventor of this invention was lucky enough to find one particular difference between these air valves that allowed for the realization of this invention. Namely, that the diameter between the American type Schrader air valve and the other two types of valves, namely, the British and French type air valves, is substantially different.

SUMMARY OF THE INVENTION

A major object of the present invention is to provide a "universal air valve connector" (hereinafter referred to as "universal connector" or "U connector" or "three in one connector" or "all mighty" or simply "connector") which fits all three types of air valves.

Another object of the present invention is to provide a simple and easy to use universal connector.

Another object of the present invention is to provide a universal connector which requires very few parts.

Another object of the present invention is to provide a universal connector which is very small.

Another object of the present invention is to provide a universal connector which is very light.

Another object of the present invention is to provide a universal connector which is very cheap to manufacture.

Another object of the present invention is to provide a universal connector which is easy to manufacture.

Another object of the present invention is to provide a universal connector which is very strong and durable.

These and other objects of the present invention will be elucidated by the following drawings and the corresponding description.

BRIEF DESCRIPTION OF THE DRAWINGS

FIG. 2A shows a side view of an outer connector 11 of the universal connector 10 shown in FIG. 1;

FIGS. 2B and 2C show a front view and a back view of the outer connector 11 shown in FIG. 2A;

FIG. 3A shows a perspective view of an inner connector 12 of the universal connector 10 of FIG. 1;

FIG. 3B shows a side view of the inner connector 12 shown in FIG. 3A;

FIGS. 3C and 3D show a front view and a back view of the inner connector 12 of FIG. 3A;

FIGS. 4A–4C show a side view, front view and back view of a cylindrical pin activation shaft 14 which is mounted inside the universal connector 10 of FIG. 1;

FIGS. 5A–5C show a side view, a front view and a back view of an end cap 15 which is mounted on the front extending end of the cylindrical pin activation shaft 14 according to the present invention;

FIG. 5D shows a side cross sectional view of the cap 15 at line I—I of FIG. 5B;

FIG. 5E shows a perspective view of the cap 15 mounted on the shaft 14;

FIG. 12A shows a side view of an outer connector 110 of the universal connector 100 shown in FIG. 11;

FIGS. 12B and 12C show a front view and a back view of the outer connector 110 shown in FIG. 12A;

FIG. 13A shows a perspective view of an inner connector 120 of the universal connector 100 of FIG. 11;

FIG. 13B shows a side view of the inner connector 120 shown in FIG. 13A;

FIGS. 13C and 13D show a front view and a back view of the inner connector 120 shown in FIG. 13A;

FIG. 14A shows a perspective view of a pin activation shaft 140 which is mounted inside the universal connector 100 of FIG. 11;

FIGS. 14B–14D show a side view, front view and back view of the cylindrical pin activation shaft 140 shown in FIG. 14A;

FIG. 14E shows a perspective view of the shaft 140 having an end cap 150 screwed onto the thread 140t thereof;

FIG. 15 shows a side cross sectional view of the universal connector 100 at line I—I of FIG. 11;

FIGS. 16A and 16B show a front view and a back view of an end cap 1500 according to another embodiment of the present invention;

Figure 20:
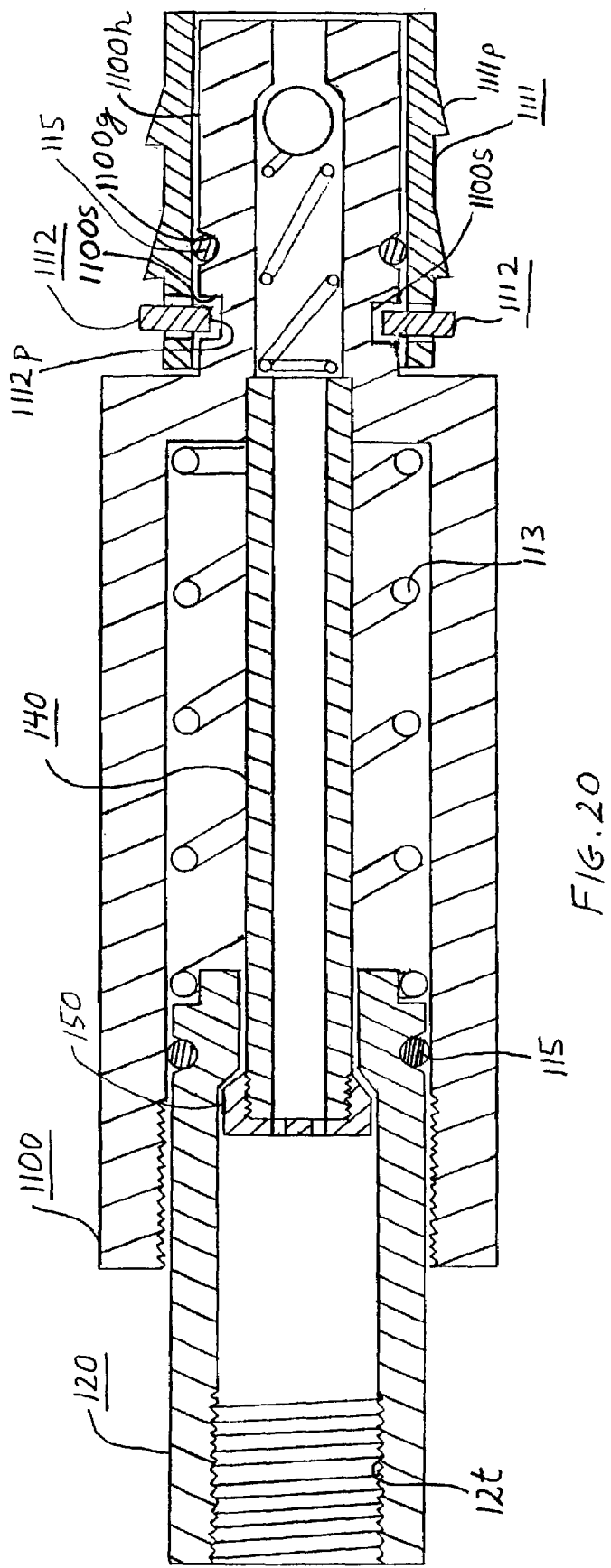

Numeral 16C shows a cross sectional view of the end cap 1500 at line II—II in FIG. 16A;

FIG. 17A shows a side view of an outer connector 1100 according to another embodiment of the present invention;

FIG. 17b shows a back view of the outer connector of FIG. 17A;

FIGS. 18A and 18B show a side view and front or back view of an air hose mounting portion 1111 according to the present invention;

FIG. 19 shows a side view of a resilient locking ring 1112 for locking the air hose mounting portion 1111 to the air hose mounting section 1100th in the axial direction while allowing them to swivel with respect to each in the radial direction according to the present invention;

FIG. 20 shows a side cross sectional view of the mounting portion 1111 locked with an air hose mounting section 1100*th* of the outer connector 1100 by the locking ring 1112 according to the present invention;

FIG. 21 shows a perspective view of a universal connector 10000 according to another embodiment of the present invention;

FIGS. 22A, 22B and 22C show a side view, a front view and a back view of an outer connector 11000 of the universal connector 10000 of FIG. 21;

FIGS. 23A, 23B and 23C show a side view, a front view and a back view of an air hose mounting portion 11001 of the universal connector 10000 of FIG. 21;

FIG. 24 shows a side cross sectional view of the universal connector 10000 at line II—II in FIG. 21;

FIGS. 25A, 25B and 25C show a side view a front view and a back view of an activation shaft 1400 of the universal connector 10000 of FIG. 21 according to another embodiment of the present invention;

FIG. 26 shows a perspective view of a universal connector 1000000 according to another embodiment of the present invention;

FIGS. 27A, 27B and 27C show a side view, a front view and a back view of an outer connector 1100000 of the universal connector 1000000 of FIG. 26;

FIG. 27D shows a cross sectional view at line II—II of FIG. 27A.

Figure 28:
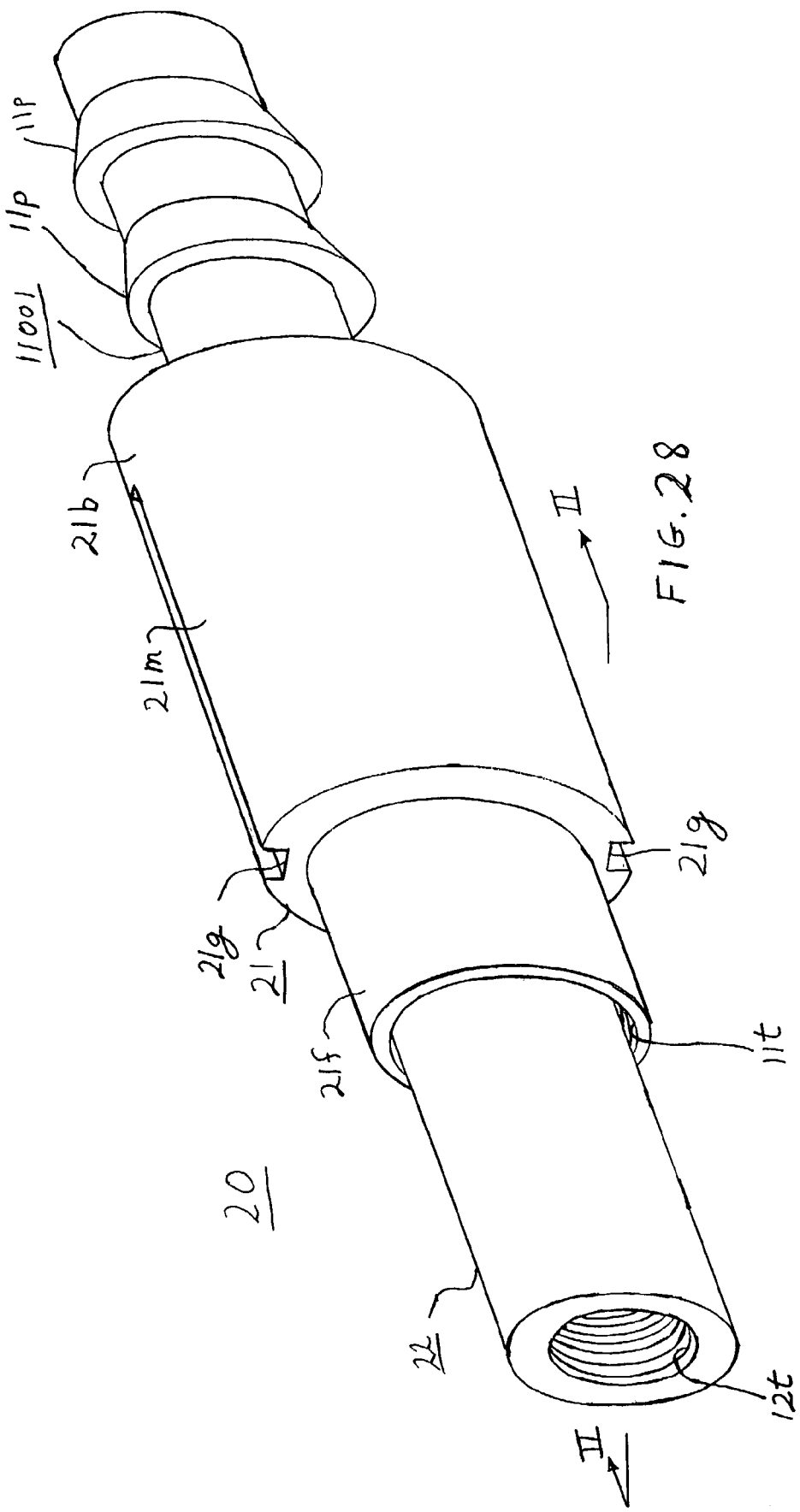
Figure 31B:
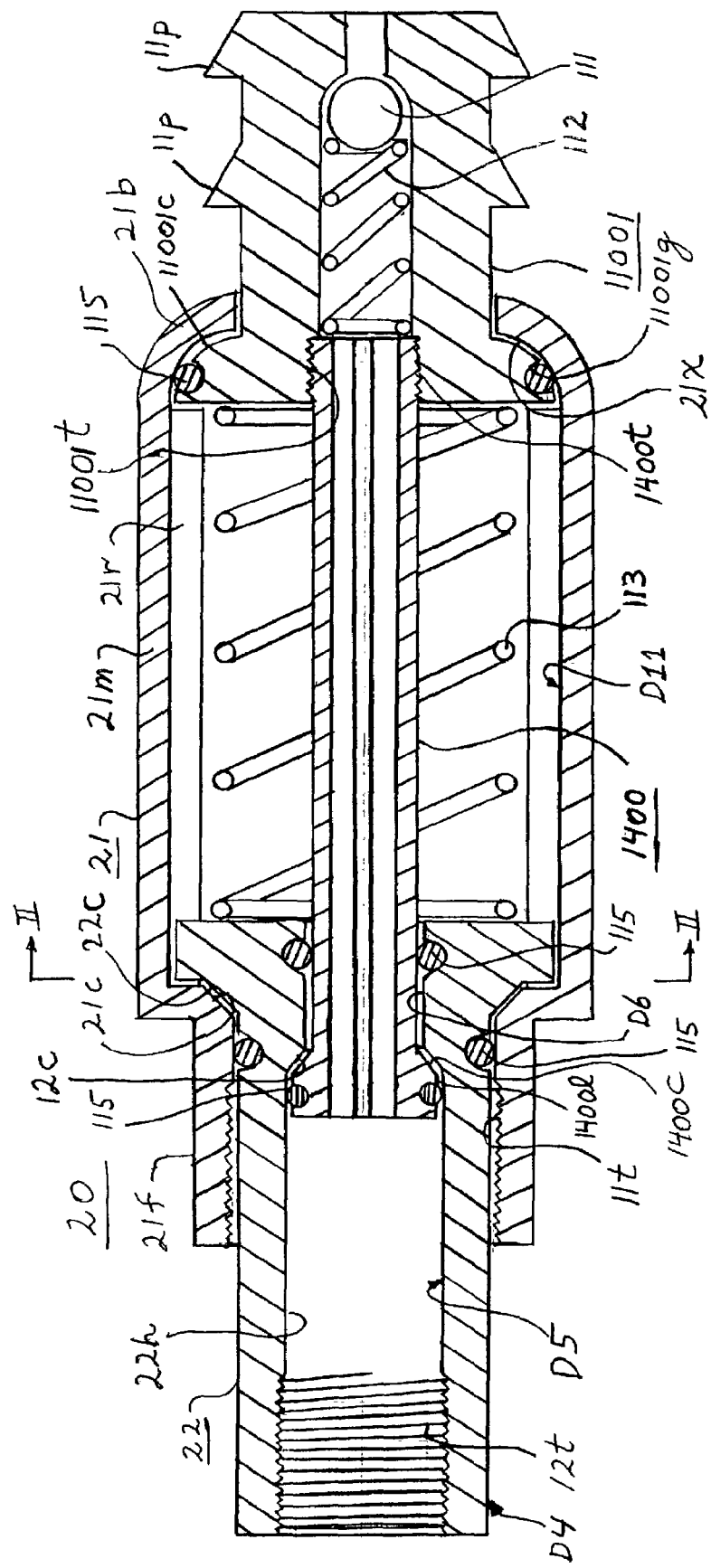
Figure 33:
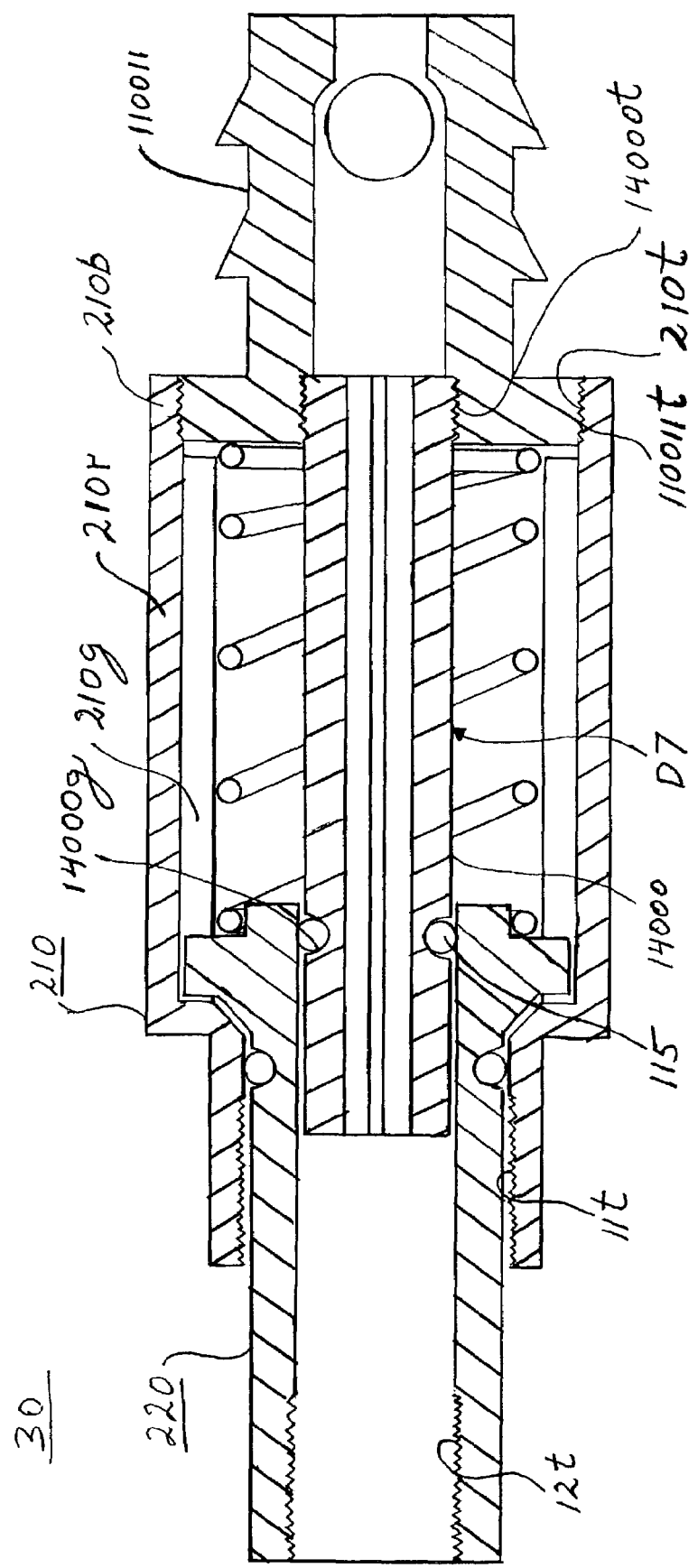

FIG. 28 shows a perspective view of a universal connector 20 according to another embodiment of the present invention;

FIGS. 29A, 29B and 29C show a side view, a front view and a back view of an outer connector 21 of the universal connector 20 of FIG. 28;

FIG. 29D shows a cross sectional view of the outer connector 21 at line II—II of FIG. 29A;

FIG. 30A shows a perspective view of an inner connector 22 of the universal connector 20 of FIG. 28;

FIGS. 30B, 30C and 30D show a side view, a front view and a back view of the inner connector 22;

FIGS. 31A and 31B shows a side cross sectional view of the universal connector 20 in a semi assembled state and in an assembled state, respectively;

FIG. 32A shows a perspective view of an inner connector 220 having a pair of ridges 220*r* instead of the slots 22*s* according to another embodiment of the present invention;

FIGS. 32B, 32C and 32D show a side view, a front view and an end view of the inner connector 220 of FIG. 32A;

FIG. 33 shows a side cross sectional view of a universal connector 30 according to another embodiment of the present invention.

Figure 34:
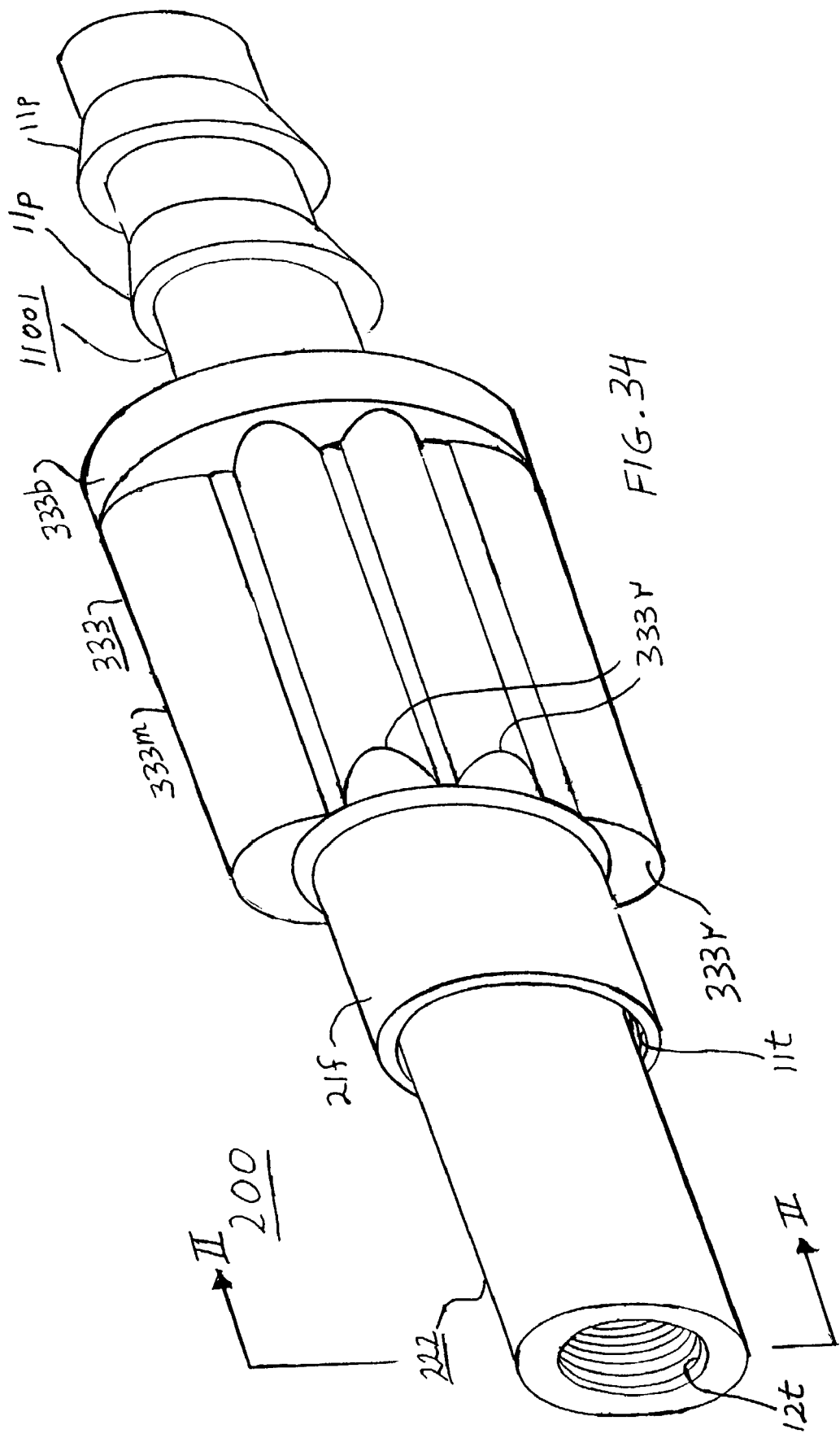
Figure 35A:
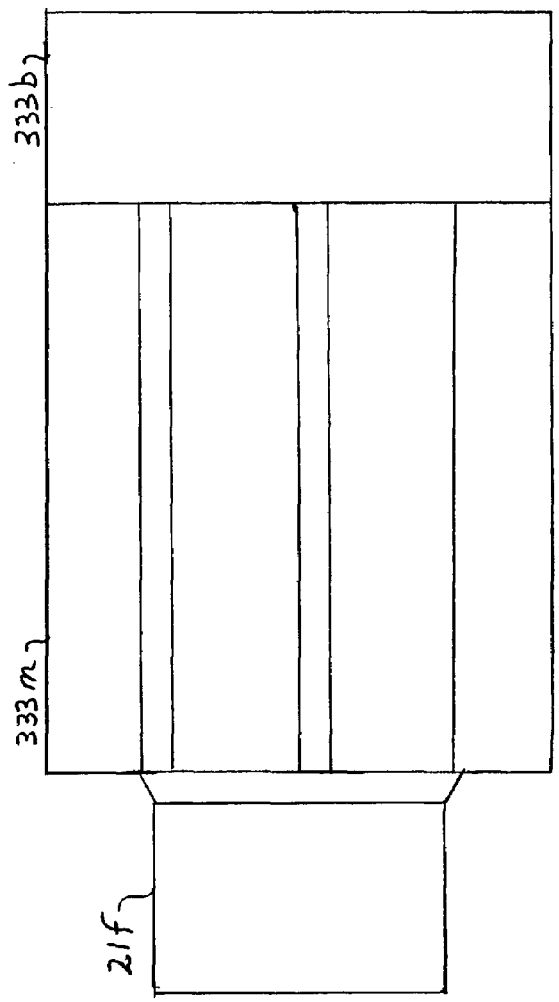
Figure 35C:
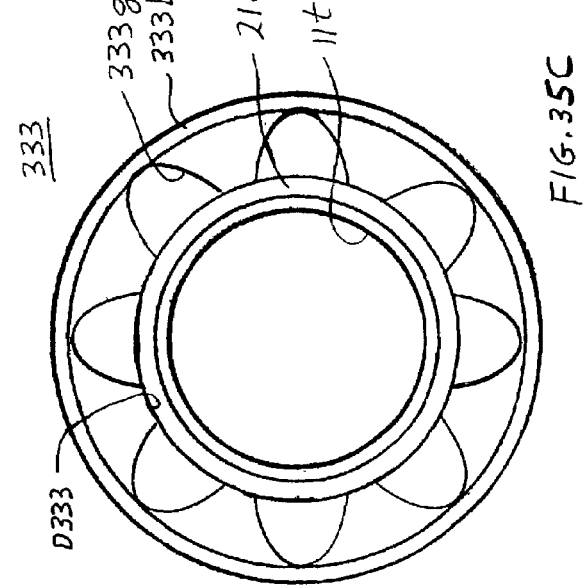
Figure 35B:
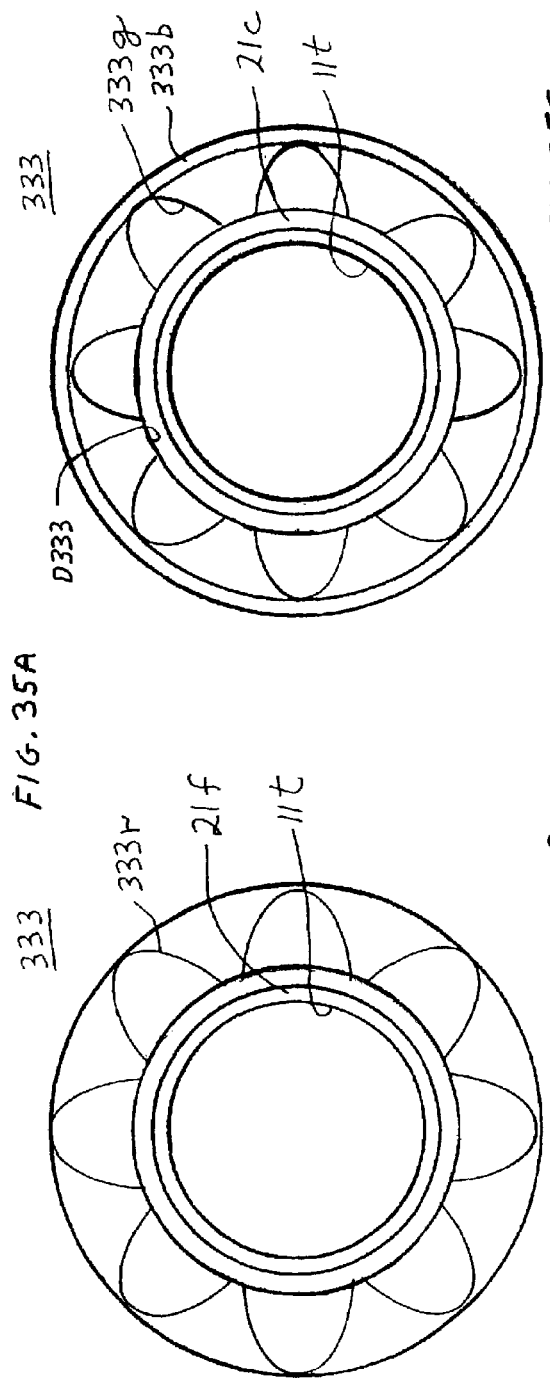
Figure 37:
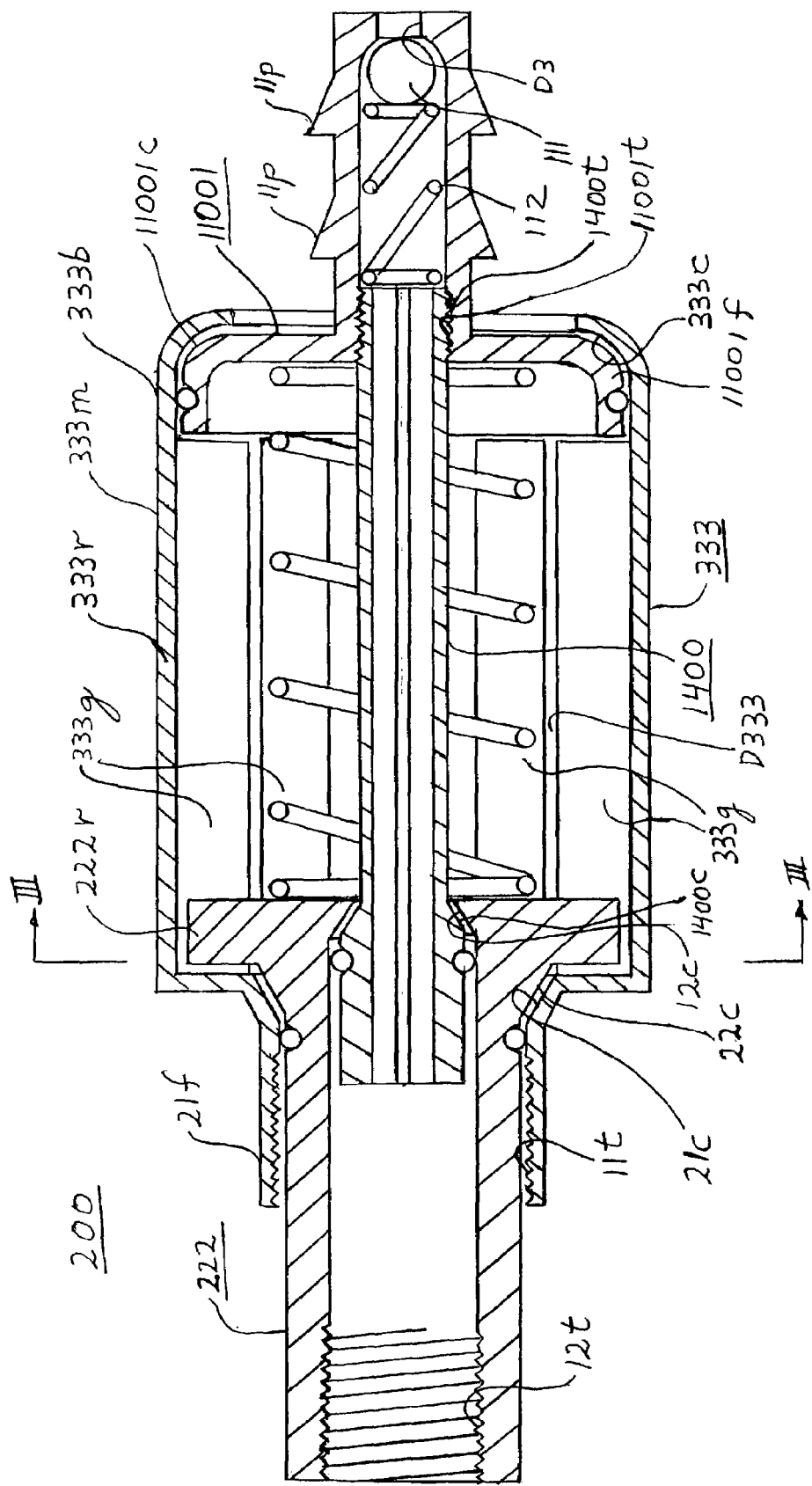
Figure 39:
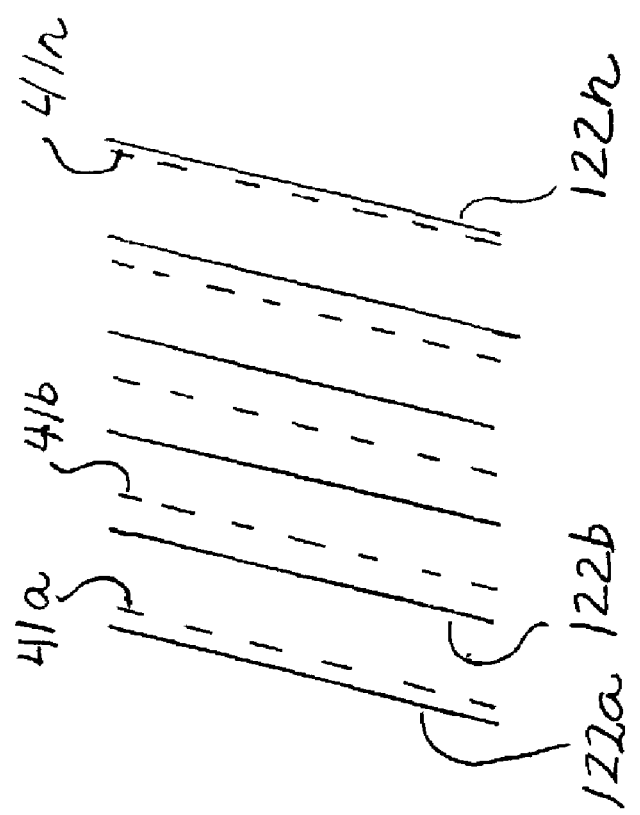
Figure 38:
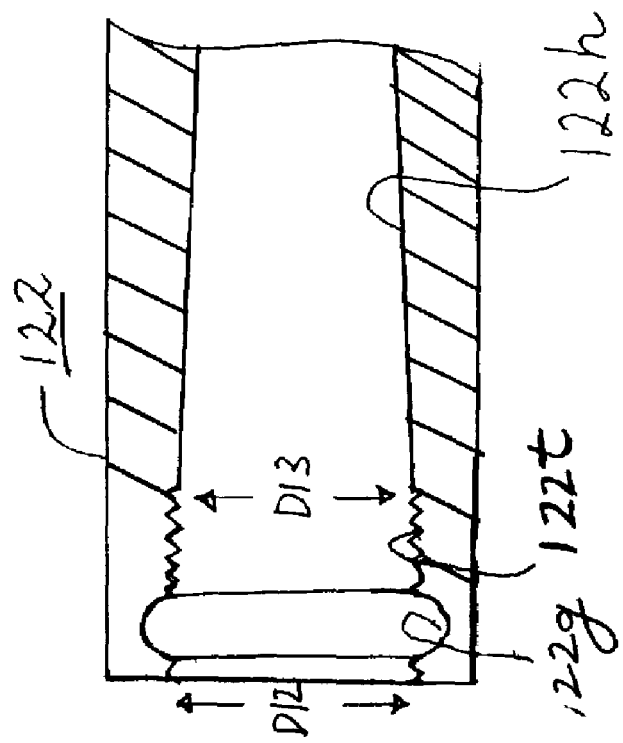
Figure 44A:
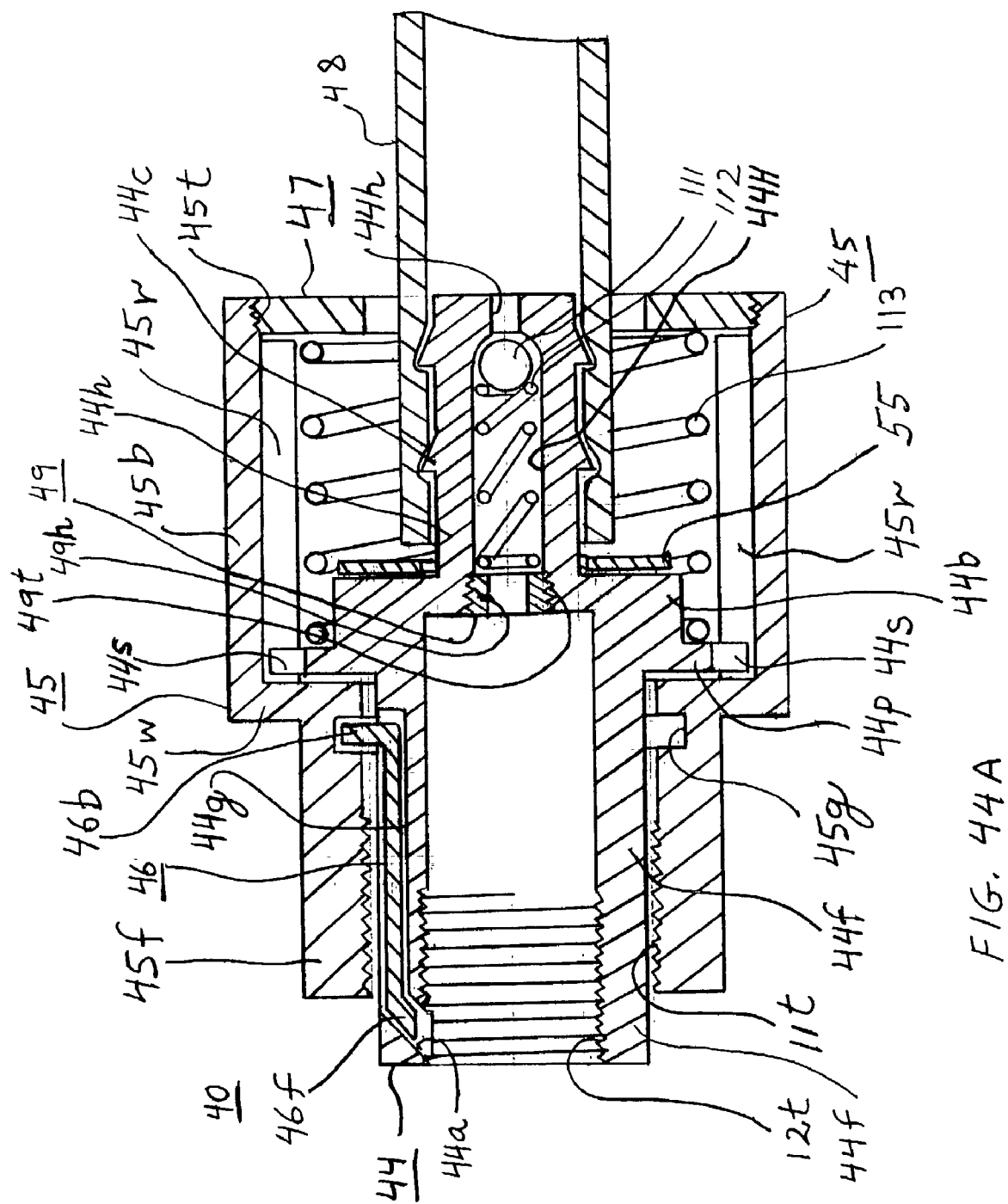

FIG. 34 shows a perspective view of a universal connector 200 according to another embodiment of the present invention;

FIGS. 35A, 35B and 35C show a side view, a front view and a back view of an outer connector 333 of the universal connector 200 of FIG. 34;

FIG. 36A shows a perspective view of an inner connector 222 of the universal connector 200 of FIG. 34 according to another embodiment of the present invention;

Numeral 36B, 36C and 36D show a side view, a front view and a back view of the inner connector 222;

FIG. 37 shows a side cross sectional view of the universal connector 200 at line II—II of FIG. 34;

FIG. 38 shows a side cross sectional view of the thread 122*t* in an inner connector 122 according to the present invention;

FIG. 39 shows a line representation of a given thread pitch of the inner connector and the thread of the British type air valve;

FIG. 40 shows a perspective view of a universal connector 40 according to another embodiment of the present invention;

FIGS. 41A, 41B and 41C show a side view, a front view and a back view of an outer connector 45 of the universal connector 40 of FIG. 40;

FIG. 42A shows a perspective view of an inner connector 44 of the universal connector 40 of FIG. 40;

FIGS. 42B and 42C show a front view and a back view of the inner connector 44 of the universal connector 40 of FIG. 40;

FIG. 43 shows a perspective view of an activation shaft 46 of the universal connector 40 of FIG. 40;

FIG. 44A shows a side cross sectional view of the universal connector 40 at line I—I of FIG. 40 in its usual state;

FIG. 44B shows a side cross sectional view of the universal connector 40 at line I—I of FIG. 40 with an American type air valve 61 mounted inside the universal connector 40.

Figure 45:
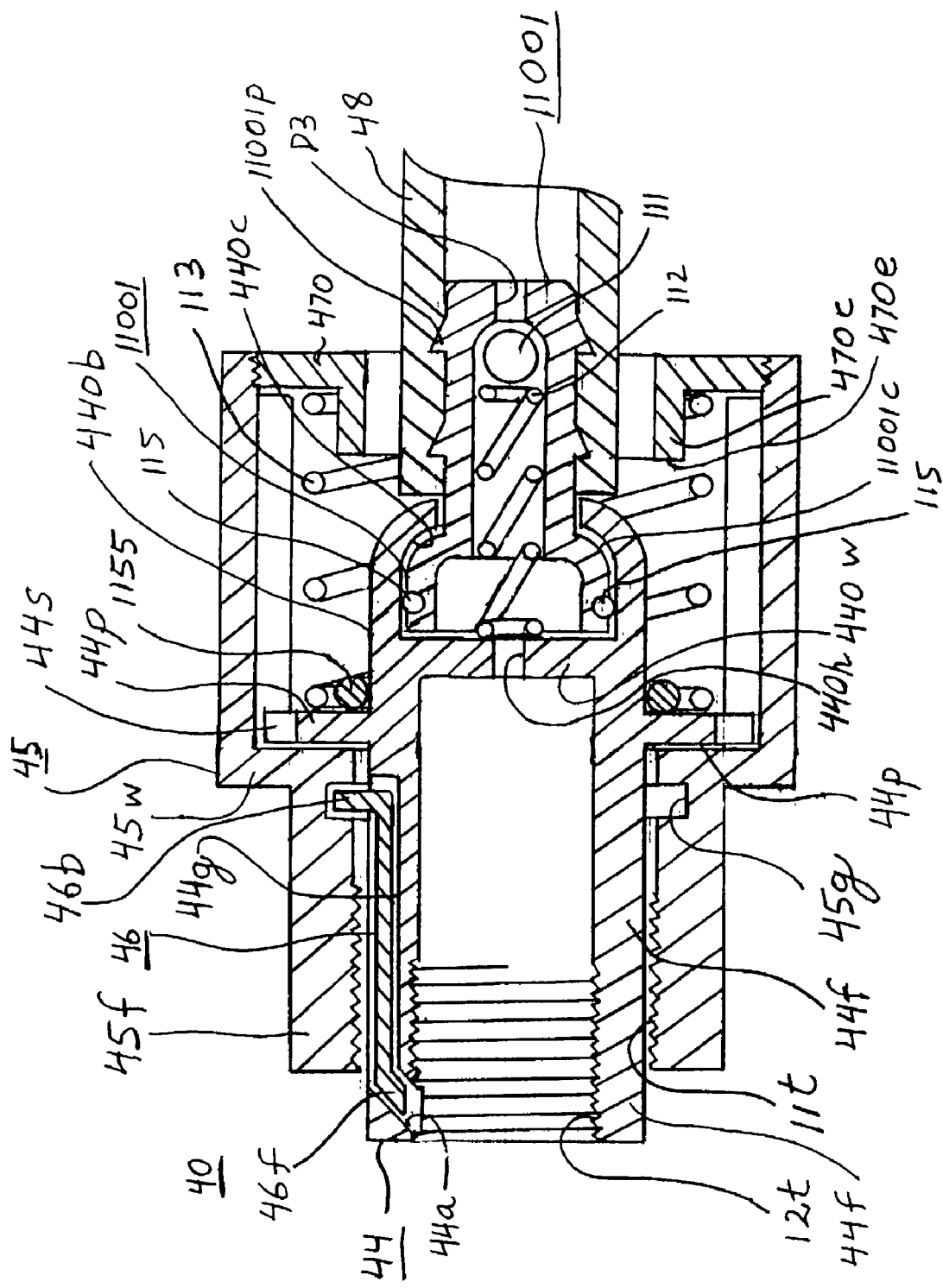
Figure 46C:
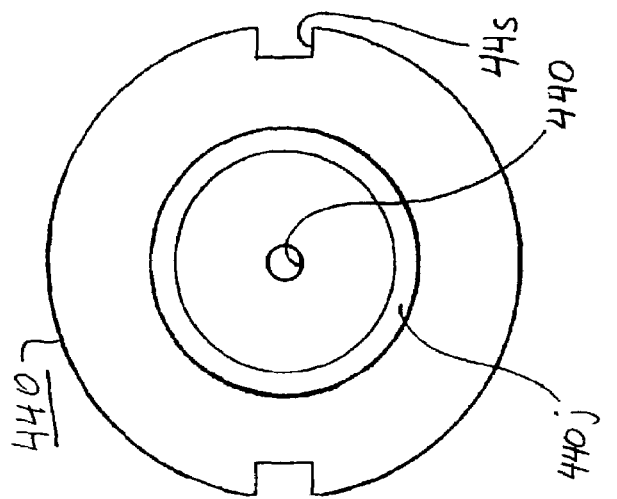
Figure 46A:
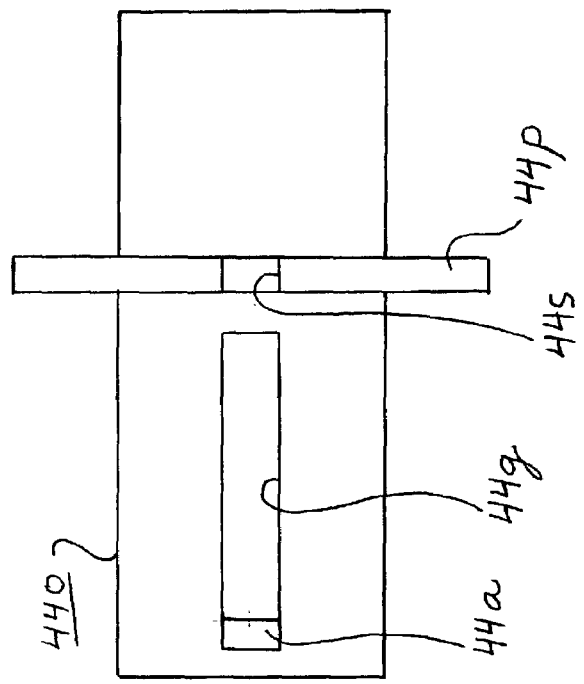
Figure 46B:
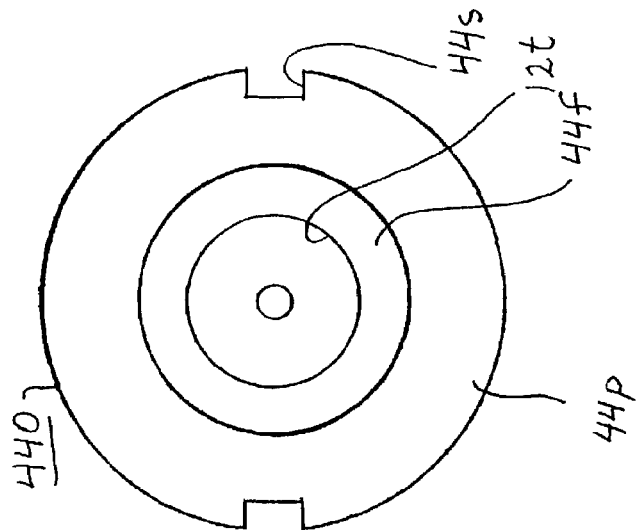

FIG. 45 shows a side cross sectional view of the universal connector at line I—I of FIG. 40 according to another embodiment of the present invention; and FIGS. 46A, 46B and 46C show a side view, a front view and a back view of an inner connector 440 according to the present invention.

In the drawings, the same numerals and symbols will be used to designate the same or similar parts.

DETAILED DESCRIPTION OF THE PRESENT INVENTION

Figure 1:
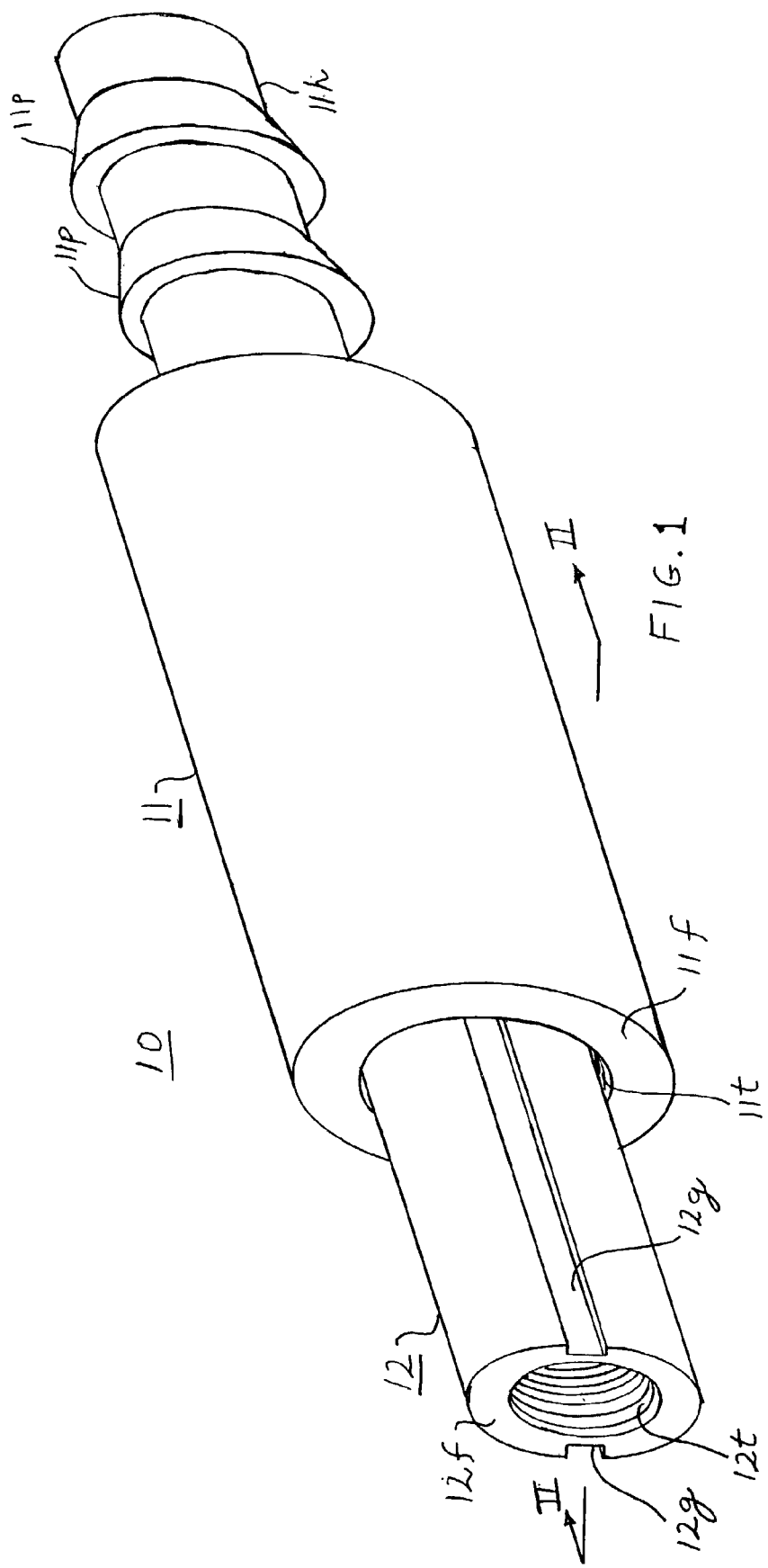
FIG. 1 shows a perspective view of a universal connector 10 according to a first embodiment of the present invention.

FIG. 1 shows a perspective view of a universal connector 10 according to a first embodiment of the present invention. Referring to the Fig., numeral 11 generally designates a cylindrical outer connector, numeral 12 generally designates a cylindrical inner connector which slidingly fits inside the outer connector 11 in the axial direction thereof. More specifically, the inner connector 12 is able to slide inside the outer connector 11 in the axial direction of the inner and outer connectors 11, 12, but is refrained (i.e. prevented) from rotating inside the outer connector 11 in the radial directions thereof as will be described more fully hereinafter.

FIG. 2A shows a side view of the outer connector 11 of the universal connector 10 shown in FIG. 1. FIGS. 2B and 2C show a front view and a back view of the outer connector 11. Referring to the Figs., the outer connector 11 comprises a substantially cylindrical body 11*b* one end (hereinafter referred to as front end 11*f*) of which is used to connect to (i.e. be screwed onto) an American type air valve and the other end (hereinafter referred to as the back end or air hose mounting section 11*h*) of which is used to connect to an air hose (i.e. means for connecting an air hose to the outer connector). Numerals D1, D2 and D3 designate inner diameters of the outer connector 11 along the axial length thereof. Numeral 11*w* designates a radial wall at the point where the inner diameter of the outer connector 11 changes from D1 to D2. Numeral 11*h* designates a substantially cylindrical air hose mounting portion one end of which is integrally formed with the back side of the radial wall 11*w*, the air hose mounting section having a pair of cone shaped protrusions 11*p* formed along the outer surface thereof for better gripping an air hose (not shown) to be mounted thereon. More specifically, the coned shaped protrusions 11*c* allow for an air hose (such as nylon or rubber air hose) to be easily frictionally slid onto the air hose mounting portion 11*h* while preventing the air hose from slipping off therefrom.

Figure 9:
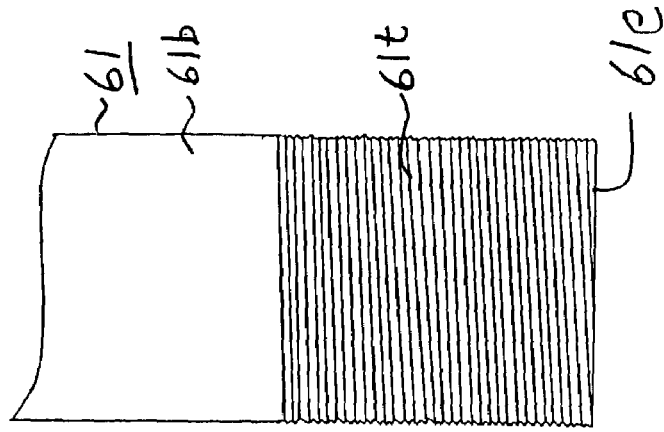
FIG. 9 shows a side view of a conventional American type of air valve.

Numeral 11t designates a larger diameter thread formed on the inner wall of the cylindrical body 11b, the larger diameter thread 11t extending from the front end 11f of the outer connector 11 for about 5 mm into the center of the cylindrical body 11b of the outer connector 11. The inner diameter and pitch of the is the same as the outer diameter and the pitch of the American type air valve (as shown in FIG. 9), namely, a diameter of approximately 7.5 mm. Accordingly, an American type air valve can be screwed into the front end of the outer connector 11. The thread 11t will also be referred to as bigger diameter thread 11t throughout the specification.

Numeral 11r designates a pair of ridges formed at diagonally opposed sides of the inner walls of the outer connector 11 along a middle portion 11m thereof, namely, the ridges 11r extend in the axial direction of the outer connector 11 from the point where the thread 11t to the inner wall of the radial wall 11w.

Numeral 11x designates a thread formed on the inner walls of the air hose mounting section 11h of the outer connector 11 (shown in FIG. 6A), numeral 11v designates a semi-spherical shaped surface formed along the inside of the air hose mounting section 11h, the spherical surface 11v in conjunction with a ball bearing 111 and a spring 112 creating a one way air valve which allows pressurized air to flow only from the back end i.e. air hose mounting section 11h to the front end 11f of the outer connector 11.

The outer connector 11 can be easily formed using conventional metal forming techniques. Namely, first a sheet of metal or a wire fed wire or rod is cold pressed using high pressure in an appropriately designed mold to substantially form the outer connector 11, but without the threads 11t and 11x and without the protrusions 11p. Next, the threads 11t and 11x are formed in the outer connector by using an appropriate taping tool or a Turret machine. Then, the protrusions 11p are formed by machining the diameter of the air hose mounting section 11h down to create the desired shape using a lathe or Turret machine.

It should be noted that although only two ridges 11r are shown formed inside the outer connector 11, three, four, etc., ridges could be formed to provide better support for preventing the inner connector 12 from radially rotating (i.e. swiveling) inside the outer connector 11 as well as for providing better axial sliding characteristics, as will be explained later.

FIG. 3A shows a perspective view of an inner connector 12 of the universal connector 10 of FIG. 1. FIGS. 3B, 3C and 3D show a side view, a front view and a back view of the inner connector 12 of FIG. 3A.

Referring to the Figs., the inner connector 12 comprises a substantially cylindrical body 12b which is open at both ends thereof and which has a fixed outer diameter D4, an inner diameter D5 along one end thereof (hereinafter referred to the front end 12f) and an inner diameter D6 along the other end (hereinafter referred to as the back end 12k) thereof. Numeral 12c designates a cone shaped wall formed along the inner walls of the inner connector 12 at the point where the inner diameter D5 changes to become the diameter D6. Numeral 12a designates an annular ring formed along the inner walls of the inner connector 12 in the radial direction thereof and numeral 115 designates an O ring mounted inside the annular groove 12a (shown in FIG. 6A). Numeral 12t designates a smaller diameter thread formed along the inner circumference of the body 12b, the thread 12t extending from the front end 12f of the cylindrical body 12a for about 5 mm into the inner connector 12. The diameter D5 and the pitch of the thread 12t (i.e. number of threads per centimeter) are substantially the same as the diameter and thread pitch of the English type valve (Dunlop valve) and French type valve (Presta valve), so that both these valves can be screwed into the thread 12t in the inner connector 12. Accordingly, when a French or English type air valve is screwed into the thread 12t in the inner connector 12, pressurized air can pass through the inner connector 12 and into a pneumatic air tire which these valves are connected to (not shown). The thread 12t will also be referred to as smaller diameter thread 12t throughout the specification.

The outer diameter D4 of the inner connector 12 is slightly smaller than the inner diameter D1 of the outer connector 11, so that the inner connector 12 can slidingly fit inside the outer connector 11. Numeral 12g designates a pair of grooves formed at diagonally opposed sides of the inner connector 12 along the outer surface thereof and in the axial direction of the inner connector 12, the grooves 12g extending along the entire length of the inner connector 12. The grooves 12g are slightly wider and deeper than the ridges 11r formed along the inner surface of the outer connector 11, so that the ridges 11r may slidingly fit inside the grooves 12g in the axial directions thereof. Preferably, the grooves should be about 1–2 milimeters wide (i.e. along the circumferential direction of the inner connector 12) and about 0.5 mm deep. The ridges 11r and the grooves 12g formed in the outer connector 11 and inner connector 12, respectively, together provide the function of swivel preventing means for preventing the inner connector 12 from swiveling inside the outer connector 11 in the radial direction thereof.

It should be noted that although only two grooves 12g are shown, it would be preferable to have 3 or more grooves 12g formed along the outer surface of the inner connector 12 and a corresponding number of ridges 11r formed along the inner surface of the outer connector 11, to provide better sliding characteristics between the inner and outer connectors 12 and 11 in the axial directions thereof, while at the same time providing better anti-swiveling characteristics between the inner and outer connectors 12 and 11 in the radial directions thereof.

Figure 6A:
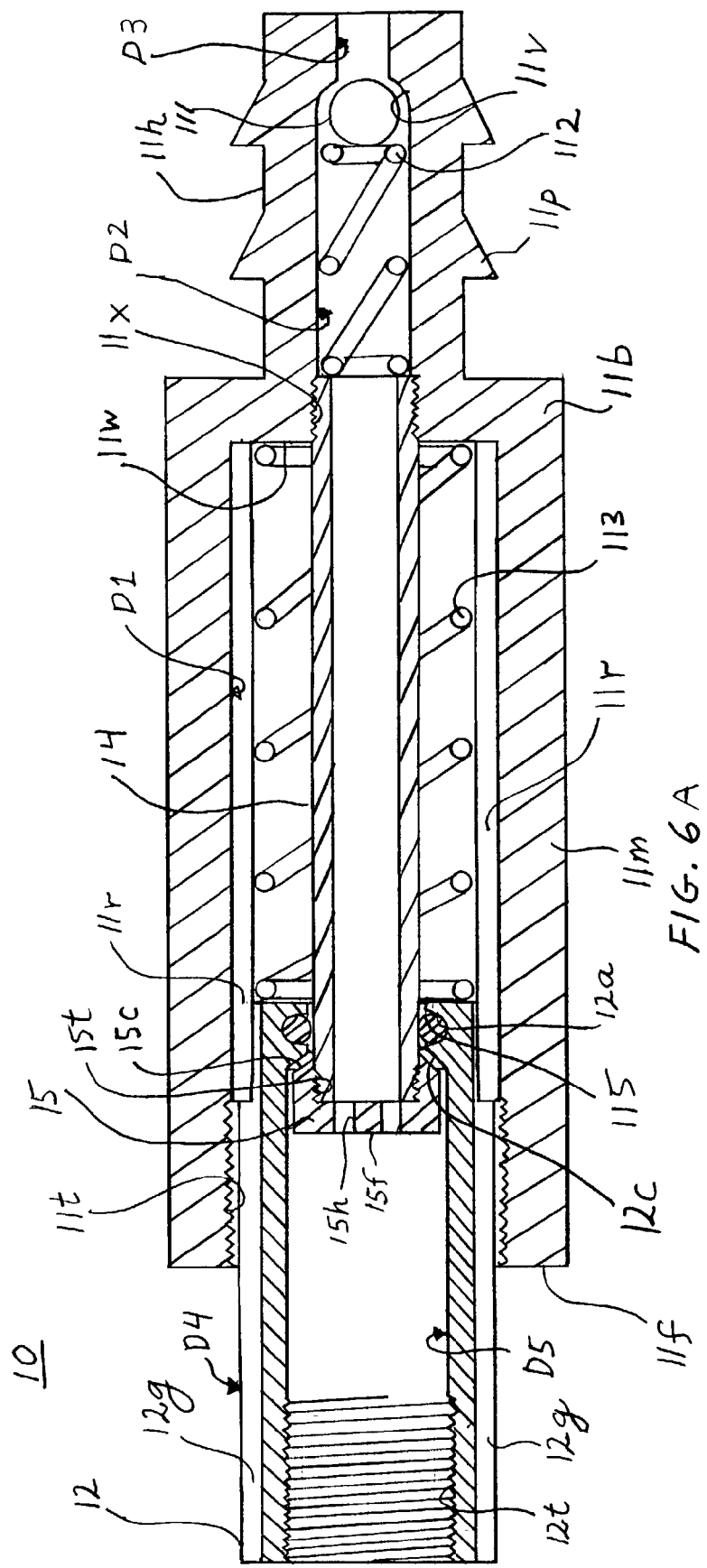
FIG. 6A shows a side cross sectional view of the connector 10 along line II—II in FIG. 1.
Figure 6B:
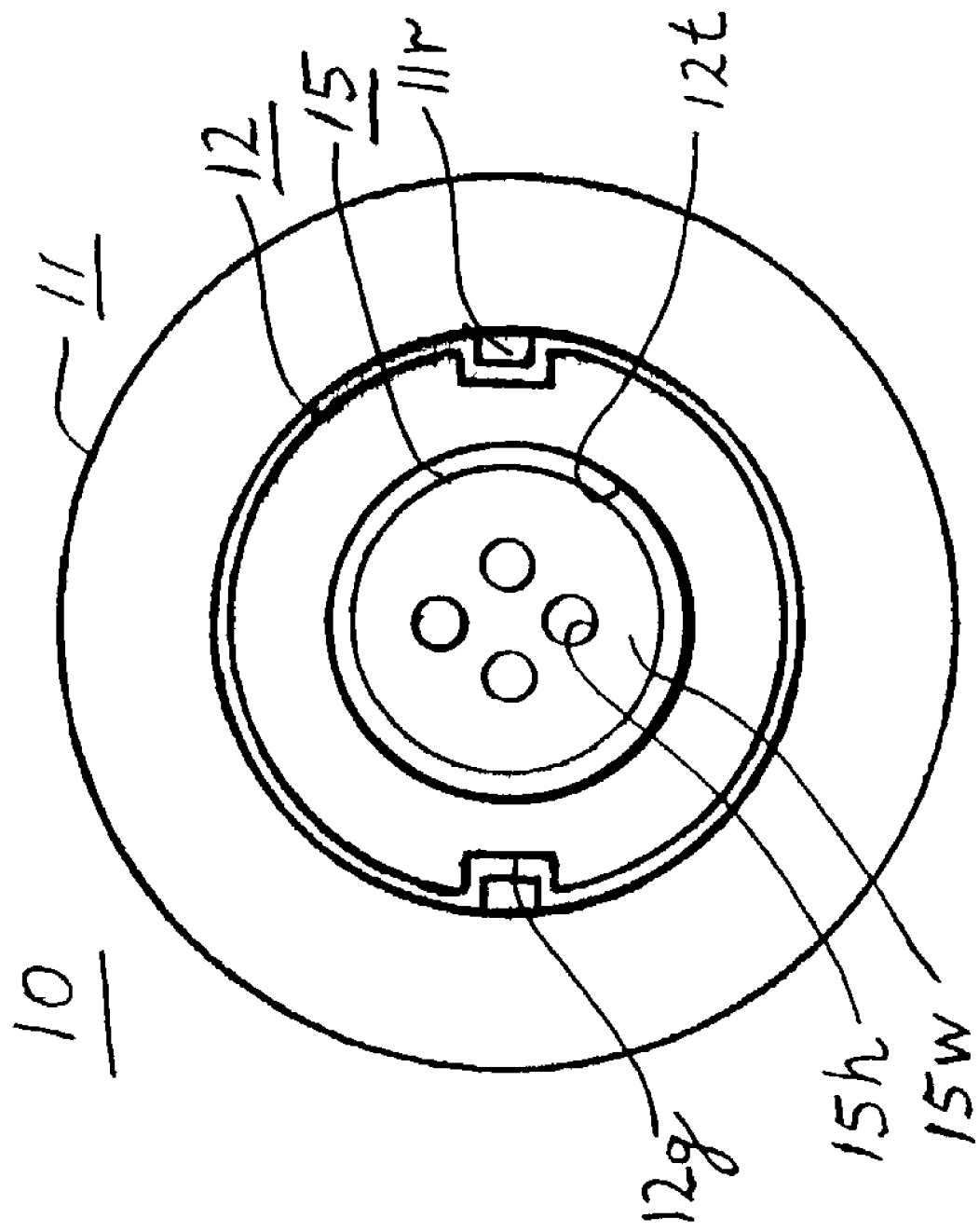
FIG. 6B shows a front view of the universal connector 10 of FIG. 1

FIGS. 4A, 4B and 4C show a side view, front view and back view of a cylindrical pin activation shaft 14 according to a first embodiment of the present invention. FIGS. 5A–5C show a side view, front view and back view of a cap 15 according to a first embodiment of the present invention. FIG. 5D shows a side cross sectional view of the cap 15 at line I—I of FIG. 5B. FIG. 6A shows a side cross sectional view of the connector 10 along line II—II in FIG. 1. FIG. 6B shows a front view of the universal connector 10 of FIG. 1.

Referring to the Figs., numeral 14 designates a round shaft having a round through hole 14h formed through the center thereof for allowing air to pass therethrough and numerals 14t designate threads formed on the outer surface of the shaft 14 at both ends thereof. The outer diameter D7 of the shaft 14 is slightly smaller than the inner diameter D6 of the inner connector 12, so that the shaft 14 can slidingly fit inside the inner connector 12.

Numeral 15 designates a cylindrical end cap one end of which is open (hereinafter referred to as the back end 15b) and the other end (hereinafter referred to as the front end 15f) of which has a wall 15w integrally formed therewith. Numeral 15t designates a thread formed along the inner surface of the cap 15, so that the end cap 15 can be screwed onto one end of the shaft 14, namely, the thread 15t fits the thread 14t. Numeral 15c designates a cone shaped surface formed along the outer circumference of the back end of the cap 15 and is utilized for, in combination with the surface 12c of the inner connector 12, to create an air tight seal therebetween. Numeral 15h designates four holes formed through the wall 15w, which are utilized to allow pressurized air to pass therethrough.

The outer diameter D8 of the cap 15 is less than the inner diameter D5 of the inner hole in the inner connector 12 and larger than the inner diameter D6 in the inner connector 12 (i.e. D6<D8<D5), so that the cap 15 can freely slide in and out of the inside of the inner connector 12, while the inner connector 12 is prevented from coming out entirely from the outer connector 11 by the cone shaped surfaces 15c and 12c butting up against each other.

As will be explained more fully later, the end cap 15 provides a number of functions. Namely, it prevents the inner connector 12 from completely coming out of the outer connector 11 (i.e. provides the function of blocking means for preventing the inner connector 12 from completely coming out of the outer connector 11), it acts as an air seal between the inner connector 12 and the outer connector 11 by utilizing the surface 15c thereof. Furthermore, when an American type air valve 61 is screwed into the outer connector 11, the cap 15 is utilized to push the air activation pin 9p of the American type air valve (as shown in FIG. 10C), so that air can be pumped into an air tube (not shown) mounted thereon (i.e. activation means for pressing the air pin inside an American type air valve). More specifically, the diameter of the activation shaft 9p of the American type air valve 9 is approximately 1–2 milimiters. Accordingly, if the diameter of the through hole 14h is greater than the diameter of the pin 9p, i.e. greater than 2 mm., (to allow a larger volume of air to pass therethrough), the extending end of the pin 9p would slide into the hole 14h in the shaft 14, (i.e. if the cap 15 were not being utilized), which would defeat most of the purpose of the shaft 14. Accordingly, by utilizing the cap 15, the pin 9p can be pressed inwards by the middle portion of the wall 15w, while still allowing for air to flow through the holes 15h in the wall 15w and into the American type air valve.

The inner connector 12, outer connector 11, the shaft 14 and end cap 15 are made of stainless steel, brass or aluminum and can be formed using conventional machines such as cold pressing machines, knurling tools, forming tools and automatic truet lathe. The shaft 14 and end cap 15 together form an air valve activation shaft for inwardly pressing the activation pin inside an American type air valve.

It should be noted that although the diameter of the British type air valve and the French type valve are substantially the same, their pitch (i.e. number of threads per centimeter) is slightly different. However, they are sufficiently similar, so that by choosing the pitch of the thread 12t on the inner connector 12 to be between the pitch of the French and English connectors pitch, since the connector only has to be screwed onto the French and English valve for only 5 mm, it is possible to screw the connector 12 onto both these valves.

To assemble the universal connector 10, first the outer connector 111 is positioned with its front end 11f facing upwards. Next, the ball bearing 1111 is dropped through the front end 11f into the outer connector 11 until it comes into contact with the semi-spherical surface 11v (i.e. due to gravity), thereby providing an air tight seal between the surface of the ball bearing 111 and the semi-spherical surface 11v. Next, the smaller spring 112 (i.e. smaller than the spring 113) is dropped into the outer connector 11 through the front end 11f until the one end of the spring buts up against the ball bearing 111. Next, the bigger spring 113 is dropped (or inserted) into the outer connector 11 through the open end 11f until the one end of the big spring buts up against the inner surface of the wall 11w. The outer diameter of the bigger spring 113 is less than the distance between the inner walls of the ridges 11r, so that the spring 113 can freely slide inside the outer connector 11. Further the inner diameter of the bigger spring 113 is greater than the outer diameter of the pin 14, so that the pin 14 freely sides therein. Next, the inner connector 12 (having the O ring 115 mounted inside the annular groove 12a) is partially inserted inside the outer connector 11 through the front end 12f of the outer connector 11, while making sure that the grooves 12g of the inner connector slidingly fit inside the ridges 11r of the outer connector 12 in the axial directions thereof, until the back side of the inner connector 12 buts against the other side of the big spring 113. Next, the cylindrical pin 14, having the cap 15 screwed onto one end thereof, is dropped or inserted into the inside of the inner connector 12. Next, the pin 14 is manually pushed into the outer connector against the force of the bigger spring 113, until the inner side of the pin 14 comes against the thread 11x formed inside the air hose mounting portion 11h. Next, the pin 14 is turned clock wise (by turning the cap 15 clock wise), to cause the thread 11x of the pin 14 to be screwed into the thread 11x inside the air hose mounting portion 11h.

It should be noted that preferably the big spring 113 should be long enough, so that it normally pushes on the inner side of the inner connector 12 to cause the inner cone shaped wall 12c of the inner connector 12 to but against the cone shaped surface 15c of the cap 15 to cause an air tight seal therebetween. Furthermore, as can be seen from FIG. 6A, the outwardly extending end of the cap 15, i.e. the front end 1Sf of the cap 15, extends further forward than the inner most portion of the thread 11t formed in the outer connector 11 in the axial direction of the connector 10 (i.e. the end of the thread 11t and the front portion of the cap 15 overlap each other by about 3 mm in the axial direction of the connector 10), so that an activation shaft (as shown in FIG. 10C), can be pressed to allow pressurized air to flow into the American type connector. Furthermore, that the length of the outer connector 11 should be long enough to accommodate the inner connector 12 and the spring 13 when the American type valve 61 is screwed into the thread 11t formed in the outer connector 11. Furthermore, that the length of the inner connector 12 protruding beyond the front end 15f of the cap 15 should be long enough to accommodate the French type air valve when the valve is screwed into the thread 12t formed in the inner connector 12.

Further, it should be noted that the universal connector 10 is shown to be approximately five times its actual size in FIGS. 1–6B.

Figure 7:
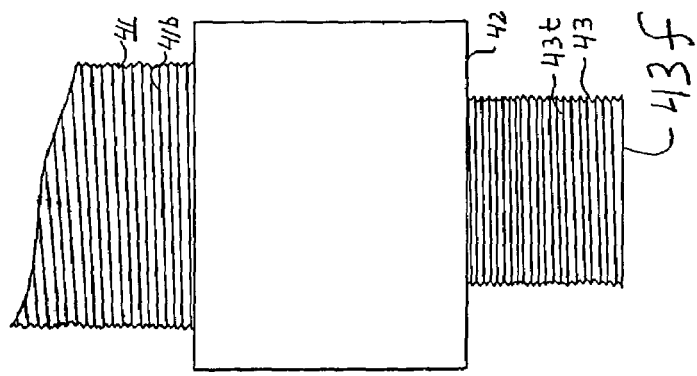
FIG. 7 shows a side view of a conventional British type of air valve.

FIG. 7 shows a side view of a conventional British type air valve 41. Referring to the Fig., the air valve 41 comprises a cylindrical main body portion 41b one end of which connects to a rubber air tire (not shown) and has a nut 42 screwed onto the extending end thereof. Numeral 43 designates a cylindrical portion having a thread 43t formed on the outer surface thereof for allowing a connector to be attached to the outwardly extending end thereof, so that pressurized air may be inserted therethrough. The other end (not shown) of the cylindrical portion 43 which extends inside of the cylinder 41b has a one-way air inlet valve for allowing pressurized air to be inserted into the tire. The diameter of the air inlet valve 43 is approximately 3.2 mm and the length of the air inlet valve 43 extending outside the main body portion 41b or below the nut 42 is about 5 mm.

Figure 8:
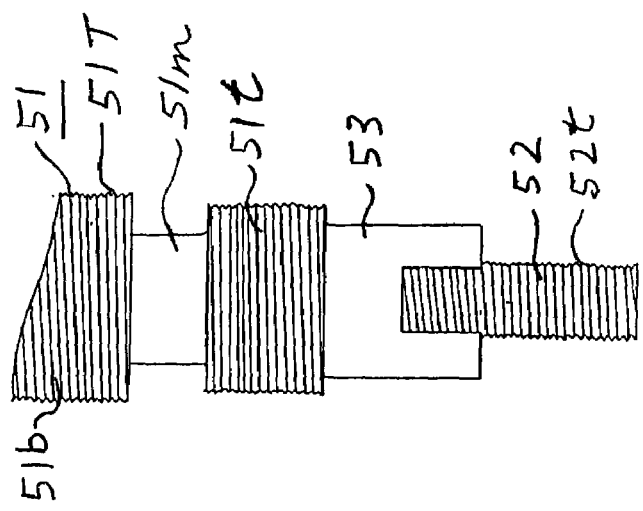
FIG. 8 shows a side view of a conventional French type of air valve.

FIG. 8 shows a side view of a French type air valve 51. Referring to the Fig., the valve 51 comprises a cylindrical main body portion 51b one end of which connects to a rubber air tire (not shown) and the other extending end of which has a thread 51t formed thereon for allowing a connector to be attached thereto, so that pressurized air may be inserted therethrough. Numeral 51T designates a thread formed on the central part of the main body 51 portion 51b. Numeral 51m designates a no thread portion between the thread portions 51T and 51t of the main body portion 51b. Numeral 52 designates a round shaft which extends out of the center of the extending end of the main body portion 51b. The shaft 52 has a thread 52t formed thereon for allowing a locking nut 53 to be screwed thereon. The diameter of the thread 51t is approximately 3.2 mm. The total length of the no thread portion 51m, the thread 51t, the locking nut 53 and the thread 52t extending past the end of the nut 53 is together about 5 mm. The nut 53 has an outer diameter of about 3 mm. The outer diameter of the thread portion 51T is approximately 4 mm. To insert pressurized air into the French type air valve 51, first the locking nut 53 must be slightly unscrewed to allow the shaft 52 to slightly move into the main body portion 51b, thereby opening a cone shaped rubber valve (not shown) inside the French type air valve 51.

FIG. 9 shows a side view of an American type of air valve 61. Referring to the Fig., the air valve 61 comprises a cylindrical main body portion 61b one end of which connects to a rubber air tire (not shown) and the other extending end of which has a thread 61t formed thereon for allowing a connector to be attached thereto, so that compressed air may be inserted therethrough. The diameter of the thread 61t is approximately 7.5 mm and the length of the threaded portion 61t is about 8 mm. An activation shaft 9p inside the air valve main body 61b (shown in FIG. 10C) must be pressed inwards (i.e. by about 1 mm.) to allow pressurized air to be inserted into the American type air valve 61. The activation shaft 9p is about 2 mm. in from the extending end 61e of the main body portion 61b and has a diameter of about 2 mm.

Figure 10A:
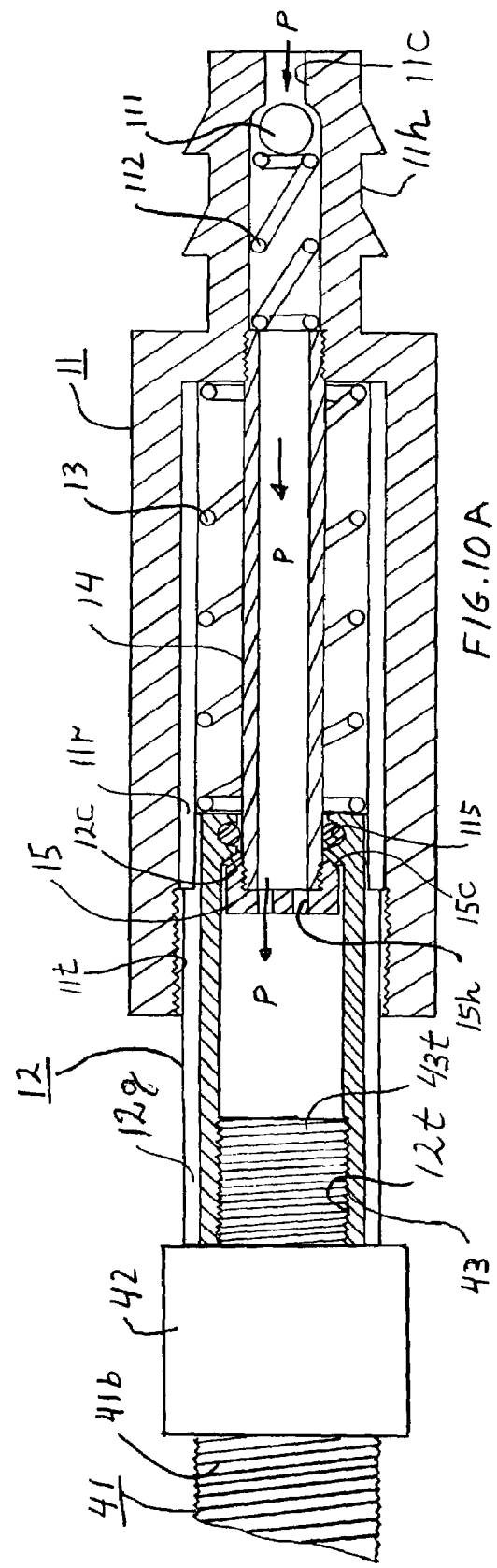
FIGS. 10A–10C show side cross sectional views of the universal connector 10 having a British, French and American type air valve mounted therein, respectively.
Figure 10B:
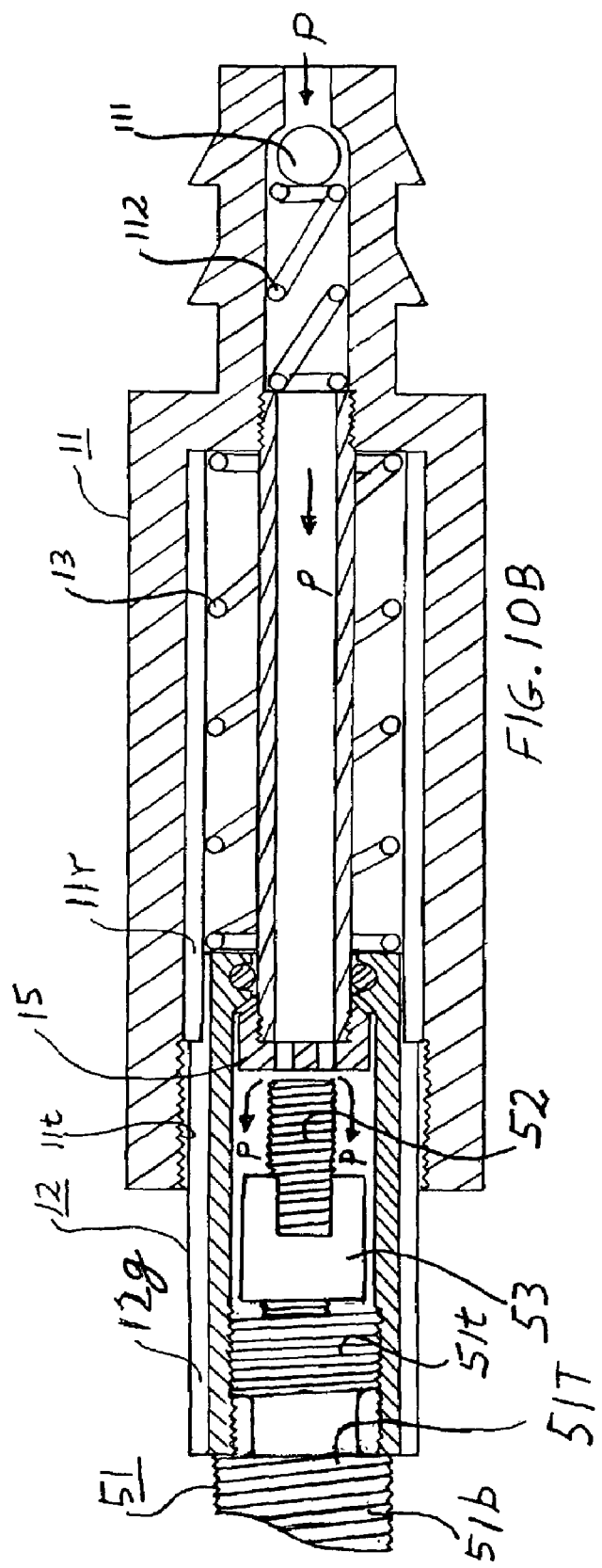
Figure 10C:
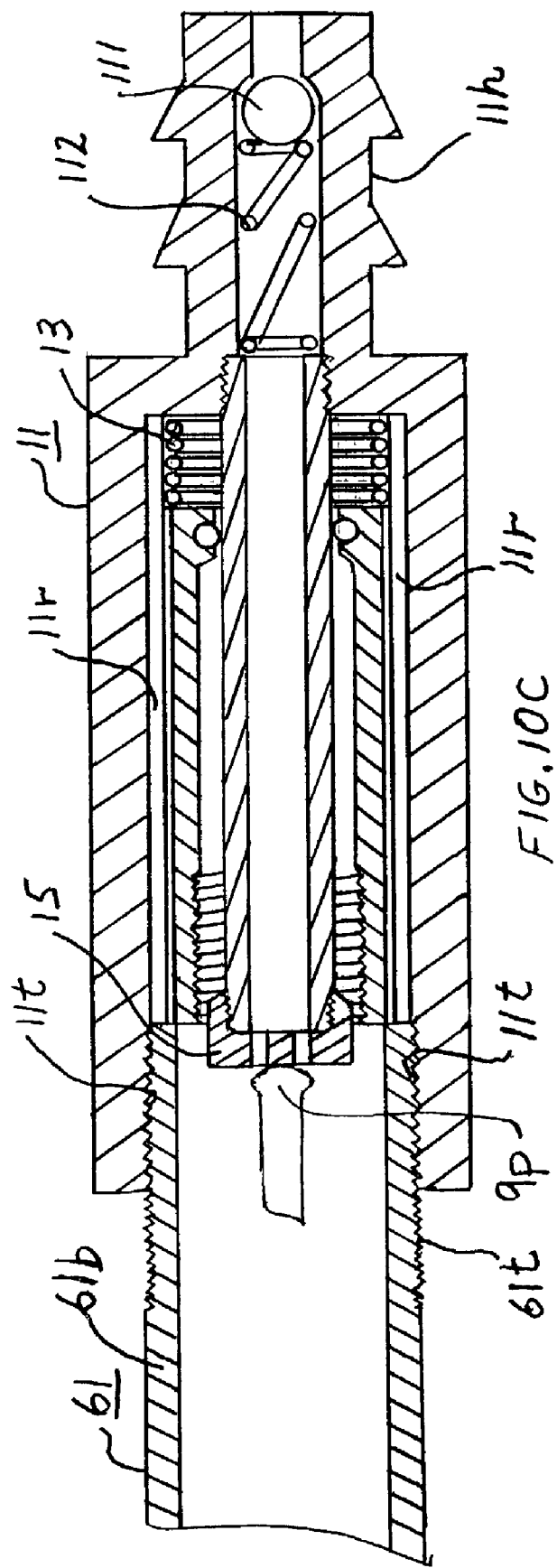

FIGS. 10A, 10B and 10C show the universal connector 10 having a British air valve 41, French air valve 51 and American air valve 61 mounted therein, respectively.

As shown in FIG. 10A, to insert air into the British type air valve 41, the outer connector is manually turned clockwise, which causes the inner connector 12 to turn as well, and by placing the extending end 43f of the cylindrical portion 43 of the air valve 41 against the front end 12f of the inner connector 12, causing the thread 43t to be screwed into the smaller diameter thread 12t until the lower end of the nut 42 buts up against the extending end of the inner connector 12. Then pressurized air as shown by the arrows P is pumped through the connector 10 from the left to the right as seen in the FIG. 10A. Namely, the pressurized air passes through the central hole 11c, causing the ball bearing 111 to compress the spring 112 and to move to left due to the air pressure differential on both sides of the ball bearing 111. (i.e. the ball bearing 111 and spring 112 form a one way air valve.) The pressurized air then moves through the center of the pin activation shaft 14 and through the through holes 15h in the cap 15 and then through the center of the inner connector 12 and finally into the British type air valve. Pressurized air is prevented from escaping outwardly between the adjacent surfaces of the inner connector 12 and outer connector 11 by the O ring 115 as well as by the cone shaped surfaces 12c and 15c of the inner connector 12 and cap 15, as well as by the surface pressure on these cone shaped surfaces 12c and 15c generated by the partially compressed spring 13 (i.e. biasing means for generating a force on the inner and outer connectors, so that the front end of the inner connector is normally protruding out of the front end of the outer connector).

As shown in FIG. 10B, to insert air into the French type air valve 51, first the nut 53 is slightly unscrewed, so that the nut 53 is located somewhere along the central part of the shaft 52, so that the shaft 52 can move axially with respect to the main body portion 51b. Then, similar to the method described above for the British type air valve 41, the thread 12t is screwed onto the thread S it by turning the outer connector 11 clockwise causing the inner connector 12 to turn therewith and the thread 51t to be screwed into the thread 12t until the extending end of the thread 51T of the main body 51b buts up against the front end 12f of the inner connector 12. Then, pressurized air is pumped through the universal connector 10, as described above with respect to the British type air valve, causing the pressurized air, as shown by the arrows P to flow around the locking knot 53 and into the inside of the main body 51b of the French type air valve 51. The shaft 52 slightly moves into the main body 51b during the air pumping process to allow air to flow into an air tube (not shown). The French valve 51 is well know in the art and is often used with very thin tires on racing bikes.

As shown in FIG. 10C, to insert air into the American type air valve 61 using the universal connector 10, the extending end 61e of the cylindrical body portion 61b is manually pushed against the extending end of the inner connector 12 causing the spring 13 to compress and to allow the inner connector 12 to axially slide into the outer connector 11. Then, when the extending end 61e of the cylindrical body portion 61b is against the extending end 11f of the outer connector 11, the outer connector 11 is turned clockwise to cause the thread 61t to screw into the thread 11t. During the screwing process of turning the outer connector 11 clockwise with respect to the body portion 61b, the front side 15f of the wall 15w of the cap 15 comes into contact with the activation shaft 9p inside the main body portion 61b of the American type air valve 61, and then, as the screwing continues further, the cap 15 pushes on the activation shaft 9p and causes the pin 9p to move slightly into the cylindrical body portion (i.e. the pin 9p is always under a spring force, not shown, to keep air in the tire from coming out and is well know in the art), thereby allowing for pressurized air to flow into, or out of, the American type valve. Pressurized air then moves through the center of the pin activation shaft 14 and through the through holes 15h in the cap 15 and then into the American type air valve 61.

Figure 11:
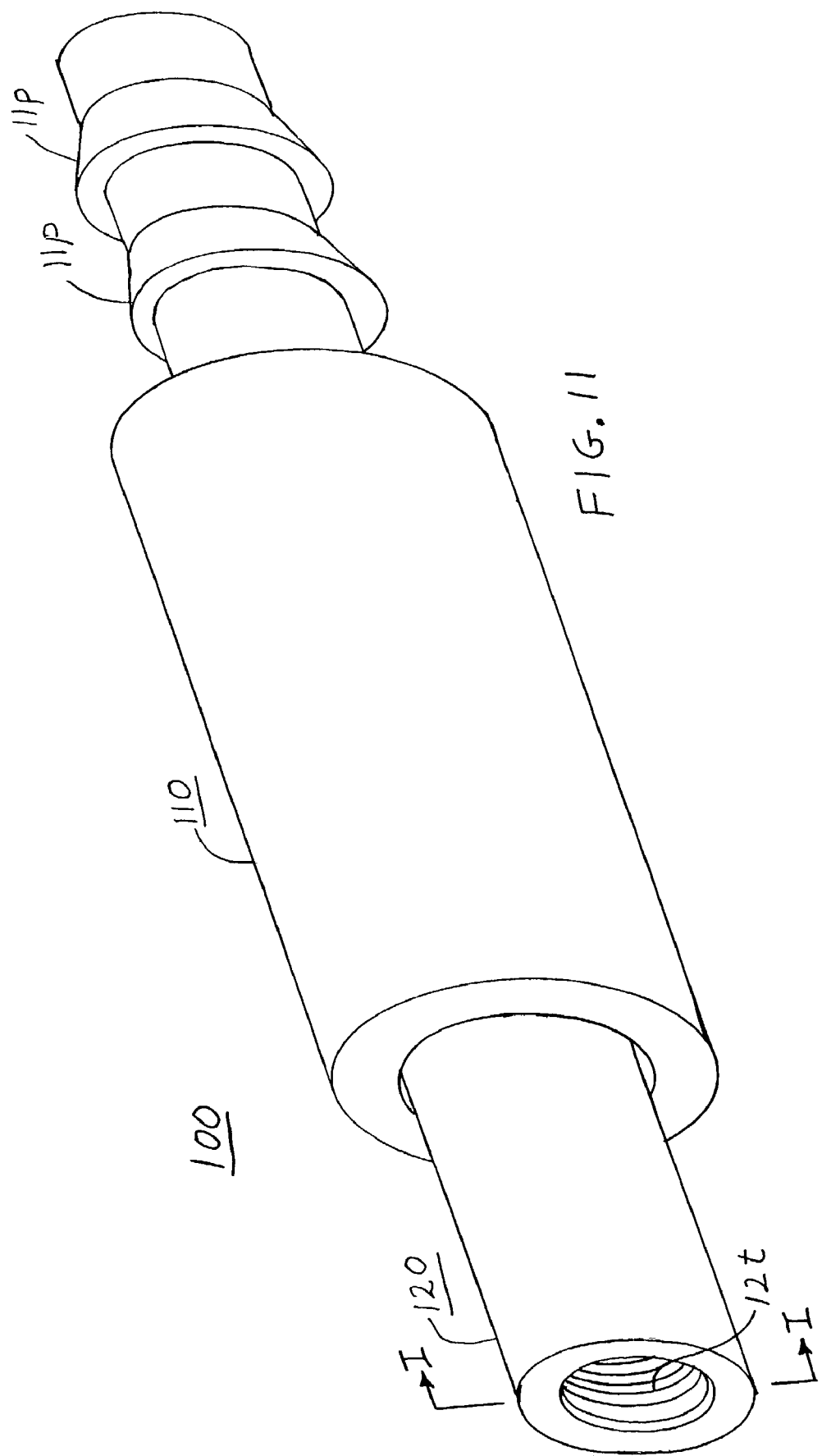
FIG. 11 shows a perspective view of a universal connector 100 according to another embodiment of the present invention.

FIG. 11 shows a perspective view of a universal connector 100 according to a second embodiment of the present invention. Referring to the Fig., numeral 110 generally designates a cylindrical outer connector, numeral 120 generally designates a cylindrical inner connector which slidingly fits inside the outer connector 110 in the axial direction thereof. The inner connector 120 is able to slide in the axial direction of the outer connectors 110 but is refrained (i.e. prevented) from rotating inside the outer connector 110 in the radial directions thereof as will be described more fully hereinafter. As can be seen from the FIGS. 1 and 11 the universal connector 100 is very similar for the universal connector 10 and the only externally visible difference is that the inner connector 120 has no external grooves along the outer surface thereof.

FIG. 12A shows a side view of the outer connector 110 of the universal connector 100 shown in FIG. 11. FIGS. 12B and 12C show a front view and a back view of the outer connector 110 shown in FIG. 12A. Referring to the Figs., the outer connector 110 comprises a substantially cylindrical body 110b one end (hereinafter referred to as front end 11f) of which is used to connect to an American type air valve and the other end (hereinafter referred to as the back end or air hose mounting section 11h) of which is used to connect to an air hose. Numerals D1, D2 and D3 designate the inner diameter of the outer connector 110 along the axial length thereof, similar to the diameters D1, D2 and D3 of the outer connector 11 described above. Numeral 11w designates a radial wall at the point where the inner diameter of the outer connector 110 changes from D1 to D2. Numeral 11t designates a thread formed on the inner wall of the cylindrical body 11b, the thread 11t extending from the front end 11f of the outer connector 110 and extending for about 5 mm into the center of the cylindrical body. The inner diameter and pitch of the thread 11t is the same as the outer diameter and the pitch of the American type valve 61 (as shown in FIG. 9), namely, a diameter of approximately 7.5 mm. Accordingly, an American type air valve can be screwed into the front end of the outer connector 110.

Numeral 110s designates a square hole formed on the inner side of the radial wall 11w which extends from the front surface of the inner wall 110 partially into the air hose mounting section 11h of the outer connector 110 (shown in FIG. 12B). The square hole 110s is coaxial with and adjacent to the hole having a diameter D2 in the air hose mounting section 11h. The square hole 110s is utilized for frictionally supporting therein one end of a pin activation shaft 140 as will be described more fully later.

Numeral 11v designates a semi-spherical shaped surface formed along the inside of the air hose mounting section 11h, the spherical surface 11v in conjunction with a ball bearing 111 and the spring 112 form a one way air valve which allows pressurized air to flow only from the back end i.e. air hose mounting section 11h to the front end 11f. Numeral 11c designates a pair of cone shaped protrusions formed along the outer surface of the air hose mounting section 11h of the outer connector 11. The coned shaped protrusions 11c allow for an air hose (such as nylon or rubber air hose) to be easily frictionally mounted thereon while preventing the air hose from slipping off therefrom.

The outer connector 110 can be easily formed using conventional metal forming techniques. Namely, first a sheet of metal or a rod is cold pressed using high pressure in an appropriately designed mold to substantially form the outer connector 110 but without the protrusions 11p. Next, the protrusions 11p are formed by machining the diameter of the air hose mounting section 11h down to create the desired shape using a lathe or Turret machine.

FIG. 13A shows a perspective view of an inner connector 120 of the universal connector 100 of FIG. 11. FIGS. 13B, 13C and 13D show a side view, a front view and a back view of the inner connector 120 of FIG. 3A. Referring to the Figs., the inner connector 120 comprises a substantially cylindrical body 120b which is open at both ends thereof and which has an outer diameter D4 and an inner diameter D5 along one end thereof (hereinafter referred to the front end 12f). Numeral 120w designates a radial wall formed at the other end (hereinafter referred to as the back end) of the inner connector 120. Numeral 120s designates a square through hole formed in the center of the radial wall 120w. The inner surface 12c of the radial wall 12w between the diameter D5 and the square hole 120s is cone shaped.

The size of the square hole 120s in the radial wall 120w is slightly bigger than the size of the square activation shaft 140, so that the shaft 140 may slidingly fit therein.

Numeral 120g designates an annular groove formed along the outer wall of the inner connector 120 in the radial direction thereof and numeral 115 designates an O ring mounted inside the annular groove 120g. Numeral 12t designates a thread formed along the inner circumference of the cylindrical body portion 120b of the inner connector 120, the thread 12t extending from the front end 12f of the cylindrical body 120b for about 5 mm into the inner connector 120. The diameter D5 and the pitch of the thread 12t (i.e. number of threads per centimeter) are substantially the same as the diameter and thread pitch of the English type valve 41 (Dunlop valve) and French type valve 51 (Presta valve), so that both these valves can be screwed into the thread 12t in the inner connector 120, so that pressurized air may be passed through the inner connector 120 and through the English or French valves into pneumatic air tires which these valves are mounted on. The outer diameter D4 of the inner connector 120 is slightly smaller than the inner diameter D1 of the outer connector 110, so that the inner connector 120 can slidingly fit inside the outer connector 110.

The inner connector 120 is made of a metal such as stainless steel, brass, aluminum, etc., and can be formed using conventional manufacturing methods such as by using metal cold pressing machinery to form the basic structure using a suitable mold and then using a lathe or truet machine to form the thread 12t and the annular groove 120g.

FIG. 14A shows a perspective view of a pin activation shaft 140 according to the present invention. FIGS. 14B, 14C and 14D show a side view, a front view and a back view of the activation shaft 140. Referring to the Figs., numeral 140b designates a square shaft having a cross like aperture 140h (i.e. two perpendicular slots which cross each at their centers) formed through the center thereof.

Numeral 140t designates a thread formed at one end of the shaft 140, the size and pitch of the thread being the same as the size and pitch of the thread 15t formed in the end cap 15, so that the end cap may be screwed thereon.

The outer size of the shaft 140 is the same as the size of the square hole 110s formed in the radial wall 11w of the outer connector 110, so that the square end of the shaft 140e having no thread formed thereon, frictionally fits into the square hole 110h formed in the outer connector 110. Furthermore, the outer size of the square shaft 140 is slightly smaller than the square hole 120s formed in the inner connector 120, so that it may slidingly fit therein.

FIG. 14E shows a perspective view of the shaft 140 having an end cap 150 screwed onto the thread 140t thereof. The cap 150 is the same as the cap 15 except for further including a donut shaped groove 150g along the outer surface thereof for supporting a rubber or nylon O ring 115 thereon. The cap 150 further has a cross like through hole 150x formed therethrough instead of the round holes 15h. The caps 15 and 150 are the same in all other aspects.

The shaft 140 can be formed using conventional metal pipe extrusion techniques which are well know in the art. Once the square shaft with the cross aperture 140h therein is extruded, it can be cut to the desired length and have the thread 140t formed using a lathe or Trruet machine.

FIG. 15 shows a side cross sectional view of the universal connector 100 at line I—I of FIG. 11.

To assemble the universal connector 100, first the outer connector 110 is positioned in a clamp or on a conveyor belt with the front end thereof facing up. Next, the ball bearing 111 and smaller spring 112 is dropped into (i.e. due to gravity) the outer connector 110 through the open end thereof. Next, the bigger spring 113 is dropped into the outer connector 110. Next, the inner connector 120, having the O ring 115 mounted in the groove 120g, is dropped into the outer connector 110 with the front portion thereof having the thread 12t formed therein facing outwardly and upwards. Next, the shaft 140, having the end cap 150 screwed onto the thread 140t thereof and the O ring 115 mounted in the groove 150g on the outer surface of the end cap 150, is inserted into the center of the inner connector 120 with the end cap 150 facing upwardly. Next, the front face of the cap 150 is forced down into the outer connector 110 so that the square end of the square shaft 140 frictionally slides into and is lodged or wedged inside the square hole 110s in the air hose mounting section 11h of the outer connector 110.

The spring 113 should be long enough to provide a constant force on the inner connector 120, so that the cone shaped surfaces 11c and 12c are normally pressed against each other to produce an air seal therebetween.

Numeral 120f designates a smaller diameter round portion formed at the back end of the inner connector 120 the diameter of which is the same as the inner diameter of the spring 113, so that the first winding of the spring frictionally fits thereon.

From the point of view of the user, the connectors 10 and 100 are utilized exactly in the same manner. However, the physical difference between these two connectors is the manner in which the inner connectors 12 and 120 are prevented from rotating with respect to the outer connectors 11 and 110, respectively. Namely, the inner connector 120, although being able to slide in the axial direction of the outer connector 110, it is prevented from rotating radially (i.e. swiveling) with respect to the outer connector 110 due to the square shaft 140 slidingly fitting inside the square hole 120s in the inner connector 120. Since one end of the square shaft 140 is rigidly fixed or lodged inside the square hole 110s in the outer connector 110, the shaft 140 rotates together with the outer connector 110 causing the inner connector 120 to rotate or swivel therewith. The outer diameter D4 of the inner connector 120 is slightly smaller than the inner diameter D1 of the outer connector 110, so that the inner connector 120 is free to slide into the outere connector 110.

The length of the square shaft 140 is made to be just long enough that when one end thereof is physically wedged into the square hole 110s in the outer connector 10 and the end cap 150 is mounted on the other end thereof, the outwardly facing surface of the end cap 150 should protrude about 3 mm. beyond the inner portion of the thread 11t, so that, when an American type air valve 61 is screwed in all the way into the thread 11t of the outer connector 110, the outwardly facing surface of the cap 150 engages and presses the pin 9p into the American type air valve 61. In other words, the outwardly facing surface of the cap 150 is about 3 mm. in from the front surface 11f of the outer connector 110.

It should be noted that in order to reduce manufacturing costs, instead of using the threads 140t and 15t on the shaft 140 and cap 150, a cap having a square hole formed therein can be simply wedged onto the end of the shaft 140. This would reduce the manufacturing steps and reduce the manufacturing cost of the universal connector 100. Furthermore, that the square shaft 140 could have a round hole formed through the center thereof, provided that the cap mounted on one end of the shaft 140 does not allow the activation pin 9p to pass into the shaft 140 and allows air to pass therethrough.

FIGS. 16A and 16B show a front view and a back view of an end cap 1500 according to another embodiment of the present invention. Numeral 16C shows a cross sectional view of the end cap 1500 at line I—I in FIG. 16A. The cap 1500 is the same as the cap 150 with the only exception being that instead of the round hole having thread 15t formed therein as shown in FIGS. 14C and 14D, a square hole 1500s is formed through the center thereof. The size of the square hole 1500s is the same as the size of the square shaft 140, so that the end of the shaft 140 frictionally fits therein (i.e. the end of the shaft 140 is physically-forced into the hole 1500s in the cap 1500.

One disadvantage the outer connectors 11 and 110 have is that when these connectors are screwed onto any of the above described type of valves (i.e. British, French and American), not only do these connectors have to be turned clock wise and counter clock wise, but so do the air hoses and air pumps these connectors are connected to. The following description will disclose one embodiment which solves this problem.

FIG. 17A shows a side view of an outer connector 1100 according to another embodiment of the present invention. FIG. 17b shows a back view of the outer connector of FIG. 17A. FIGS. 18A and 18B show a side view and a front or a back view of an air hose mounting portion 1111 according to the present invention. FIG. 19 shows a side view of a resilient locking ring 1112 for locking the air hose mounting portion 1111 to the air hose mounting section 1100h in the axial direction while allowing them to rotate with respect to each in the radial direction according to the present invention. FIG. 20 shows a side cross sectional view of the mounting section 1111 locked with an air hose mounting section 1100h of the outer connector 1100 by the locking ring 1112 according to the present invention. The connector 1100 is the same as the connector 110 and only the differences therebetween will be described herebelow.

Referring to FIGS. 17A and 17B, numeral 1100 designates an outer connector which has the same internal structure as the outer connector 110, numeral 1100h designates an air hose mounting section which, instead of having two cone shaped ridges 11p, is cylindrical in shape and has a round radial slot 1100s formed therein. Numeral 1100g designates an annular groove formed on the outer surface of the connecting section 1100h for supporting an O ring therein. The air hose mounting section 11h and 1100h are the same in all other respects.

Referring to FIGS. 18A and 18B, the mounting section 1111 is cylindrical in shape and has a pair of cone shaped protrusions 1111p integrally formed therewith along the outer surface thereof at fixed intervals in the axial direction of the mounting section 1111. Numeral 1111s designates a pair of slots formed at opposite sides of the mounting section 1111 in the radial direction thereof. The inner diameter of the mounting section 1111 is slightly bigger than the outer diameter of the connecting section 1100h, so that the connecting section 1100h can sliding fit inside the mounting section 1111.

Referring to FIG. 19, numeral 1112 designates a locking ring which comprises a semi-cylindrical sheet of resilient steel having two round inwardly facing protrusions 1112p integrally formed therewith at the respective ends thereof, each protrusion having a round hole 1112h formed through the centers thereof. Since the locking ring 1112 is made of resilient stainless steel, the two protrusions 1112p thereof can be spread apart, (by utilizing a special tool (not shown) similar to a long nose pliar, by inserting the tool into the holes 1112h) and then the ring 1112 is mounted over the outer surface of the mounting section 1111. Then the two protrusions 1112e are released allowing the two protrusions 1112e to return to their original position, whereby the two protrusions 1112e slide into the slots 111s and into the slot 1100s to lock the two parts together while still allowing them to swivel with respect to each other, as shown in FIG. 20.

FIG. 21 shows a perspective view of a universal connector 10000 according to another embodiment of the present invention. FIGS. 22A, 22B and 22C show a side view, a front view and a back view of an outer connector 11000 of the universal connector 10000 of FIG. 21. FIGS. 23A, 23B and 23C show a side view, a front view and a back view of an air hose mounting portion 11001 of the universal connector 10000 of FIG. 21. FIG. 24 shows a side cross sectional view of the universal connector 10000 at line II—II in FIG. 21. FIGS. 25A, 25B and 25C show a side view a front view and a back view of a activation shaft 1400 of the universal connector 10000 of FIG. 21. The universal connector 10000 is very similar to the universal connector 10 shown in FIGS. 1–6, with the main difference therebetween being that in this embodiment the air hose mounting section 1100h is a separate part from the outer connector 11000 and, therefore, can swivel with respect thereto.

Referring to the FIGS. 21–25C, numeral 11000 designates an outer connector similar to the connector 11 but does not have the air hose mounting section 11h integrally formed therewith. Instead, the outer connector 11000 has a round through hole 11000a formed at the back end thereof, and a semi-spherical surface 11000c adjacent to the through hole 11000a and extending inwards to the point where the ridges 11r end.

The outer connector 11000 can be manufactured using conventional metal cold pressing techniques. Namely, the diameter of the outer connector 11000 becomes progressively smaller from the front end 11f to the back end 11b thereof, and accordingly, when the dies used to make this outer connector are pressed together using high pressures and then released, they can come out of the inner connector 11000. Then, the thread 11t can be formed inside the connector 11000 by using a tap or a turret machine.

Numeral 12 designates an inner connector, which is identical to the connector 12 described in the first embodiment shown in FIGS. 1–6. The inner connector 12 sidingly fits inside the outer connector 11000 in the axial directions thereof, while it is prevented from swiveling inside the outer connector 11000 by the grooves 12g and the ridges 11r fitting inside each other.

The air hose mounting portion 11001 is mounted inside the outer connector 11000 and can swivel with respect to the outer connector 11000.

The air hose mounting portion 11001 comprises a larger diameter round shaft 11001f (hereafter also referred to as the front portion 11001f) having a diameter D20 and a smaller diameter round shaft 1001b having a diameter D30 which are integrally formed with each other, the round shafts 11001f and 1101b having a through hole formed through the center thereof, the through hole having a diameter D2 along a front end thereof, a diameter D3 along a back end thereof and a semi-spherical surface 111v formed therebetween, the diameter D3 being less than the diameter D2. Numeral 11001t designates a thread formed along the front inner surface of the through hole having a diameter D2 of the air hose mounting portion 11001. Numeral 11001p designates a pair of cone shaped protrusions formed along the outer surface of the smaller diameter shaft 11001b of the air hose mounting portion 11001 in the axial direction thereof, the largest outer diameter of the protrusions of which is less than the inner diameter of the through hole 11000a of the outer connector 11000, so that the protrusions 11001p of the air hose mounting section 11001 can fit therethrough. Numeral 11001c designates a semispherical surface formed along the outer surface of the larger diameter shaft 11001f having the same profile and a slightly smaller diameter than the semi-spherical surface 1100c formed in the outer connector 11000, so that these two semi-cylindrical surfaces 11000c and 11001c can slidingly fit against each other in an air tight configuration while allowing the air hose connector 11001 to swivel inside the outer connector 11000. Numeral 11001g designates an annular groove formed along the outer surface of the larger diameter shaft 11001f of the air hose mounting portion 11001 between the front end of the air hose mounting portion 11001 and the semi-cylindrical surface 1100c thereof which is utilized for mounting an O ring therein for providing better air sealing characteristics in the space between the adjacent surfaces of the inner surface of the outer connector 11000 and outer surface of the air hose mounting portion 11001. The diameter D20 of the larger diameter shaft portion 11001f is slightly less than the distance between the ridges 11r, so that the air hose mounting portion 11001 can slidingly fit inside the outer connector 11000 through the front end thereof.

Numeral 1400 designates an activation shaft, which comprises a cylindrical shaft 1400s having a through hole 1400h formed through the center thereof, a thread 1400t formed at one end thereof (hereinafter referred to as the inner end) the thread 1400t having the same diameter D2 and pitch as the thread 1001t in said air hose mounting portion 11001, so that it may be screwed thereinto. The other end of the shaft 1400 has a round larger diameter section 14001 (hereinafter referred to as head portion 14001), which is integrally formed therewith and has an outer diameter D8 which is slightly less than the diameter D5 of the inner connector 12, so that it may slidingly fit therein. Numeral 1400g designates a round annular groove formed in the head portion 14001 for supporting an O ring 115 therein.

The activation shaft 1400 can be manufactured in the following way. First, a round shaft having an external diameter which is the same as the diameter as the larger diameter head portion 14001 and having a through hole in the center thereof which has the same profile as the through hole 1400h of the shaft 1400 (i.e. a through hole which has the shape of a cross) is extruded using convetional extrusion techniques. Next, using a lathe, the annular groove 1400g is cut, the diameter of the shaft is reduced to be the same as the diameter D7 along an appropriate length thereof and then the thus formed shaft is cut and the tread 1400t is formed using a tap. In this way the activation shaft 1400 can be formed using only one part.

To assemble the universal connector 10000, first the outer connector 11000 is held with the front end thereof facing up. Next, the air hose connector 11001, having the O ring 115 mounted in the groove 11001g, is dropped into the outer connector 11000 with the back end thereof (i.e. the end having the protrusions 11001p formed thereon) going in first. Next, the round ball bearing 11v and the spring 112 are dropped into the outer connector 11000, so that they fall into the inside hole formed in the air hose supporting portion 11001. Next, the spring 113 is dropped into the outer connector 11000. Next, the inner connector 12 is dropped into the outer connector with the back end thereof going in first, while making sure that the ridges 11r of the outer connector 11000 slide into the grooves 12g of the inner connector 12. Next, the activation shaft 1400, having the O ring 115 mounted in the groove 1400g is dropped into the through hole in the inner connector 12 with the head portion 14001 thereof going in last. And finally, the shaft 1400 is turned clock wise to cause the thread 1400t to screw into the thread 11001t of the air hose connector 11001.

Accordingly, with this universal connector 10000, the air hose mounting portion 11001 can swivel independently of the outer connector 11000 and the inner connector 12, thereby facilitating the ease of use of the universal connector 10000.

FIG. 26 shows a perspective view of a universal connector 1000000 according to another embodiment of the present invention. FIGS. 27A, 27B and 27C show a side view, a front view and a back view of an outer connector 1100000 of the universal connector 1000000 of FIG. 26. FIG. 27D shows a cross sectional view at line II—II of FIG. 27A. The universal connector 1000000 is substantially the same as the universal connector 10000 and only the differences therebetween will be discussed herebelow. The inner connector 12 and air hose mounting portion 11001 of the universal connectors 10000 and 1000000 are identical in structure.

Numeral 1100000 designates an outer connector which is substantially the same as the outer connector 11000 and only the differences therebetween will be described herebelow. The outer connector 1100000 is formed by a thin wall which is thinner than the wall of the outer connector 11000, numeral 1100000g designates a pair of grooves formed along the outer surface of the outer connector 1100000 in the axial direction thereof extending from the point were inner thread 11t ends to a point near the back end of the outer connector 1100000. The grooves 1100000g are formed using two rectangularly shaped presses (not shown) placed on opposite sides of the outer connector 1100000. Then, the presses are pressed against the outer walls of the outer connector 1100000 to cause the wall thereof to deform and create two grooves 1100000g along the outer sides of the outer connector 11000000. Since the walls of the outer connector 1100000 are very thin, the creation of the grooves 1100000g also creates a pair of corresponding ridges 11000000r along the inner walls of the outer connector 1100000. The universal connectors 10000 and 1000000 are the same in all other respects and the assemblies thereof are the same as well.

All the embodiments of the universal connectors 10, 100, 1000, 10000, 100000 and 1000000 described above are assembled through the front end of the respective outer connector 11, 110, 1100, 11000, 110000, 1100000 and 1100000. Accordingly, one constraint existing with the above described embodiments of the universal connectors is that the grooves and ridges are limited in size in the radial directions thereof. This is because the difference in size between the threads 12t and 11t is only approximately 3 mm (i.e. 7 mm–4 mm=3 mm). Since the inner connectors 12 and 120 must have a minimum wall thickness of at least one millimeter in the radial directions thereof, it only leaves about half a millimeter for each groove and ridge respectively formed on the inner connector and corresponding outer connector in the radial directions thereof. The universal connectors disclosed herebelow alleviate this problem, by having the inner connectors thereof assembled through the back end of the outer connector.

FIG. 28 shows a perspective view of a universal connector 20 according to another embodiment of the present invention. FIGS. 29A, 29B and 29C show a side view, a front view and a back view of an outer connector 21 of the universal connector 20 of FIG. 28. FIG. 29D shows a cross sectional view of the outer connector 21 at line II—II of FIG. 29A. FIG. 30A shows a perspective view of an inner connector 22 of the universal connector 20 of FIG. 28. FIGS. 30B, 30C and 30D show a side view, a front view and a back view of the inner connector 22. FIGS. 31A and 31B shows a side cross sectional view of the universal connector 20 in a semi assembled state and in an assembled state, respectively.

Referring to FIGS. 28–31B, numeral 21 designates an outer connector, numeral 22 designates an inner connector and numeral 11001 designates an air hose mounting portion which is the same as the air hose mounting portion 11001 shown in FIGS. 23A–23C and FIG. 24A. The inner connector 22 is able to move only in the axial direction inside the outer connector 21 and the air hose mounting portion 11001 is able only to swivel inside the outer connector 21 in the radial direction thereof, as will be explained more fully herebelow. The outer connector 21 is cylindrical in shape and comprises a smaller diameter front portion 21f, a middle portion 21m and a back portion 21b which are integrally formed with each other using conventional cold pressing metal forming techniques. The front portion 21f of the outer connector 21 is cylindrical in shape and has a thread 11t formed therein for receiving the American type of air valve 61 therein. The middle portion 21m of the outer connector 21 is cylindrical in shape and has a pair of grooves 21g formed along the outer surface thereof and corresponding ridges 21r formed along the inner surface thereof, said grooves 21g and ridges 21r being formed at opposite sides of the outer connector 21. The back portion 21b of the outer connector 21 is cylindrical in shape and has the same inner and outer diameter as does the middle portion 21m. The inner diameter of the middle and back portions 21m and 21b is greater than the inner diameter of the front portion 21f, namely the diameter of the thread 11t. The wall thickness of the front, middle and back portions 21f, 21m and 21b of the outer connector 21 is substantially the same and should be one millimeter or less, to minimize cost and weight and it can be formed using conventional metal cold pressing techniques.

Referring to FIGS. 30A to 30D, the inner connector 22 is substantially cylindrical in shape. The inner connector 22 comprises a round front end portion 22f and a round back end portion 22p (hereinafter referred to as a flange portion 22p) which are integrally formed with each other, the flange portion 22p having a larger outer diameter than the outer diameter of the front portion 22f. The front end portion 22f of the inner connector 22 has a thread 12t formed therein (similar to the thread 12t described with respect to the above embodiments, which has the same diameter size as the French type of air valve 51). The outer diameter D4 of the front end 22f is slightly less than the inner diameter D1 (i.e. the diameter of the thread 11t formed in the front end portion 21f) of the outer connector 21, so that the front end portion 21f of the inner connector 22 can slide inside the front end portion 22f of the outer connector 21 in the axial directions thereof. Numeral 22g designates an annular groove which is formed on the outer surface of the front end portion 22f, for mounting an O ring 115 thereon. Numeral 22c designates a cone shaped surface formed at the front surface of the flange portion 22p, the cone shaped surface 22c having the same profile as the cone shaped surface 21c formed inside the outer connector 21, so that when these two surfaces 21c and 22c are pressed against one another by the force of the spring 113, they create an air tight seal therebetween. The flange portion 22p has a pair of slots 22s formed at opposing sides thereof, the slots 22s facing in the axial direction of the inner connector 22. The outer diameter of the flange portion 22p is slightly smaller than the inner diameter of the middle section 21m of the outer connector 21 but larger than the distance between the inner surfaces of the two ridges 21r, so that the ridges 21r of the outer connector 21 slidingly fit inside the slots 22s of the inner connector 22s. Accordingly, the inner connector 22 can slide inside the outer connector 21, in the axial direction thereof, when the ridges 21r are positioned to be inside the slots 22s, while, at the same time, the inner connector 22 is prevented from swiveling inside the outer connector 21, due to the ridges 21r being inside the slots 22s.

The universal connector 20 comprises the outer connector 21, the inner connector 22, the air hose supporting portion 11001, the spring 113, the activation shaft 1400 (which was described above with respect to the other embodiment) as well as the one way air valve comprising the ball bearing 111 and the spring 112.

To assemble the universal connector 20, first the back end (i.e. the end with the thread 1400t formed thereon) of the activation shaft 1400 is inserted through the front end 22f of the inner connector 22. Next, the back end of the activation shaft 1400 is inserted through the center of the spring 113. Next, the back end of the activation shaft 1400 is screwed into the inner end of the air hose supporting portion 11001 (i.e. the thread 1400t of the activation shaft 1400 is screwed into the thread 1001t in the air hose supporting portion 11001). Next, the thus assembled inner connector 22, activation shaft 1400, the spring 113 and air hose supporting portion 11001 are inserted into the back end 21b of the outer connector 21, while making sure that the ridges 21r of the outer connector 21 slide into the slots 22s formed in the inner connector 22, and then pushed into the outer connector 22 against the force of the spring 113, so that the front end 22f of the inner connector 22 protrudes out of the front end 21f of the outer connector 21 (i.e., as shown in FIG. 31A). And finally, the rear end 21b of the outer connector 21 is manually bent inwards to form the semi spherical surface 21c (i.e. as shown in FIG. 31B), whereby the air hose supporting portion 11001 is prevented from coming out of the of the back end 21b of the outer connector 21, and accordingly, preventing the spring 113, and the inner connector 22 from coming out as well. The outer diameter of the air hose mounting section 11001 is slightly less than the inner diameter of the back portion 21b. The outer diameter of the front portion 11001f of the air hose mounting section 11001 is greater than the distance between inner sides of the ridges 21r, and slightly smaller than the inner diameter of the back portion 21b of the outer connector 21. Accordingly, the air hose mounting section 1101 is free to swivel inside the outer connector 21 but is prevented from sliding into the outer connector 21 by the ridges 21r (i.e. the inner wall of the air hose mounting section 11001 being adjacent to the ends of the ridges 21r). Further, since the spring 113 is slightly compressed, the spring 113 pushes the inner connector 22 and the air hose mounting portion 11001 away from each other, causing the surfaces 21c and 22c as well as the surfaces 11001c and 21x to be respectively pressed against each other to create air tight seals therebetween. The O rings 115 further enhance the air seal characteristics inside the universal connector 20.

One of the major advantages of this universal connector 20 over the above described universal connectors is that the ridges 21r and the slots 22s can be much larger in the radial directions thereof than the grooves and ridges described above with respect to the above described embodiments.

FIG. 32A shows a perspective view of an inner connector 220 having a pair of ridges 220r instead of the slots 22s according to another embodiment of the present invention. FIGS. 32B, 32C and 32D show a side view, a front view and an end view of the inner connector 220 of FIG. 32A. The ridges 220r, similar to the slots 22s, are formed along the circumference of an annular protrusion 220p at diagonally opposing sides of the inner connector 220 in the radial direction thereof. The inner connector 220 is the same as the inner connector 22 in all other respects. Numeral 210 designates an outer connector which is similar to the inner connector 21 and only the differences therebetween will be described herebelow. To utilize the inner connector 220, the outer connector 21 would have to be modified, namely, the ridges 21r have be changed to become grooves 210g and outwardly facing ridges 210r to accommodate for the ridges 220r and to allow the inner connector to slide axially while preventing the inner connector 220 to rotate radially inside the outer connetor 210. Numeral 210t designates a thread formed along the inner walls of the back end portion 210b of the outer connector 210. Numeral 110011 designates an air hose mounting portion which is substantially the same as the air hose mounting portion 11001 and only the differences therebetween will be discussed herebelow. Numeral 110011t designates a thread formed on the outer surface of the front portion 110011f which is screwed into the thread 210t in the outer connector 210. Accordingly, with this embodiment the air hose mounting portion 110011 can not swivel independently of the outer and inner connectors 210 and 220. Numeral 14000 designates an activation shaft which is substantially the same as the activation shaft 1400 and only the differences therebetween will be discussed herebelow. The shaft 14000 has a constant outer diamerter D7 and does not have the larger diameter section 14001. Numeral 14000g designates a groove formed along the outer diameter of the shaft 14001 for supporting an O ring 115 therein.

It should be noted that the number of ridges and slots need not be limited to only two and that any number of ridges and grooves can be used.

FIG. 34 shows a perspective view of a universal connector 200 according to another embodiment of the present invention. FIGS. 35A and 35b show a front view and a back view of an outer connector 333 of the universal connector 200. FIG. 36A shows a perspective view of an inner connector 222 of the universal connector 200 of FIG. 34. FIGS. 36B, 36C and 36D show a side view, a front view and a back view of the inner connector 222 of FIG. 36A. FIG. 37 shows a side cross sectional view of the universal connector 200 at line II—II of FIG. 34. FIG. 38 shows a cross sectional view at line III—III of FIG. 37. The universal connector 200 is very similar to the universal connector 20 and only the differences therebetween will be described herebelow. Referring to the Figs., numeral 333 designates an outer connector, numeral 222 designates an inner connector, numeral 11001 designates an air hose mounting section, which is identical in structure to the air hose mounting structure 11001 of FIG. 31B. Numeral 1400 designates an activation shaft which is identical in structure to the activation shaft 1400 of FIG. 31b. The inner connector 222 and outer connector 333 are very similar to the respective inner connector 22 and outer connector 21 shown in FIGS. 28–31B and only the differences therebetween will be described herebelow.

The inner connector 222 is able to move only in the axial direction inside the outer connector 333 and the air hose mounting portion 11001 is only able to swivel inside the outer connector 333 in the radial direction thereof, as will be explained more fully herebelow. The outer connector 333 is substantially cylindrical in shape and comprises a cylindrically shaped front portion 21f, a middle portion 333m which is larger in diameter than the front portion 21f and a back portion 333b. The front middle and back portions 21f, 333m and 333b are integrally formed with each other using conventional cold pressing metal forming techniques. The front portion 21f of the outer connector 333 is cylindrical in shape and has a thread 11*t* formed therein for receiving the American type of air valve 61 therein. The middle portion 333*m* of the outer connector 333 has a plurality of semi-cylindrical ridges 333*r* formed along the outer surface thereof and corresponding semi-cylindrical grooves 333*g* formed along the inner surface thereof, said grooves 333*g* and ridges 333*r* being formed at opposite sides of the wall of the middle section 333*m* of the outer connector 333. The back portion 333*b* of the outer connector 333 is cylindrical in shape and has an outer diameter which is the same as or greater than a circle drawn around the outer surface of the grooves 333*g* of the middle section 333. The inner diameter of the middle and back portions 333*m* and 333*b* is greater than the inner diameter of the front portion 21*f*, namely the diameter of the thread 11*t*. The wall thickness of the front, middle and back portions 21*f*, 333*m* and 333*b* of the outer connector 333 is substantially the same and should be one millimeter or less, so that it can be formed using conventional metal cold pressing techniques as well as be very light in weight.

The inner connector 222 comprises a round cylindrical front end portion 22*f* and a round protrusion 222*p* formed at the back end of the round front portion 22*f* (hereinafter referred to as a flange portion 222*p*), the front portion 22*f* and flange portion 222*p* being integrally formed with each other. The flange portion 222*p* has a larger outer diameter than the outer diameter of the front portion 22*f*. The front end of the front end portion 22*f* of the inner connector 222 has a thread 12*t* formed therein (similar to the thread 12*t* described above with respect to the inner connectors), the thread 11*t* having the same diameter size as the French type of air valve 51). The outer diameter of the front end 22*f* of the inner connector 222 is slightly less than the inner diameter D1 of the front end portion 21*f* of the outer connector 333 (i.e. the diameter of the thread 11*t*), so that the front end portion 22*f* of the inner connector 222 can slide inside the front end portion 21*f* of the outer connector 333 in the axial directions thereof.

Numeral 22*g* designates an annular groove which is formed in the outer surface of the front end portion 22*f* in the radial direction thereof, for mounting an O ring 115 thereon. Numeral 22*c* designates a cone shaped surface formed on the front side of the flange portion 222*p*, the cone shaped surface 22*c* having the same profile as the cone shaped surface 21*c* formed inside the outer connector 333, so that when these two surfaces 21*c* and 22*c* are pressed against one another by the force of the spring 113, they create an air tight seal therebetween.

The flange portion 222*p* has a plurality of semi-round protrusions 222*r* integrally formed therewith at fixed intervals along the circumference of the flange portion 222*p*. The outer diameter of the flange portion 222*p* is slightly smaller than the inner diameter D333 of the middle section 333*m* of the outer connector 333. Further, the semi-round ridges 222*r* formed on the flange 222*p* of the inner connector 222 are slightly smaller than the semi-round grooves 333*g* formed in the middle section 333*m* of the outer connector 333, so that the ridges 222*r* can freely slide inside the grooves 333*g* in the axial directions thereof. Accordingly, the inner connector 222 can slide inside the outer connector 333 in the axial directions thereof, when the ridges 222*r* are positioned to be inside the grooves 333*g*, while, at the same time, the inner connector 222 is prevented from swiveling inside the outer connector 333 in the radial direction thereof, due to the ridges 222*r* being inside the grooves 333*g*.

The universal connector 200 comprises the outer connector 333, the inner connector 222, the air hose supporting portion 11001, the spring 113, the activation shaft 1400 (which was described above with respect to the other embodiment) as well as the one way air valve comprising the ball bearing 111 and the spring 112.

To assemble the universal connector 200, first the back end (i.e. the end with the thread 1400*t* formed thereon) of the activation shaft 1400 is inserted through the front end of the inner connector 222. Next, the back end of the activation shaft 1400 is inserted through the center of the spring 113. Next, the back end of the activation shaft 1400 is screwed into the inner end of the air hose supporting portion 11001 (i.e. the thread 1400*t* of the activation shaft 1400 is screwed into the thread 11001*t* in the air hose supporting portion 11001). The ball bearing 111 and spring 112 should already be inside the air hose mounting portion 11001 at this time. Next, the thus assembled inner connector 222, activation shaft 1400 spring 113 and air hose supporting portion 1101 are inserted into the back end 333*b* of the outer connector 333, while making sure that the ridges 222*r* of the inner connector 222 slide into the grooves 333*g* formed in the outer connector 333, so that the front end 22*f* of the inner connector 222 protrudes out of the front end 21*f* of the outer connector 333 (i.e., as shown in FIG. 34 and FIG. 37). And finally, the rear end 333*b* of the outer connector 333 is manually bent inwards to form the semi spherical surface 333*c* (i.e. similarly to the surface 21*x* shown in FIG. 31B), whereby the air hose supporting portion 11001 is prevented from coming out of the back end 333*b* of the outer connector 333, thereby preventing the spring 113, and the inner connector 222 from coming out of the outer connector 333 as well. The outer diameter of the front portion 11001*f* of the air hose mounting section 11001 is slightly less than the inner diameter of the back portion 333*b* of the outer connector 333. Accordingly, the air hose mounting section 11001 is free to swivel inside the outer connector 333. in the radial direction thereof, but is blocked from sliding into the outer connector 333 by the grooves 333*g* in the middle section 333*m* of the outer connector 333. Further, since the spring 113 is always at least slightly compressed, the spring 113 pushes the inner connector 222 and the air hose mounting portion 11001 away from each other, causing the surfaces 21*c* and 22*c*, the surfaces 12*c* and 1400*c* as well as the surfaces 11001*c* and 333*c* to be respectively pressed against each other to create air tight seals therebetween. The O rings 115 further enhance the air seal characteristics inside the universal connector 20.

One of the major advantages of this universal connector 200 is that the ridges 222*r* and the grooves 333*g* in the inner and outer connectors 222 and 333, respectively, can be made as large as desired in the radial directions thereof. This will ensure better axial sliding characteristics and also ensure that the inner connector 222 does not swivel inside the outer connector 333 in the radial directions thereof, should the user of the connector 200 apply excessive force when screwing the connector 200 onto British or French type of air valve.

FIG. 40 shows a perspective view of a universal connector 40 according to another embodiment of the present invention. FIGS. 41A, 41B and 41C show a side view, a front view and a back view of an outer connector 45 of the universal connector 40 of FIG. 40. FIG. 42A shows a perspective view of an inner connector 44 of the universal connector 40 of FIG. 40. FIGS. 42B and 42C show a front view and a back view of the inner connector 44 of the universal connector 40 of FIG. 40. FIG. 43 shows a perspective view of an activation shaft 46 of the universal connector 40 of FIG. 40. FIG. 44A shows a side cross sectional view of the universal connector 40 at line I—I of FIG. 40 in its usual state. FIG. 44B shows a side cross sectional view of the universal connector 40 at line I—I of FIG. 40 when an American type air valve is mounted inside the universal connector 40.

The universal connector 40 is similar to the universal connectors described above. One major conceptual difference between the universal connector 40 and the other above described universal connectors is that the activation shafts 40 does not slide axially through the center of the inner connector 46 (as did all the above described activation shafts for each above described universal connector) but slides at an angle through an aperture formed in the side of the wall of the inner connector 45. This embodiment allows the universal connector 40 to be shorter than the above described universal connectors and, accordingly, lighter in weight and smaller in size. From the point of view of using the universal connector 40, it is identical to the above described universal connectors.

Referring to the FIGS. 40–44, numeral 45 designates an outer connector, numeral 44 designates an inner connector and numeral 46 designates an activation shaft. Numeral 47 designates a washer like end plate, numeral 113 designates a spring and numeral 55 designates a washer like rubber seal. The inner connector 44 can slide inside the outer connector 45 in the axial directions thereof but cannot swivel inside the outer connector 45 in the radial directions thereof.

The outer connector 45 comprises a smaller cylindrical front portion 45f and a larger coaxiall cylindrical back portion 45b, the smaller and larger cylindrical portions 45f and 45b being integrally formed with each other by a radial wall 45w formed therebetween. Numeral 11t designates a thread formed along the front inner wall of the front portion 45f of the outer connector 45 for receiving an American type air valve 61 therein and numeral 45g designates an annular radial groove formed along the back inner wall of the front portion 45f. Numeral 45t designates a thread formed along the inner wall of the back portion 45b at the backwardly extending end thereof. Numeral 45r designates a pair of ridges formed at diagonally opposing sides of the inner walls of the larger cylindrical back portion 45b in the axial direction thereof, the ridges 45r extending from the back side of the wall 45w to a point where the thread portion 45t is formed.

The inner connector 44 comprises a cylindrical front portion 44f having a thread 12t formed along the inner front wall thereof for receiving a British or French type air valve therein, a round protrusion 44p (hereinafter referred to as a round flange portion 44p) having a pair of slots 44s formed along the periphery thereof at diagonally opposing sides of the flange 44p in the axial direction of the inner connector 44. The slots 44s extend from the periphery of the flange portion 44p only through a portion of the flange 44p in the radial direction thereof (i.e. for about 1 mm or 2 mm). The inner connector 44 further comprises a cylindrical back portion 44b formed on the back side of the flange portion 45p, the back portion 44b having a larger outer diameter than the diameter of the front portion 44f but a diameter which is less than the distance between the inner walls of the two slots 44s. Numeral 44h designates a cylindrical portion having a pair of cone shaped protrusions 44c along the outer surface thereof, one end of the cylindrical portion being integrally formed with the back end of the back portion 44b, the cylindrical portion 44h and the pair of protrusions 44c providing the function of an air hose mounting portion for mounting a nylon air hose 48 thereon. The cylindrical portion 44h has an inner diameter which is less than the inner diameter of the front portion 44f. Numeral 44t designates a thread formed along the inner walls of the inner end of the cylindrical portion 44h. Numeral 49 designates a donut shaped flange, i.e. washer, having a thread 49t along the circumference thereof and a central hole 49h formed through the center thereof, the flange 49 being utilized for preventing the spring 112 and ball bearing 111 (which together constitute a one way air valve) from coming out of the central hole 44y formed in the cylindrical portion 44h.

Numeral 44g designates a rectangular shaped groove formed along the outer surface of the cylindrical front portion 44f in the axial direction of the inner connector 44 and numeral 44a designates a rectangular aperture formed through the front portion of the groove 44g. The groove 44g and the aperture 44a are utilized to store the middle portion 46m and front portion 46f, respectively, of the activation shaft 46 therein. Further, when the outer connector 45 is pushed forward with respect to the inner connector 44, the extending end 46f and part of the middle portion 46m pass through the aperture 44a into the center of the inner connector 44, so that the front portion 46f of the activation shaft 46 extends out the front of the extending end of the forward portion 44f of the inner connector 44.

The activation shaft 46 comprises a rectangular strip of springy metal or steel having a straight middle portion 46m, a slightly downwardly bent front portion 46f and an upwardly bent back portion 46b. The width of the strip of sheet metal used in forming the activation shaft 46 is preferable about 1 mm–2 mm wide and about 1 mm thick. The length of the front portion 46f and the back portion 46b are about 1 mm–2 mm. The length of the middle portion 46m is preferably about 5 mm–10 mm. In the normal state, the activation shaft 46 has the back portion 46b thereof stored inside the groove 45g formed in the outer connector 45, the middle portion thereof stored inside the groove 44g in the inner connector 44 and the front portion 46f thereof stored inside the aperture 44a in the inner connector 44. Accordingly, when the outer connector 45 is slid forward with respect to the inner connector 44, the front and middle portions 46f, 46m of the activation shaft 46 are caused to slide out of the aperture 44a into the center of the inner connector 44 to cause the front portion 46f of the activation shaft 46 to protrude out and in front of the central front portion 44f of the inner connector 44, so that it may be utilized for activating (i.e. pressing inwardly) the air activation pin 9p inside an American type air valve 61, as is shown in FIG. 44B.

The inner and outer connectors 44 and 45 are manufactured using conventional metal cold pressing techniques, and the manufacture threreof should be obvious to those familiar in the art.

To assemble the universal connector 40, first the back end 46b of the activation shaft 46 is inserted in the groove 45g in the outer connector 45. Next, the front end 44f of the inner connector 44 is slid into the central opening in the back end 45b of the outer connector 45, while making sure that the ridges 45r of the outer connector 45 slide into the slots 44s of the inner connector 44, as well as making sure that the middle portion 46m and front portion 46f of the activation shaft 46 slide into the groove 44g in the inner connector 44. The activation shaft 46 is made of resilient steel, so that it can flex and bend when a sufficient force is applied thereto, and still retain its original shape when the force is removed. However, the activation shaft 46 should be strong enough not to flex or bend when it is pressing against the activation pin inside an American type air valve 61. The ball bearing 111, spring 112 and washer 49 should be already mounted inside the inner connector 44 at this time. Next, the rubber seal 55 is mounted on the air hose mounting section 44*h*. Next, the spring 113 is inserted inside the back portion 45*b* of the outer connector 45. Next, the end plate 47 is screwed into the thread 45*t* in the back portion 45*b* of the outer connector 45, thereby completing the assembly of the universal connector 40.

The universal connector 40 is used as follows. When mounting the universal connector on a British or French type air valve the respective thread portion 41*t* or 51*t* of the British or French type air valves 41, 51 is screwed into the thread 12*t* formed in the extending portion 44*f* of the inner connector 44 by turning the outer connector 45 clockwise, thereby causing the inner connector 44 to turn clockwise therewith (i.e. due to the ridges and slots 45*r* and 44*s* preventing the inner connector 44 from swiveling inside the outer connector 45). At this time, the activation shaft 46 is retracted by the force of the spring 113 which forces the inner connector 44 to move towards the front of the outer connector 45 and, accordingly, the activation shaft 46 does not interfere with the screwing in of the British and French type air valves into the inner connector 44.

To mount an American type air valve 61 inside the outer connector 45 of the universal connector 40, first the front of the front portion 44*f* of the inner connector 44 is placed against the extending end of the American type air valve 61 while holding the outer connector 45 by hand. Next, the outer connector 45 is pushed forward (i.e. against the force of the spring 113) towards the American type air valve 61 and turned clockwise, to cause the thread 61*t* of the American type air connector 61 to screw into the thread 11*t* in the outer connector 45. As the outer connector is turned clockwise, the thread 61*t* of the American type air valve is screwed further and further into the outer connector 45, causing the outer connector 45 to move axially forward out of the front portion 44*f* of the inner connector 44, whereby, the front portion 46*f* of the activation shaft 46 is also caused to move into and out of the front portion 44*f* of the inner connector 44 to eventually push against the activation pin 9*p* inside the American type air valve 61.

FIG. 45 shows a side cross sectional view of a universal connector 40 at line I—I of FIG. 40 according to another embodiment of the present invention. The universal connector 40 is similar to the universal connector 40 and only the differences therebetween will be described herebelow. FIGS. 46A, 46B and 46C show side view, a front view and a back view of an inner connector 440 according to another embodiment of the present invention. The inner connector 440 is very similar to the inner connector 44 and only the differences therebetween will be described herebelow.

Referring to FIGS. 45–46C, the inner connector 440 comprises a front cylindrical portion 44*f*, which is identical to the front cylindrical portion 44*f* of the inner connector 44 described above, a cylindrical flange 44*p* integrally formed on the outer surface of the cylindrical front portion 44*f* along a back end thereof, the cylindrical flange portion 44*p* being identical to the flange portion 44*p* of the inner connector 44, a cylindrical back portion 440*b*, integrally formed with and coaxial with the cylindrical front portion 44*f*. The inner connector 440 further comprises a internal radial wall 440*w* which is integrally formed along the inner walls of the inner connector 440 in the radial direction thereof, the inner radial wall 440*w* having a through hole 440*h* formed through the center thereof in the axial direction of the inner connector 440, Numeral 11001 generally designates an air hose mounting portion which was described above and is shown in FIGS. 23A–23C and FIG. 24A. The extending back end 440*b* of the inner connector 440 are bent inwards to form a semi-spherical surface 440*c* which has the same profile as the surface 1001*c* of the air hose mounting portion 11001. The spring 112 has one end thereof pressing against the side of the ball 111 and the other side thereof pressing against the backward side of the wall 440*w*.

Numeral 470 designates a round metal flange which is similar to the flange 47 but further comprising a round cylindrical portion 470*c* integrally formed therewith along one side thereof, The cylindrical portion 470*c* has an inner diameter which is slightly greater than the outer diameter of the cylindrical back portion 440*b* of the inner connector 440, so that when an American type air valve 61 is screwed into the thread 11*t* of the outer connector 45, the inwardly extending end 470*e* of the cylindrical portion 470*c* buts up against a round O ring 1155, which creates an air tight seal, thereby preventing pressurized air from escaping out of the universal connector 40 when an American type air valve is mounted therein.

To assemble the universal connector 40, first the ball 111 and the spring 112 are inserted into the central hole in the air hose mounting section 11001 and then the front end 11001*f* of the air hose mounting section 11001 is inserted into the open back end of the cylindrical back portion 440*b*. Next, the extending end of the cylindrical back portion 440*b* are bent inwards to create the semi-cylindrical shape surface 440*c* as shown in the FIG. 45 using a truet machine or a pressing machine, whereby the air hose connecting section 11001 is locked inside the back portion 440*b* of the inner connector 440 in the axial direction thereof, while being able to swivel inside the cylindrical back portion 440*b* of the inner connector 440 in the radial direction thereof. Next, the O ring 1155 is mounted on the cylindrical back portion 440*b*, so that it is next to the back side of the flange 44*p*. The outer diameter of the O ring 1155 is slightly less than the inner diameter of the spring 113. Next, the spring 113 is mounted on the cylindrical back portion 440*b*, so that it is next to the back side of the flange 44*p*. Next, the front end 44*f* of the inner connector 440 is slid into the central opening in the back end 45*b* of the outer connector 45, while making sure that the ridges 45*r* of the outer connector 45 slide into the slots 44*s* in the flange 44*p* of the inner connector 440, as well as making sure that the middle portion 46*m* and front portion 46*f* of the activation shaft 46 slide into the groove 44*g* in the inner connector 440. Next, the end plate 470 is screwed into the thread 45*t* in the back portion 45*b* of the outer connector 45, thereby completing the assembly of the universal connector 40.

In all the above described embodiments, the inner connectors 12, 120, etc., were utilized to couple the British type air valve or the French type air valve to the respective universal connectors. However, since the diameter and pitch of the thread of these two valves are slightly different, there will be some gap between the inner thread in the inner connectors and the thread on these British and French type air valves, which will result in pressurized air escaping therebetween. The following embodiments are disclosed with the object to alleviate the problem of pressurized air escaping.

FIG. 38 shows a partial side cross sectional view of a thread 122*t* in an inner connector 122 according to the present invention. Referring to the Fig., numeral 122 generally designates a front portion of an inner connector which is identical to any of the inner connectors 12, 120, or any of the other inner connectors disclosed above, with the only exception being the through hole 122*h* and the thread 122*t* being different than so far described above. Namely, the central through hole 122*h* in the inner connector 122 is tapered so that the diameter D12 at the extending end of the inner connector 122 is larger than the diameter D13 at the inner end of the inner connector 122. The diameter D12 is slightly bigger than the diameter of the thread 41*t* and 51*t* of the British and French air valves 41, 51, respectively, so that these air valves can be screwed thereinto, and the diameter D13 is slightly smaller than the diameter of the thread 41*t* and 51*t* of the British and French air valves 41, 51, respectively, so that these air valves will not fit therein. Accordingly, the British and French air valves can only be partially screwed into the thread 122*t*, whereby an air tight seal is provided between the thread 122*t* and the thread 41*t* or 51*t* of the British type air valve 41 or French type air valve 51. The length of the thread 41*t* of a British type air valve 41 is approximately 5 mm. The diameters D12 and D13 can be set such that at a depth of 4 mm into the thread 122*t*, the thread 41*t* is jammed in the thread 122*t*, whereby an air tight seal is created therebetween. Since the locking nut 53 of the French type air vavle 51 has an outer diameter which is less than the outer diameter of the thread 51*t* and 41*t* of the French type air valve 51 and the British type air valve 41, this tapered thread 122*t* will not hinder the use thereof when a French air valve is screwed thereinto. Furthermore, numeral 122*g* designates an annular groove formed about 1 mm from front end of the inner connector 122. An O ring can be mounted inside the groove 122*g* to provide even better air sealing characteristics.

FIG. 39 shows a line representation of a given thread pitch of an inner connector and the thread of the British type air valve. Referring to the Fig., the solid lines 122*a*, 122*b* . . . 122*n* represent the first, second and n'th thread of the inner connector and the lines 41*a*, 41*b* . . . 41*n* represent the first, second and n'th thread of the thread 41*t* of a British type air valve 41. As can be seen from the Fig., the pitch (i.e. the number of threads per unit length) of the thread 122*t* (represented by the solid lines 122*a*–122*n*) in the inner connector 122 is greater than the pitch of the thread 41*t* (represented by the broken lines 41*a*–41*n*) of the British type air valve 41. Accordingly, by choosing a thread pitch for the inner thread 122*t* either greater than or less than the thread pitch of the threads 41*t* or 51*t* of a British or French type air valve, respectively, so that the British and French air valves can only be screwed 4 mm into the thread 122 before locking up due to the difference in thread pitch, an air seal can be created therebetween, whereby the air sealing characteristics of the thread 122 can further be enhanced. Further, the angle of the walls of the thread 122*t* can be chosen to be such that it further enhances the air sealing characteristics of the thread 122 of the inner connector 122 with respect to the British and French type air valves 41 and 51. Accordingly, the diameter, pitch and thread wall angle can be set to provide the best air sealing characteristics for both the British and French type air valves.

What is claimed is:

1. A universal air valve connector which comprises: a substantially cylindrical outer connector, said outer connector having a through hole formed therethrough in the axial direction thereof and having a bigger diameter thread formed along an inner wall thereof, said bigger diameter thread extending from a front end of said outer connector, so that a Schrader type air valve may be screwed thereinto; a substantially cylindrical inner connector supported inside said outer connector, said inner connector having a through hole formed therein in the axial direction thereof and having a smaller thread formed along an inner wall of said through hole, said smaller thread extending from a front end of said inner connector, so that a presta or dunlop type air valve may be screwed thereinto, said inner connector being able to slide inside said outer connector in the axial direction thereof; swivel preventing means for preventing said inner connector from swiveling inside said outer connector in the radial directions thereof; blocking means for preventing said inner connector from completely coming out of said outer connector; means for connecting an air hose to said connectors; activation means for pressing the air pin inside a Schrader valve when said Schrader valve is screwed into said bigger thread formed in said front end of said outer connector, so that pressurized air may be pumped into said Schrader valve; and biasing means for generating a force on said inner and outer connectors, so that said front end of said inner connector is normally protruding out of said front end of said outer connector.

2. A universal air connector as defined in claim 1, wherein said swivel preventing means comprises:
ridges formed on the inner surface of said outer connector in the axial direction thereof; and
grooves formed on the outer surface of said inner connector in the axial direction thereof, said ridges slidingly fitting inside said grooves, whereby said inner connector can move inside said outer connector in the axial directions thereof while said inner connector is prevented from swiveling inside said outer connector in the radial directions thereof.

3. A universal air connector as recited in claim 1, wherein said swivel preventing means comprises:
grooves formed on the inner surface of the outer connector in the axial direction thereof; and
ridges formed on the outer surface of said inner connector in the axial direction thereof, said ridges slidingly fitting inside said grooves, whereby said inner connector can slide inside said outer connector in the axial direction thereof while said inner connector is prevented from swiveling inside said outer connector in the radial directions thereof.

4. A universal air connector as recited in claim 1, wherein said biasing means comprises:
a spring mounted inside said outer connector.

5. A universal connector as recited in claim 1, wherein said activation means, swivel preventing means and blocking means comprises:
a square shaft (140) having a through hole formed therein in the axial direction thereof, one end of said shaft being mounted in a back portion of said outer connector, said square shaft slidingly fitting inside said through hole in said inner connector: and
a round cap (150) mounted on the other end of said square shaft, said round cap having at least one aperture formed therethrough in the axial direction thereof,
the through hole in said cylindrical inner connector being round along a front portion thereof and square along a back portion thereof, said round hole being larger than said square hole in said inner connector,
said square shaft being slightly smaller in size than said square hole in said inner connector, so that said square shaft slidingly fits inside said square hole and said round hole in said inner connector, while, at the same time, said square shaft prevents said inner connector from swiveling inside said outer connector, thereby providing said function of said swivel preventing means,
the outer diameter of said end cap being slightly smaller than the inner diameter of said round hole and larger than said square hole in said inner connector, so that, although said inner connector can move with respect to said outer connector, said square shaft and said cap in the axial direction thereof, said inner connector is prevented from completely coming out of said outer connector by said round cap being larger than said square hole, thereby providing said function of blocking means for preventing said inner connector from completely coming out of said outer connector, the length of said square shaft and said cap being set to be just long enough to press the air pin inside a Schrader type air valve when said valve is screwed into said larger thread in said outer connector, thereby providing said function of said activation means.

6. A universal air connector as recited in claim 1, wherein said air hose connecting means comprises a cylindrical portion integrally formed with a back portion of said outer connector, said cylindrical portion having a pair of cone shaped protrusions formed on the outer surface thereof for frictionally supporting an air hose thereon.

7. A universal air connector as recited in claim 1, further comprising:
one way air passing means for allowing pressurized air to flow only in one direction through said connectors.

8. A universal connector as recited in claim 1, wherein said activation means comprises:
an activation shaft (46) comprising a rectangular strip of metal having a straight middle portion (46*m*), a downwardly bent front portion (46*f*) and an upwardly bent back portion (46*b*), said activation shaft having said back portion thereof stored inside a groove (45*g*) formed in said outer connector (45), said middle portion thereof stored inside a groove (44*g*) formed in said inner connector (44) and said front portion (46*f*) thereof stored inside an aperture (44*a*) formed in a front end of said inner connector 44, so that when said outer connector (45) is slid forward with respect to said inner connector (44), said front and middle portions (46*f*, 46*m*) of said activation shaft (46) slide through said aperture (44*a*) in said inner connector (44) and said front portion (46*f*) of said activation shaft (46) to protrude out of and in front of the center of said front end of said inner connector (44), so that said front portion (46*f*) of said activation shaft (46) may be utilized for pressing an air activation pin (9*p*) inside an American type air valve.

\* \* \* \* \*